US00RE38737E

(19) United States
(12) Reissued Patent
Ban et al.

(10) Patent Number: US RE38,737 E
(45) Date of Reissued Patent: May 24, 2005

(54) TONER SUPPLY CONTAINER DETACHABLY MOUNTABLE TO A MAIN ASSEMBLY OF AN ELECTROGRAPHIC IMAGE FORMING APPARATUS AND A SEALING MEMBER USABLE WITH THE TONER SUPPLY CONTAINER

(75) Inventors: Yutaka Ban, Tokyo (JP); Shinichi Onodera, Tokyo (JP); Kazuhiko Omata, Satte (JP); Kyota Miyazaki, Tama (JP); Ayumu Murakami, Abiko (JP); Katsuya Murakami, Toride (JP)

(73) Assignee: Canon Kabushiki Kaisha, Tokyo (JP)

(21) Appl. No.: 10/262,058

(22) Filed: Oct. 2, 2002

Related U.S. Patent Documents

Reissue of:
(64) Patent No.: 6,128,453
Issued: Oct. 3, 2000
Appl. No.: 09/099,536
Filed: Jun. 18, 1998

(30) Foreign Application Priority Data

Jun. 19, 1997 (JP) ..... 9-163113
Jun. 16, 1998 (JP) ..... 10-168368

(51) Int. Cl.[7] ..... G03G 15/08
(52) U.S. Cl. ..... 399/106; 399/263
(58) Field of Search ..... 399/103, 106, 399/263, 262, 119; 222/DIG. 1

(56) References Cited

U.S. PATENT DOCUMENTS 4,212,264 A * 7/1980 Knechtel et al. ..... 222/DIG. 1
4,611,730 A * 9/1986 Ikesue et al. ..... 222/DIG. 1
4,622,916 A * 11/1986 Tanaka et al.
4,878,603 A * 11/1989 Ikesue et al. ..... 222/DIG. 1
5,128,724 A * 7/1992 Hayashi et al. ..... 399/119
5,264,901 A * 11/1993 Rossiter ..... 399/106
5,296,900 A 3/1994 Saijo et al.
5,307,129 A * 4/1994 Miura et al. ..... 399/263
5,331,382 A * 7/1994 Miura et al. ..... 399/263
5,398,849 A * 3/1995 Smith et al. ..... 399/262
5,402,216 A * 3/1995 Komaki et al. ..... 222/DIG. 1
5,424,816 A * 6/1995 Fox et al. ..... 399/263
5,500,719 A * 3/1996 Ichikawa et al. ..... 222/DIG. 1
5,548,384 A * 8/1996 Weed ..... 399/106
5,579,101 A * 11/1996 Omata et al. ..... 222/DIG. 1
6,169,864 B1 * 1/2001 Baxendell et al. ..... 399/106

FOREIGN PATENT DOCUMENTS

EP 0708387 A2 * 4/1996
EP 0736818 A1 * 10/1996
EP 0740227 A1 * 10/1996
JP 61116372 A * 6/1986 ..... G03G/15/08
JP 63-85660 9/1986
JP 64-23054 7/1987
JP 3-2882 5/1989
JP 6-348121 7/1993
JP 5-303276 11/1993
JP 07044000 A * 2/1995 ..... G03G/15/08
JP 8-211719 2/1995
JP 07113796 A * 5/1995
JP 7-199617 8/1995
JP 8-185028 7/1996
JP 10-319696 5/1997

OTHER PUBLICATIONS

US 5,057,872, 10/1991, Saijo et al. (withdrawn)

* cited by examiner

*Primary Examiner*—Susan Lee
(74) *Attorney, Agent, or Firm*—Fitzpatrick, Cella, Harper & Scinto

(57) ABSTRACT

A toner supply container detachably mountable to a main assembly of an electrophotographic image forming apparatus include (a) a toner accommodating portion for accommodating toner; (b) a toner supply opening for discharging toner accommodated in the toner accommodating portion; (c) a toner feeding member for feeding the toner accommodated in the toner accommodating portion toward the toner supply opening; (d) a sealing member including: a sealing portion for openably sealing the toner supply opening; and a driving portion for driving the toner feeding member.

94 Claims, 38 Drawing Sheets

TONER SUPPLY CONTAINER DETACHABLY MOUNTABLE TO A MAIN ASSEMBLY OF AN ELECTROGRAPHIC IMAGE FORMING APPARATUS AND A SEALING MEMBER USABLE WITH THE TONER SUPPLY CONTAINER

Matter enclosed in heavy brackets [ ] appears in the original patent but forms no part of this reissue specification; matter printed in italics indicates the additions made by reissue.

FIELD OF THE INVENTION AND RELATED ART

The present invention relates to a toner supply container detachably mountable to a main assembly of an electrophotographic image forming a apparatus, a sealing member therefor and an electrophotographic image forming apparatus to which the toner supply container is detachably mountable.

The electrophotographic image forming apparatus forms an image on recording material using an electrophotographic image formation type process. Examples of an electrophotographic image forming apparatus include an electrophotographic copying machine, an electrophotographic printer (laser beam printer, LED printer or the like), a facsimile machine and a word processor.

Heretofore, an electrophotographic image forming apparatus, such as an electrophotographic copying machine or a printer, uses fine toner powder as a developer. When the developer in the main assembly of the apparatus is used up, the toner is supplied into the main assembly of the apparatus using a toner supply container.

Here, in a known system, since the toner is very fine powder or particles, the toner supply container is kept set within the main assembly of the apparatus, and the toner is discharged at a small rate through a small opening during the toner supply operation, so as to prevent toner scattering. In such a system, it is difficult to let the toner fall by gravity or the like, and therefore, some feeding means is required.

An example of a toner supply container provided with such a toner feeding means is disclosed in Japanese Patent Application Publication No. HEI-7-113796. The toner supply container is generally cylindrical, and one end portion thereof is provided with a relatively small opening for discharging the toner. In the container, there is provided a helical toner feeding member which receives a driving force from the outside, penetrating through a wall of the end of the container.

A bearing seal mechanism is necessary to prevent toner leakage through the through-hole at the end for the drive transmission. Generally, the seal mechanism includes a gear member provided at the end of the feeding member, and a seal is sandwiched between the gear member and the container wall surface. The seal is in many cases an annular wool felt, oil seal or the like.

The toner supply container is used while being kept in the main assembly of the apparatus, and the toner is fed by rotation of the toner feeding member driven from the main assembly, and the toner is discharged at a small rate through the opening.

On the other hand, another toner supply container having toner feeding means is disclosed in Japanese Laid-open Patent Application No. HEI-7-44000. The toner supply container is in the form of a cylindrical bottle, and the inside surface thereof is provided with a helical rib, and a small toner discharging outlet is provided adjacent the center at one end.

The toner supply container, as contrasted to the above-described conventional example, does not have any inner feeding means, and is used while being kept in the main assembly of the apparatus, and the main body of the container itself is rotated by the main assembly to feed the toner. The toner fed to the end adjacent the discharging outlet is guided by an extended portion adjacent the opening to be raised toward the discharging outlet adjacent the center of the container, and then is discharged.

SUMMARY OF THE INVENTION

Accordingly, it is a principal object of the present invention to provide a toner supply container which is placed in a main assembly of an electrophotographic image forming apparatus and wherein the toner can be supplied into the main assembly with high reliability.

It is another object of the present invention to provide a toner supply container of the low-manufacturing-cost type.

It is a further object of the present invention to provide the toner supply container provided with a sealing member having a function of unsealably sealing a developer supply port and a function of driving a toner feeding portion.

It is a yet further object of the present invention to provide a sealing member usable with such a toner supply container and an electrophotographic image forming apparatus to which such a toner supply container is detachably mountable.

According to an aspect of the present invention, there is provided an apparatus according to a toner supply container detachably mountable to a main assembly of an electrophotographic image forming apparatus, comprising: (a) a toner accommodating portion for accommodating toner; (b) a toner supply opening for discharging toner accommodated in the toner accommodating portion; (c) a toner feeding member for feeding the toner accommodated in the toner accommodating portion toward the toner supply opening; (d) a sealing member including: a sealing portion for openably sealing the toner supply opening: and a driving portion for driving the toner feeding member.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

The embodiment of the present invention will be described in conjunction with the accompanying drawings.

Figure 1:
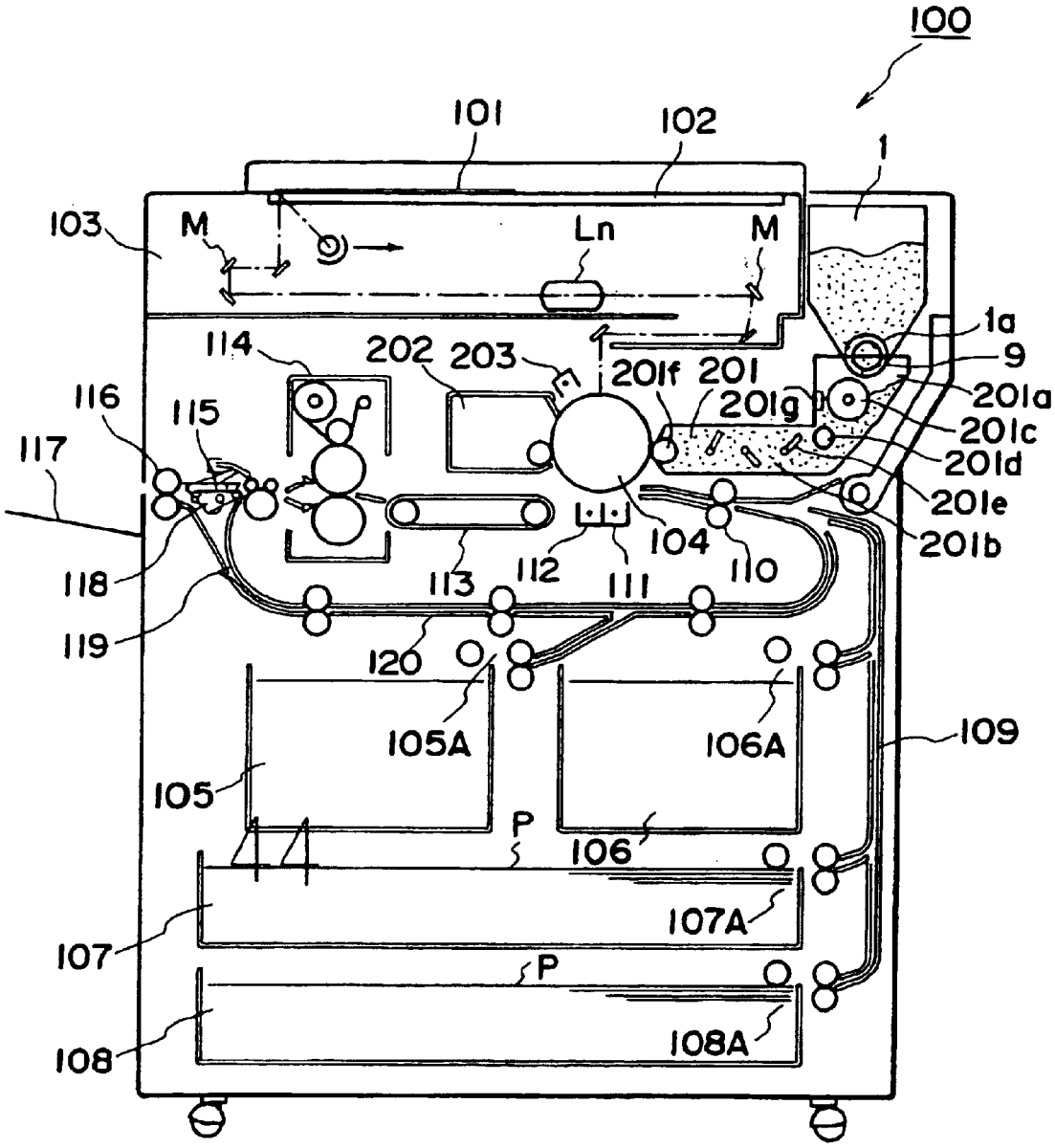
FIG. 1 is an illustration of an electrophotographic copying machine, which is an example of an electrophotographic image forming apparatus to which a toner supply container according to the present invention is mountable.

Referring to FIG. 1, a description will first be provided with respect to a structure of an electrophotographic copying machine, which is an example of an electrophotographic image forming apparatus to which a toner supply container according to the present invention is mountable.

In FIG. 1, designated by 100 is a main assembly of the electrophotographic copying machine. Reference numeral 101 designates an original which is placed on an original supporting platen glass 102. A light image corresponding to image, information, is formed on an electrophotographic photosensitive drum 104 through a plurality of mirrors M and a lens Ln of an optical portion 103. Designated by 105–108 are cassettes. Among the cassettes 105–108, the one containing the proper size sheets corresponding to the paper size of the original 101 or the information inputted by the user of the operating portion 100a is selected. The recording material is not limited to paper, but may be an OHP sheet or the like.

The one sheet P fed by pick-up and separating device 105A–108A is fed to a registration roller 110 through a feeding portion 109, and is fed in synchronism with the rotation of the drum 104 and the scanning timing of the optical portion 103. Designated by 111, 112 are a transfer discharge device and a separation discharge device, respectively. The toner image formed on the drum 104 by a transfer discharging device 111 is transferred onto the sheet P. Then, the sheet P, now having a transferred toner image, is separated from the drum 104 by a separation discharge device 112.

The sheet P is fed by a feeding portion 113 to a fixing portion 114 where the toner image on the sheet is fixed by heat and pressure, and thereafter, the sheet is passed through the sheet discharge/reversion portion 115 and is discharged to a sheet discharge tray 117 by sheet discharging rollers 116 in the case of operating in a one-sided copy mode. In the case of operating in a both-sided copy mode, the sheet is fed to the registration roller 110 through reflecting paths 119, 120 under the control of the flapper 118 of the sheet discharge/reversion portion 115, and is again fed in the same way as in the one-sided copy mode and is discharged to the sheet discharge tray 117.

In the case of operating in a superimposed copy mode, the sheet P is passed through the sheet discharge reversion portion 115, and is partly discharged by the sheet discharging roller 116 temporarily. Thereafter, the terminal end of the sheet P passes by the flapper 118, and the flapper 118 is controlled when the sheet is still nipped by the sheet discharging roller 116, and the sheet discharging roller 116 is reversed so that it is refed into the apparatus. Then, the sheet is fed to the registration roller 110 through the refeeding portions 119, 120 and is fed in the same way as in the one-sided copy mode to the sheet discharge tray 117.

In the main assembly 100 of the apparatus, a developing station 201, cleaner a station 202, a primary charger 203 and the like are disposed around the drum 104. The developing station 201 functions to develop with toner an electrostatic latent image formed on the drum 104 by the optical portion 103 on the basis of the information of the original 101. A toner supply container 1 for supplying the toner to the developing station 201 is mounted to the main assembly 100 in the manner that the operator can mount and demount it. The developing station 201 has a toner hopper 201a and a developing device 201b. The toner hopper 201a includes a stirring member 201c for stirring the toner supplied from the toner supply container. The toner stirred by the stirring member 201c is fed to the developing device 201b by a magnet roller 201d. The developing device 201b includes a developing roller 201f and a feeding member 201e. The toner fed from the toner hopper 201a by the magnet roller 201d, is further fed to the developing roller 201f by the feeding member 201e, and then is supplied to the photosensitive drum 104 by the developing roller 201f.

The cleaning station is provided to remove the toner remaining on the photosensitive drum 104. The primary charger 203 functions to charge the photosensitive drum 104.

Figure 3:
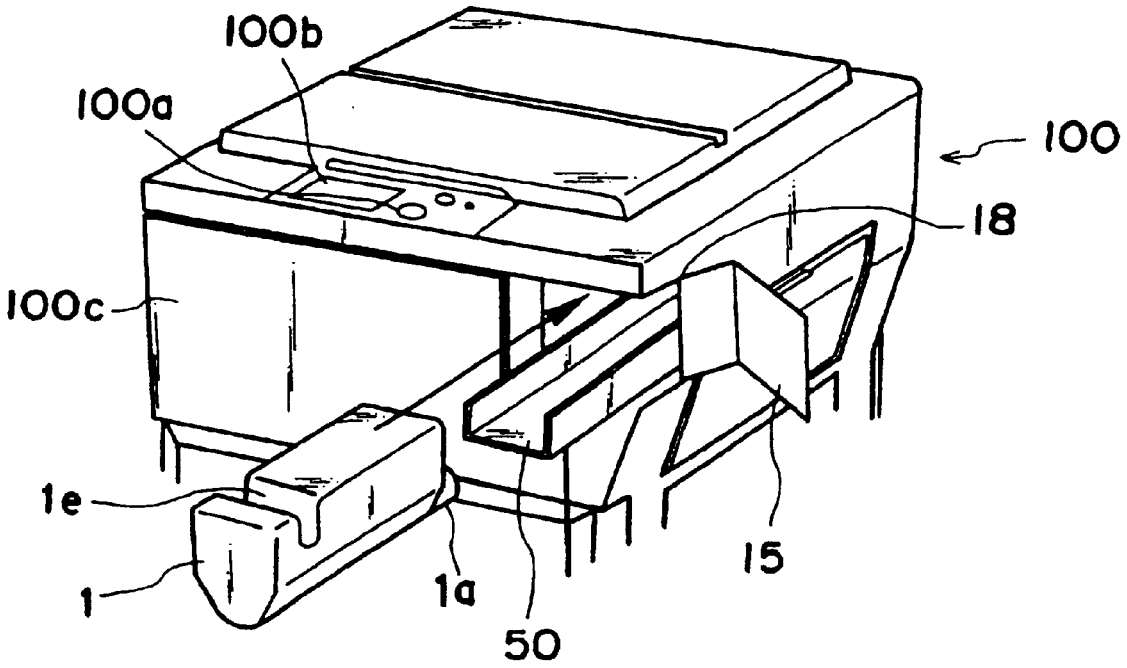
FIG. 3 is an illustration of the toner supply container and the electrophotographic copying machine wherein the cover of the electrophotographic copying machine, for the exchange of the toner supply container, is opened to load the toner supply container.

When the operator opens, as shown in FIG. 3, the cover 15 for exchanging the toner supply container, the cover being a part of the outer casing, the container receptor table 50 is drawn out to a predetermined position by a driving system (unshown). A toner supply container 1 is placed on the table 50. When the user takes out the container 1 from the main assembly 100 of the apparatus, the toner supply container 1 is removed from the table 50 which has been drawn out. The cover 15 is provided exclusively for mounting and demounting (exchanging) the toner supply container 1, and is opened or closed only when the container 1 is mounted or demounted. For the maintenance of the main assembly 100, a cover 100c at the front side is opened.

The toner supply container 1 may be directly mounted to or demounted from the main assembly 100 without using the container reception table 50.

Figure 4:
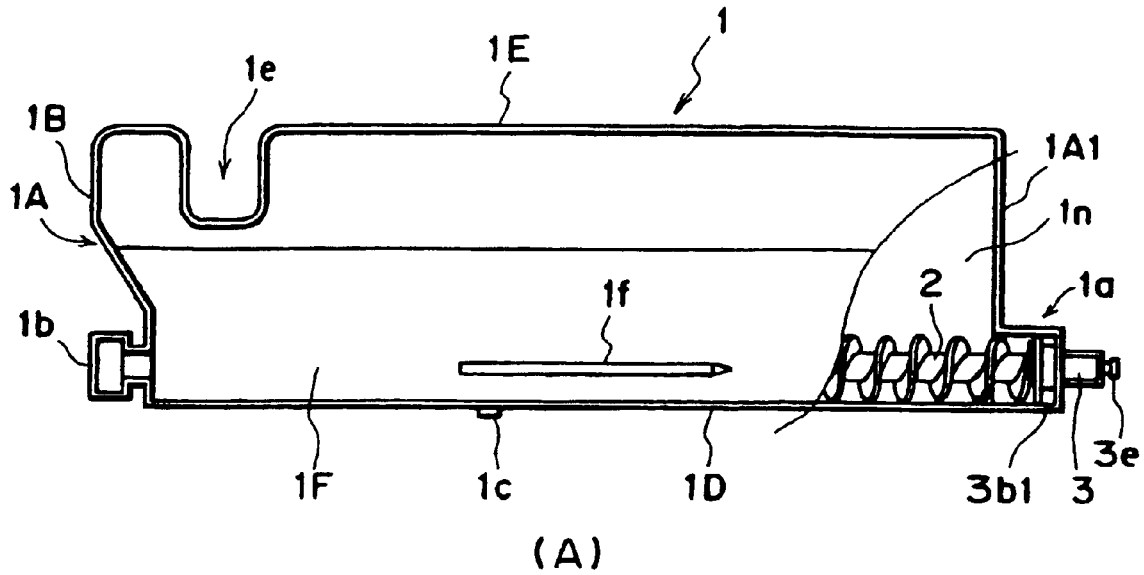
FIG. 4 shows a toner supply container according to the first embodiment of the present invention, wherein (A) is a partially sectional front view thereof, (B) is a side view thereof, and (C) is a sectional side view thereof.
Figure 4:
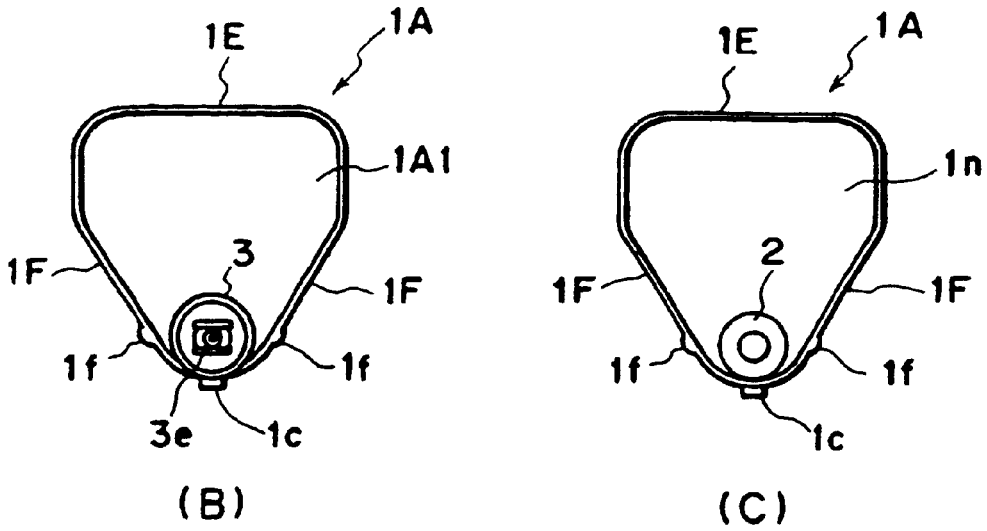
Figure 5:
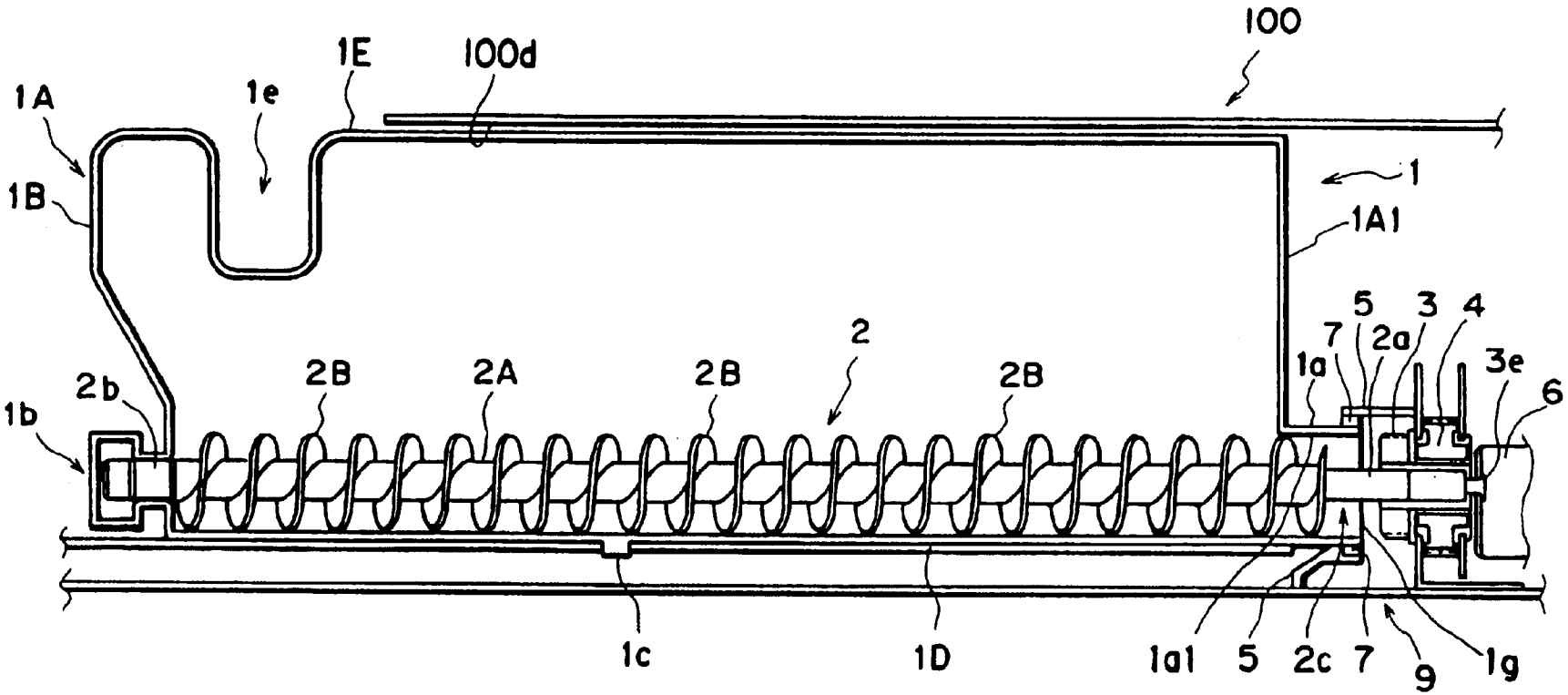
FIG. 5 is a sectional front view of the toner supply container which is mounted to the image forming apparatus, and is unsealed (opened).

Referring to FIGS. 4 and 5, the toner supply container according to the first embodiment of the present invention will be described. In FIG. 4, (A) is a partially sectional front view of the toner supply container of this embodiment. (B) is a side view of the toner supply container. (C) is a sectional side view of the toner supply container. FIG. 5 is a sectional front view wherein the toner supply container is loaded in the main assembly of the apparatus, and it has been unsealed.

In FIGS. 4 and 5, designated by 1A is a main part of the toner supply container (main body of the container). The powder toner is to develop the electrostatic latent image formed on the drum 104, and may be one component toner, two component toner or another. Designated by 2 is a feeding member for supplying the powder toner accommodated in the main body 1A of the container to the toner hopper 201a which is a receiving portion mounted to the main assembly 100. Designated by 3 is a sealing member designated by, 4 is a coupling member, and denotated by 9 is a toner receiving port provided in the toner hopper 201a in the main assembly 100. The toner discharged from the toner supply container 1 is fed into the toner hopper 201a from the receiving port 9. The structure may be such that toner discharged from the toner supply container 1 is fed directly into the developing device 201b not through the toner hopper 201a.

The main body 1A of the toner supply container includes a curved portion 1F having a width which decreases toward the bottom, and a flat surface portion 1G having a substantially constant width, and an arcuate configuration portion 1H extending down from the flat surface portion. Here, the term "lower portion" refers to the portion which assumes the lower portion of the device when the toner supply container 1 is mounted to the main assembly 100 of the apparatus, and the bottom surface, the upper surface, the lower surface and the side surface are the surfaces which are the bottom surface, the upper surface, the lower surface and the side surface when the toner supply container 1 is mounted to the main assembly 100. The toner supply container 1 is shown in the same position as when it is mounted to the main assembly of the apparatus in FIGS. 4, 5, 14, 15, 16, 21, 22, 23, 24, 25, 26 and 39.

On a lower portion of a side surface 1A1 of the main assembly 1A of the container, a cylindrical toner supply port portion 1a for supplying the toner accommodated in the toner accommodating portion 1n into the main assembly of the apparatus, is formed as a projection. At one end portion of the toner supply port portion 1a, a toner supply port 1g is provided. A receiving portion 1b is formed to rotatably support the feeding member 2 at a position corresponding to the toner supply port portion 1a in the other side surface 1B. At an outside of the bottom surface 1D, there is provided an engaging portion 1c for engagement with an opening and closing means for the toner supply port, which is provided in the main assembly 100 and which will be described hereinafter, to move the toner supply container 1 in the mounting and demounting direction. In this embodiment, the engaging portion 1C is in the form of a dowel projected outwardly from the bottom surface 1D. The upper surface 1E is provided with a recess 1e for providing a grip for facilitating the use by the operator when the toner supply container 1 is mounted to the main assembly 100 of the apparatus and when it is demounted from the main assembly 100. On the front side and the lower inclined surface 1 of the back side, ribs 1f are extended parallel to each other to facilitate the handling of the main body 1A of the container when the user mounts the toner supply container 1 into the main assembly 100.

The main body 1A of the container may preferably be produced through injection molding, blow molding, injection blow molding or the like, of a plastic resin material, but another manufacturing method and/or material is usable. The main body 1A may be divided into two or more parts, and the manufactured parts may be welded or bonded to unify them.

In this embodiment, an upper frame and a lower frame which are manufactured respectively through injection molding of high impact polystyrene, are joined together by vibration welding.

On the other hand, the feeding member 2 functions to feed the toner accommodated in the main body 1A to the toner supply port 1g. The feeding member 2 includes, as shown in FIG. 5, a shaft portion 2A, and a rigid helical feeding blade 2B on the shaft portion 2A which functions as a feeding portion for feeding the powder toner in a predetermined direction by rotation of the shaft portion 2A. The feeding member 2 is mounted to the main body 1A of the container with the axis of the shaft portion 2A substantially coaxial with the center of the toner supply port 1g.

The feeding member 2 is not limited to a so-called screw type of this embodiment, but may be flexible blades mounted on the shaft portion 2A, for example. The shaft portion and the blades may be integrally molded. In this embodiment, the shaft portion 2A and the blades 2B are made of plastic resin material and are integrally molded.

In this embodiment, the feeding member 2 includes an extending portion 2C which extends into the cylinder portion of the toner supply port portion 1a. In this embodiment, the extending portion 2C is projected outwardly from the toner supply port portion 1a. The free end portion of the extending portion 2C projected outwardly receives a rotation force from the main assembly 100 of the apparatus. To accomplish this, the free end portion is provided with a sealing member 3 which is movable in the axial direction.

As will be described in detail hereinafter, the sealing member 3 has four functions in this embodiment. More particularly, the four functions are (1) to seal the toner supply port portion 1a; (2) to receive the rotation force transmitted from the main assembly 100; (3) to transmit the rotation force to the feeding member 2; and (4) to engaged with an engageable member 6 provided in the main assembly of the apparatus to open and close the toner supply port portion 1a. The driving force received by the sealing member 3 from the main assembly 100 is transmitted to the shaft portion 2A through the extending portion 2C to rotate the feeding member 2.

The one end portion 2a of the extending portion 2C has a configuration which can receive the rotation force through the sealing member 3 from the main assembly 100, and it is H-shaped in this embodiment. The one end portion of the shaft portion 2A is supported by a sealing member 3 through a one end portion 2a of the extending portion 2C. The other end portion 2b of the shaft portion 2A is rotatably engaged with a receiving portion 1b of the main body 1A of the container, so that feeding member 2 is rotatable when the container is unsealed.

The feeding member 2 is supported by the sealing member 3 in such a manner that feeding blade 2B is out of contact with the internal wall surface 1a1 of the toner supply port portion 1a and that shaft portion 2a and the internal wall surface of the toner supply port portion 1a are substantially horizontal. By supporting the feeding member 2 in such a manner, the toner can be fed substantially horizontally toward the toner supply port 1g when the feeding member 2 is rotated. If the fine toner particles are sandwiched between the internal wall surface 1a1 of the toner supply port portion 1a and the feeding blade 2B and are rubbed therebetween, the toner may be fused on the internal wall surface 1a1, or the toner may be aggregated. These actions can be avoided.

The feeding member 2 may preferably be manufactured through injection molding or the like from a plastic resin material, as has been described, but another method or material is usable. It may be divided into a plurality of parts which are separately manufactured, and then are joined.

Figure 6:
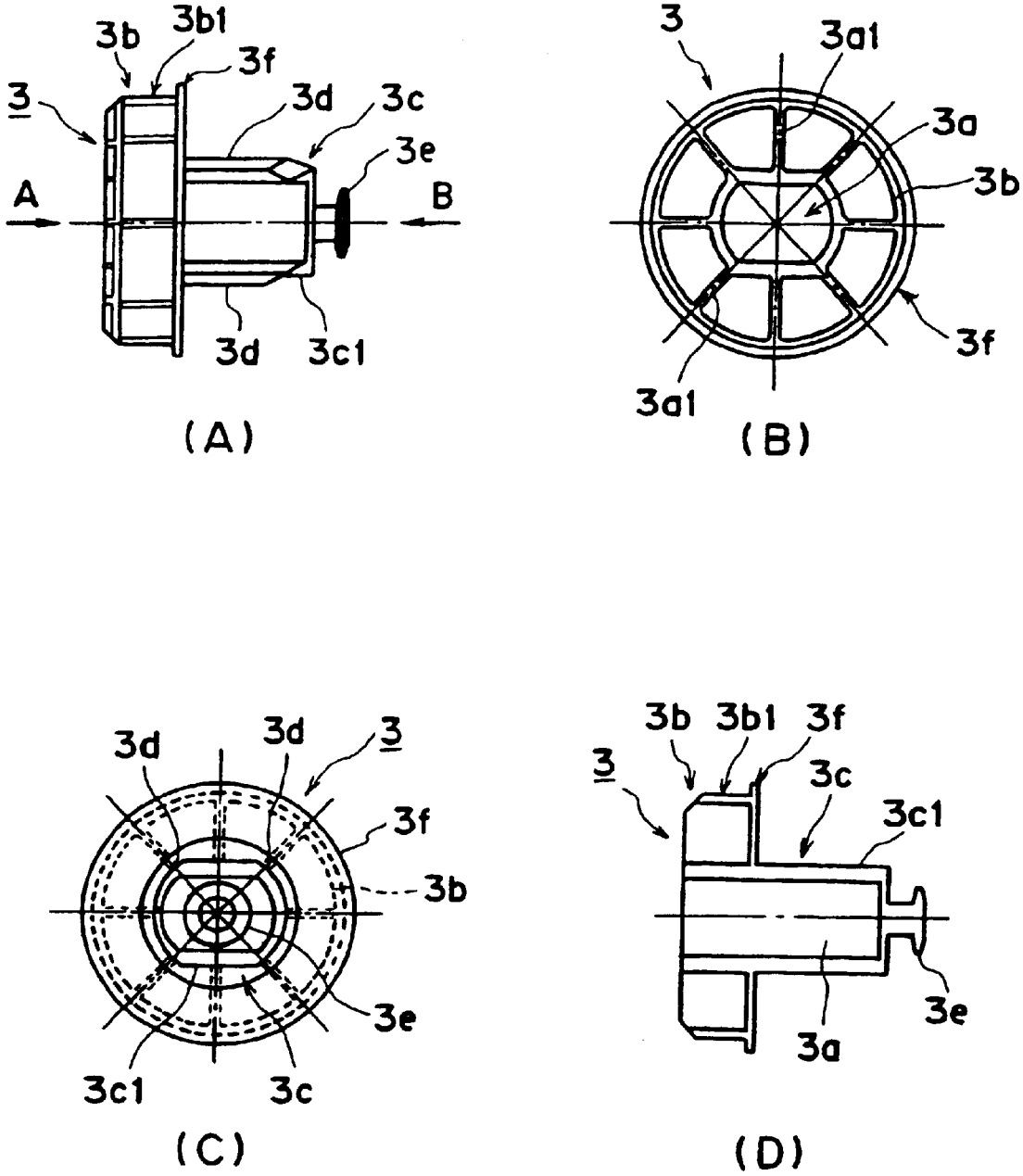
FIG. 6A shows a sealing member for the toner supply container, wherein (B) is a front view thereof, (C) is a view taken along a line A or (B), and (D) is a view taken along a line B.

Referring to FIG. 6, the sealing member 3 with be described. In FIG. 6, (A) is a front view of the sealing member; (B) is a perspective view as seen in the direction A in (A); (C) is a view in the direction B in (A); and (D) is a sectional front view.

In (A)–(D) of FIG. 6, designated by 3b is a sealing portion, provided at its side closer to the toner supply container, for openably sealing the toner supply port 1g of the toner supply container 1. The outer diameter of the sealing portion 3b is larger than the inner diameter of the toner supply port 1g. Therefore, the sealing member 3 seals the toner supply port 1g by press-fitting the engaging portion 3b1 of the sealing portion 3b into the toner supply port portion 1a through the toner supply port 1g.

Designated by 3c is a coupling engaging portion which functions as a driving force receiving portion for receiving a driving force for rotating the feeding member 2 from the main assembly 100 of the apparatus when the toner supply container 1 is mounted to the main assembly 100. The coupling engaging portion 3c is provided with a projected portion 3c1 extended coaxially with the shaft portion 2A of the feeding member 2 in the direction away from the main body 1A from the sealing portion 3b (when the sealing member 3 is mounted to the main body 1A of the container). The coupling engaging portion 3c is provided with elongated spline projections (rib) 3d on the peripheral surface of the projected portion 3c1, which projections function as a driving force receiving portion engageable with the coupling member 4. In this embodiment, four of such spline projections are provided circumferentially equidistantly.

The sealing member 3 is provided with an engaging hole 3a functioning as a driving force transmitting portion for transmitting, to the feeding member 2, the driving force from the main assembly 100 by engagement with one end portion 2a of the feeding member 2, and the engaging hole 3a is in the form of an opening (hole) formed in the sealing portion 3b and the coupling engaging portion 3c. The engaging hole 3a is H-shaped corresponding the H-shape of the shaft end 2a of the feeding member 2 projected from the powder toner supply portion 1a, and is slightly larger if than that of the shaft end 2a. By this, the shaft end 2a is loosely engaged with the engaging hole 3a.

By the shaft end 2a loosely engaged with the engaging hole 3a, the feeding member 2 and the sealing member 3 are locked with each other in the rotational direction of the feeding member 2, while being movable relative to each other in the thrust direction. Thus, the sealing member 3 can be separated from the main body 1A of the container when the toner supply container is mounted to the main assembly, as will be described hereinafter, so that unsealing (opening) of the powder toner supply port 1g is accomplished.

The engagement length between the shaft end 2a and the engaging hole 3a is long enough to prevent disengagement between the sealing member 3 and the main body 1A of the container when the sealing member 3 is moved away from the main body. Therefore, even if the sealing member 3 is moved away from the main body 1A of the container, the feeding member 2 can receive the driving force through the sealing member 3 (coupling engaging portion 3C).

Between the coupling engaging portion 3c and the sealing portion 3b, there is provided a flange portion 3f abutting the end of the portion 1a for the toner supply when the sealing portion 3b is press-fitted into the port 1a. The outer diameter of the flange portion is substantially equal to the outer diameter of the toner supply port portion 1a. By the flange portion 3f, the sealing portion 3b is press-fitted into the toner supply port portion 1a through a distance corresponding to the length of the engaging portion 3b1.

Designating by 3e is a locking projection 3q functioning as a locking portion which is formed at an end of a coupling engaging portion and which is to be engaged with the locking member 6 in the main assembly 100 (FIG. 5), and by engagement between the locking projection 3e and the locking member 6, the sealing member 3 can be fixed when the powder toner supply port 1g is unsealed.

The sealing member 3 having such a structure may preferably be manufactured by injection molding of a resin material or the like, but another method and/or material is usable. The sealing member 3 is required to have a proper elasticity to press-fit in the toner supply port 1a and seal the port. The material is preferably a low density polyethylene, and other usable examples include polypropylene, high density polyethylene or the like.

As assembling method of the toner supply container 1 will be described.

In the assembling method of the toner supply container 1, the feeding member 2 is inserted into the lower portion of the main body 1A of the container through the toner supply port 1g (FIG. 5). Then, the predetermined amount of the toner (unshown) is filled into the main body 1A, and finally, the toner supply port 1g is sealed by a sealing member 3, by which the toner supply container 1 is accomplished. Thus, the assembling of the toner supply container 1 of this embodiment is very simple and easy, and the number of the manufacturing steps is very small.

The toner may be filled through the toner supply port 1g; alternatively, an additional toner filling port (unshown) may be formed at a proper portion of the main body 1A of the container, and the toner may be filled through the toner filling port, which is then sealed. Further alternatively, the main body 1A of the container may be divided into two or more parts, which are joined together after the toner is filled. Where the toner supply port 1g of the integrally formed main body 1A is also used a filling port, no additional cap or joining step after the filling is necessary.

In the toner supply port portion 1a, the feeding member 2 is extended, and therefore, it is preferable to have a size sufficient to permit smooth discharging of the toner. A description will be provided as to the ratio of the cross-sectional area of the lower supply port portion 1a and the cross-sectional area of the passing portion (shaft portion 2A) of the feeding member 2. The cross-sectional area of the toner supply port portion 1a is preferably not less than twice the cross-sectional area of the shaft portion 2A of the feeding member 2, and further preferably, not less than three times, and even further preferably not less than five times.

In this embodiment, it is about three times. In this embodiment, the toner supply port portion 1a is cylindrical, and therefore, the inner diameter of the toner supply port portion 1a is about three times the outer diameter of the shaft portion 2A of the feeding member 2.

On the other hand, if the inner diameter of the toner supply port portion 1a is too large, the toner contamination around the toner supply port 1g is significant, and the maintenance of the hermeticality during transportion or in the case of ambient condition change, may be difficult. Therefore, the inner diameter of the toner supply port portion 1a is preferably not more than 40 mm. In this embodiment, it is approximately 24 mm.

A description will be provided as to an exchanging method of the toner supply container.

When the toner is entirely consumed from the toner supply container 1 with the image formations, toner supply container emptiness detecting means (unshown) provided in the main assembly 100 of the apparatus detects it, and displays the event to the user on displaying means 100b (FIG. 2) such as a liquid crystal display.

In this embodiment, the toner supply container 1 is exchanged by the user through the following steps.

Figure 2:
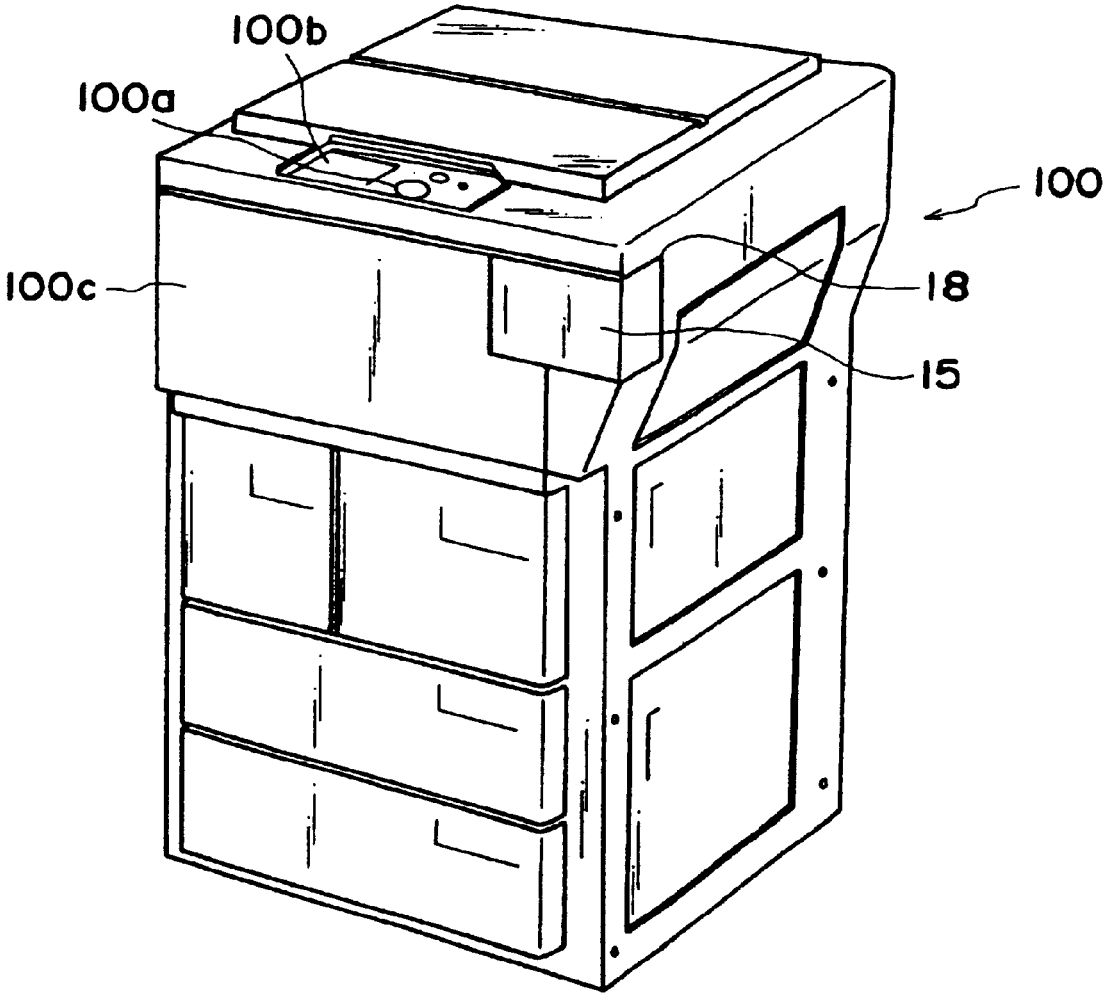
FIG. 2 is a perspective view of the electrophotographic copying machine.
Figure 7:
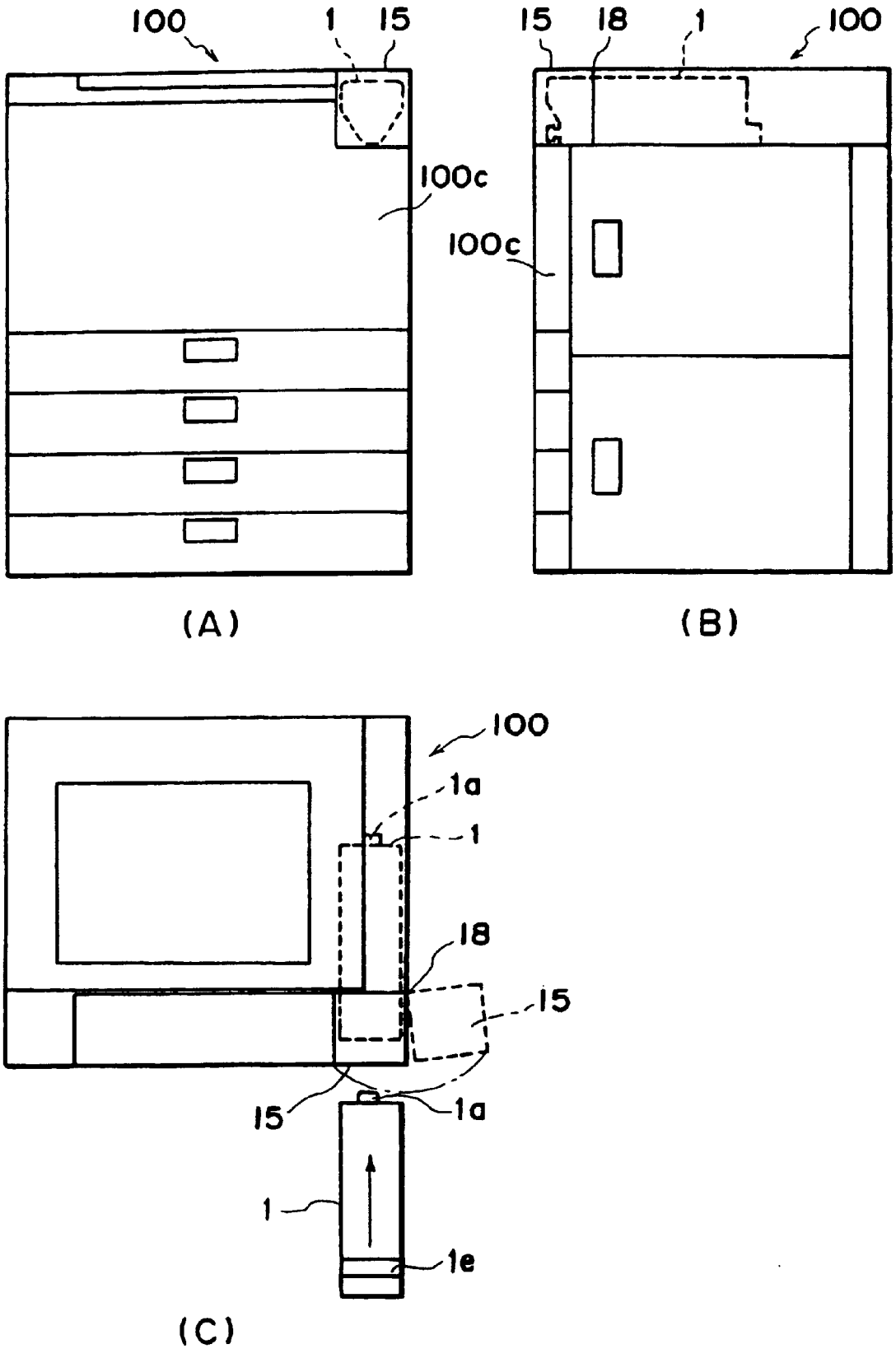
FIG. 7 shows the electrophotographic copying machine, wherein (A) is a side view thereof, (B) is a front view thereof, (C) is a top plan view thereof, wherein a cover for toner supply container exchange is opened.

As shown in (A) and (B) of FIGS. 2 and 7, the cover 15, which is at the time closed, is opened by rotating it about the hinge 18 to a position as shown in FIG. 3(C). The main body 1A is moved by toner supply portion opening means, which will be described hereinafter, in interrelation with the opening of the cover 15, and the sealing member 3 (FIG. 9) which is at the open position away from the main body 1A to open the toner supply port 1g, is press-fitted into the toner supply port portion 1a, by which the toner supply port 1g is closed (FIG. 8).

The user draws out the toner supply container 1 now not containing the toner from the main assembly 100 in the direction opposite from the direction indicated by the arrow in (C) to take it out of the main assembly 100. Thereafter, the user inserts the fresh toner supply container 1 into the main assembly 100 in the direction of the arrow, and then closes the cover 15 ((A) and (B)). In interrelation with the closing action of the cover 15, the sealing member 3 is separated from the main body 1A of the container by toner supplying portion opening means, thus opening the toner supply port 1g. In this manner, the toner supply container is exchanged.

Figure 8:
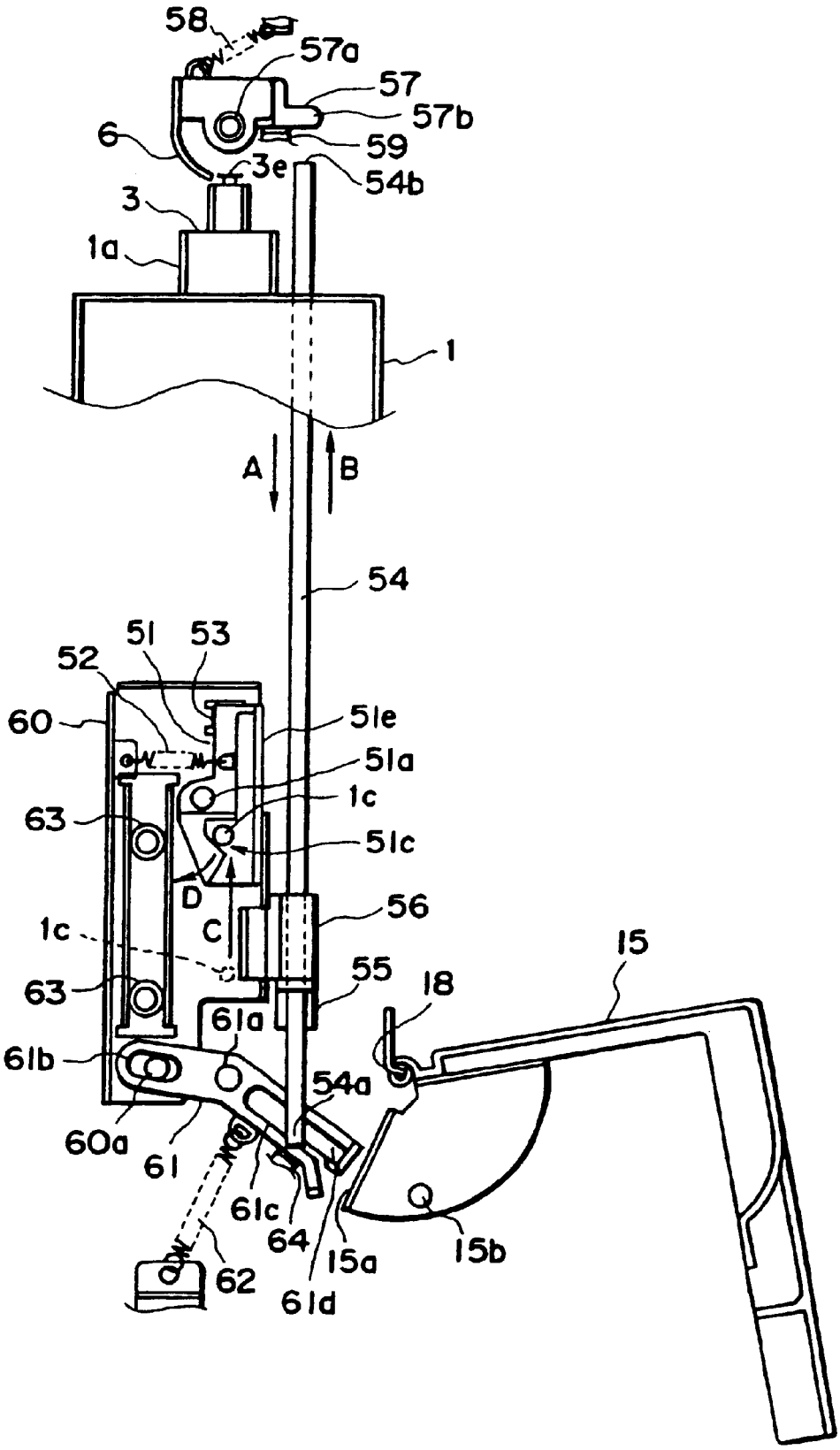
FIG. 8 illustrates toner supplying portion opening and closing means and the parts therearound when the cover is open.
Figure 9:
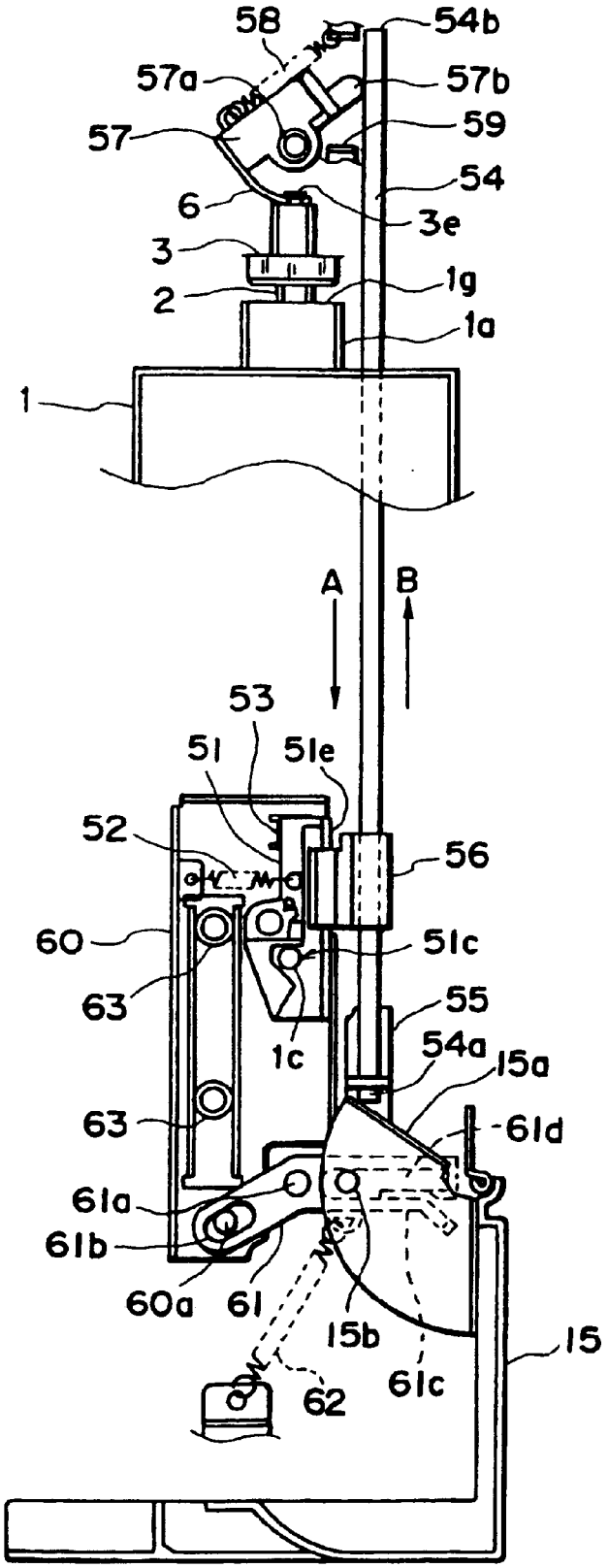
FIG. 9 illustrates toner supply port opening and closing means and the parts therearound when the cover is closed.

Referring to FIGS. 8 and 9, a description will be provided as to opening and closing operation of the toner supply port 1g, which is interrelated with the opening and closing operation of the cover 15. The structures in the following description are provided in the main assembly 100 of the apparatus. In FIGS. 8 and 9, designated by 6 is a locking member functioning as locking means for locking the sealing member 3 by engagement with the locking projection 3e of the coupling engaging portion 3c. Designated by 57 is a supporting table having the locking member 6 mounted thereto, and the supporting table 57 is rotatable about a rotation shaft 57a, and is urged in the clockwise direction by the urging member 58. Designated by 59 is a stopper for positioning the supporting table 57.

Designated by 60 is a slide table which is slidable by a rotatable roller 63. Designated by 51 is a container chucking member provided on the slide table 60, and the container chucking member 51 is rotatable about the rotation center 51a, and is urged in the counterclockwise direction by a spring 52. Designated by 53 is a stopper for positioning the container chucking member 51.

The toner supply container moving member is constituted by the container chucking member 51 and the slidable table 60. The toner supply port opening and closing means is constituted by the container chucking member 51, the slide table 60 and the locking member 6.

On the other hand, the container chucking member 51 is provided with a locking portion 51c for locking the engaging projection 1c of the main body 1A of the container. When the engaging projection 1c advances in the direction indicated by the arrow C as shown in FIG. 8 upon the insertion of the toner supply container 1 into the main assembly 100 of the apparatus, the container chucking member 51 rotates against the elastic force of the spring 52 in the direction of the arrow D. When the engaging projection 1c enters the locking portion 51c, the chucking member 51 returns by the elastic force of the spring 52 to lock the engaging projection 1c. When the chucking member 51 locks the engaging projection 1c, the toner supply container 1 is movable by the slide table 60 in the mounting-and-demounting direction (arrows A and B in FIGS. 7, 8).

Designated by 54 is a slide shaft which is supported by supporting means (unshown) for sliding motion in the axis direction. The slide shaft 54 is urged in the direction away from the supporting table 57 (downward direction in FIG. 8) as indicated by arrow A by an urging member (unshown). The position thereof is determined by the shaft stopper 55.

Designated by 56 is a locking member mounted to the slide shaft 54. When the slide shaft 54 slides in the direction of the supporting table 57 as indicated by the arrow B, the locking member 56 is brought into engagement with the rib portion 51e of the container chucking member 51 to lock the container chucking member 51. The arrow A direction is the direction of demounting the supply container 1 from the main assembly 100 of the apparatus, and the arrow B direction is the direction of mounting it to the main assembly of the apparatus.

The side table 60 is provided with a projection 60a formed therein. The projection 60a is engaged with an elongated hole 61b formed at one end portion of a swingable arm 61 which is swingable about a swing shaft 61a. The swingable arm 61 is urged in the clockwise direction by the elastic force of the urging member 62, and is positioned by the stopper 64. The other end portion of the swingable arm 61 is provided with a groove portion 61d having one open end.

The cover 15 is provided with a projection 15b which enters the groove portion 61d when the cover 15 is closed. By the projection 15b entering the groove portion 61d, the swingable arm 61 is swung in the anti-clock direction against the elastic force of the urging member 62 in interrelation with the closing operation of the cover 15.

The cover 15 for exchange is provided with a wall portion 15a, which abuts one end portion 54a of the slide shaft 54 when it is closed. By the wall portion 15a, the slide shaft 54 slides in the direction of the arrow B in interrelation with the closing operation of the cover 15. By the slide of the slide shaft 54 in such a manner, the other end 54b of the slide shaft 54 is abuts to the projection 57b of the supporting table 57. By this, the supporting table 57 and the locking member 6 rotate against the elastic force of the urging member 58, by which the locking member 6 locks the locking projection 3e of the sealing member 3.

With such structures, when the toner supply container 1 is inserted into the main assembly 100 of the apparatus as shown in (C) of FIG. 7, the engaging projection 1c of the main body of the container moves in the direction of the arrow C shown in FIG. 8. Thereafter, the engaging projection 1C is locked with the locking portion 51c of the container chucking member 51, and the fresh or new toner supply container 1 is mounted to the main assembly 100 with this state. In other words, the toner supply container 1 is correctly positioned in the main assembly 100 of the apparatus by the engaging projection 1C.

After the toner supply container 1 is thus mounted, the cover 15 is closed, and by this, the wall portion 15a of the cover 15 abuts one end portion 54a of the slide shaft 54, so that slide shaft 54 slides in the direction of the arrow B. Thereafter, the other end 54b of the slide shaft 54 abuts the projection 57b of the supporting table 57. By this, the supporting table 57 and the locking member 6 are rotated against the elastic force of the urging member 58, by which the locking member 6 locks the locking projection 3e of the sealing member 3.

The locking member 56 of the slide shaft 54 moves toward the container chucking member 51 with the sliding motion of the slide shaft 54 and engages with the rib portion 51e of the container chucking member 51. By doing so, the container chucking member 51 is locked.

When the cover 15 is closed to a predetermined position, the projection 15b of the cover 15 enters the groove portion 61d of the swingable arm 61 to swing the swingable arm 61 counterclockwisely against the elastic force of the projection 15b. By the swing of the swingable arm 61, the slide table 60 slides in the direction of the arrow A. By this, the toner supply container 1, which is locked by the container chucking member 51 at the engaging projection 1c, also slides in the same direction.

When the supply container 1 moves in the direction of the arrow A, the sealing member 3 is locked by the locking member 6 so that it is unable to move in the direction of the arrow A. Therefore, the main body 1A of the container is separated away from the sealing member 3, thus opening the toner supply port 1g as shown in FIG. 9. The toner supply port portion 1a, as shown in FIG. 5, is held by a holder 5 of the main assembly 100 with the outer periphery being sealed with an annular seal member 7. Therefore, when the supply container 1 is mounted to the main assembly 100, the position thereof is determined by the engaging projection 1C and the toner supply port portion 1a. In this embodiment, the sealing member 3 is supported at a position away from the toner supply port 1g. By doing so, it can be kept at a position away by a distance necessary to permit smooth discharge of the toner, depending on the coagulation property of the toner. Thus, the plugging adjacent the discharging outlet and various problems resulting therefrom can be avoided.

On the other hand, when the user opens the cover 15 after the toner in the toner supply container 1 is substantially entirely consumed, the projection 15b of the cover 15 is moved from the position shown in FIG. 9 to be abutted to the wall portion 61c of the swingable arm 61 to swing the swingable arm 61 clockwisely. Then, the slide table 60 slides in the direction of the arrow B, and the toner supply container 1 slides in the same direction.

At this time, the container chucking member 51 receives a force in the clockwise direction from the engaging projection 1c of the toner supply container 1. However, since the locking member 56 locks rotation of the container chucking member 51, the engaging projection 1c is prevented from disengaging from the container chucking member 51. Therefore, the toner supply container 1 slides until the toner supply port 1g abuts the flange portion 3f of the sealing member 3, by which the toner supply port 1g is closed.

Then, the cover 15 is further opened, the slide shaft 54 is moved to a predetermined position determined by the shaft stopper 55 since it is urged in the direction of arrow A by the urging means as described hereinbefore. With this, the locking member 6 rotates clockwise to be away from the sealing member 3. Therefore, the sealing member 3 is released by the locking member 6. The container chucking member 51 is released from locking of the locking member 56.

With this state, the toner supply container 1 is removable from the main assembly 100. Then, the toner supply container 1 can be taken out by pulling it in the direction of the arrow A. By the application of the pulling force in the direction of arrow A, the locking of the engaging projection 1c by the container member 51 is released.

As described hereinbefore, when the toner supply container 1 is mounted to the main assembly 100, the locking projection 3e of the sealing member 3 is locked by the locking member 6 and is supported away from the toner supply port 1g of the toner supply container 1. At this time, the engagement relation in the rotational direction between the sealing member 3 and the feeding member 2 is maintained.

Therefore, by the rotation received by the sealing member 3 from the main assembly 100, the feeding member 2 rotates to supply the toner gradually to the main assembly 100 through the toner supply port 1g. In the embodiment, a toner detection sensor 201g is provided on the toner hopper. When the detecting sensor 201g detects that there is no toner, the sealing member 3 rotates. When the detecting sensor 201g detects the presence of the toner, the rotation of the sealing member stops. In this manner, the sealing member 3 intermittently rotates in accordance with the consumption of the toner in the main assembly 100, so that toner is intermittently and gradually supplied into the main assembly 100. However, it is possible to supply all of the toner into the main assembly 100 when the toner supply container 1 is mounted to the main assembly 100.

On the other hand, when the toner supply container 1 is mounted to the main assembly, the coupling engaging portion 3c of the sealing member 3, as shown in FIG. 5, is engaged with the coupling member 4 of the main assembly 100. The coupling member 4 functions to transmit, to the sealing member 3, the driving force of the driving device (unshown) provided in the main assembly 100.

Figure 10:
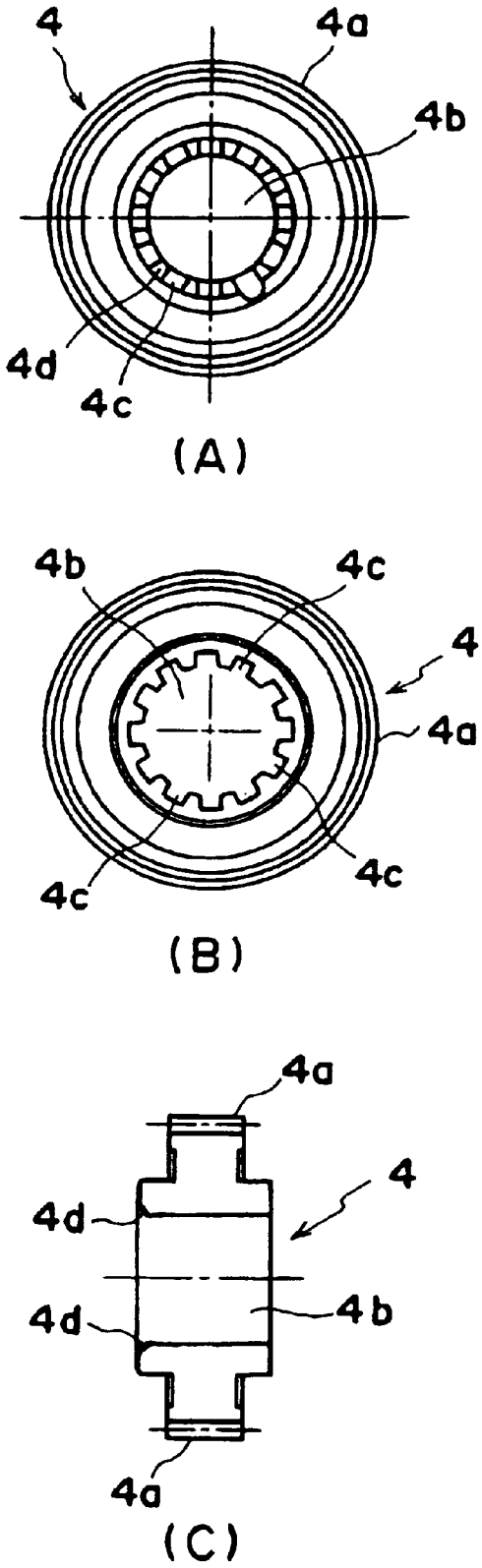
FIG. 10 shows a coupling member for the electrophotographic copying machine, wherein (A) is a front view thereof, (B) is a rear view thereof, and (C) is a sectional side view thereof.

FIG. 10 shows in detail the coupling member, wherein (A) is a front view of the coupling member, and (B) is a rear side view, and (C) is a sectional side view. In FIG. 10, designated by 4a is a gear portion formed at the outer surface of the coupling member 4. It receives the driving force from the main assembly 100 side through the gear portion 4a.

Designated by 4b is a receiving hole for receiving the sealing member 3, and it is formed at the center of the coupling member 4. The inner surface of the hole 4b is provided with an engaging groove 4c for engagement with the spline projections 3d of the sealing member 3. The end of the hole 4b opposed to the toner supply container 1 is provided with a tapered guiding portion 4d.

In this embodiment, four of such spline projections 3d are formed on the outer curved surface of the sealing member 3, equidistantly. Additionally, twelve engaging grooves 4c are formed in the coupling member 4. The number of the engaging grooves 4c is larger than the number of the projections 3d, and guiding portions 4d are provided, so that when the toner supply container is mounted to the main assembly, they can be assuredly engaged even if a phase difference exists between the spline projections 3d and the engaging grooves 4c. The number of the projections 3d of the sealing member 3 is not limited to four, but may be properly selected by one skilled in the art. The same applies to the number of the engaging grooves 4c, and is not limited to 12.

A description will be provided as to discharging of the toner.

The coupling member 4 receives the rotation force through the drive transmitting means (unshown) such as gear or the like from the driving source, such as a motor or the like of the main assembly 100. The driving force is transmitted to the sealing member 3 through the engagement between the spline projection 3d and the engaging groove 4c, and is transmitted to the feeding member 2 through the engagement between the H-shaped free end 2a and the H-shaped engaging hole 3a. In this embodiment, the rotational speed of the feeding member 2 is 25 rotations per minute.

When the feeding member 2 is rotated, the toner accommodated in the main body 1A of the container is fed toward the toner supply port 1g, and thereafter, falls from the toner supply port 1g into the toner hopper 201a through the toner receiving port 9 of the main assembly 100. The portion from the toner supply port 1g to the toner receiving port 9 is hermetically sealed by the seal member 7 as described hereinbefore, and therefore, the toner discharged from the toner supply port 1g is prevented from leaking to the outside or from scattering.

A rotational sliding portion exists at a portion where the sealing member 3 and the main assembly 100 are contacted but the portion is away from the toner supply port portion 1a, and therefore, it is not contacted directly with the toner, so that coagulation of the toner or the like does not result. The position of the rotational sliding portion can be away from the toner supply port portion 1a by a proper distance in accordance with the flowability of the toner, the feeding power of the feeding member 2, and the discharging speed of the toner.

The present invention is not limited to any detail of the first embodiment.

For example, the disengagement method of the sealing member 3 may be such that main body 1A side is moved while the sealing member 3 is fixed, or may be such that sealing member 3 is moved while the main body 1A of the container is fixed. However, the sealing member 3 is given the rotation force from the main assembly 100 as described hereinbefore. Therefore, when the sealing member 3 is moved while fixing the main body 1A of the container, the mechanism is more complicated, and therefore, the sealing member 3 is preferably fixed.

The rotational speed of the feeding member 2 is properly selected by one skilled in the art in accordance with the toner feeding amount, but if it is too high, the load of the driving source of the main assembly 100 or the drive transmission mechanism is increased, and if it is too low the toner cannot be sufficiently fed. Preferably, it is 3–100 rotations per minute, and further preferably, 5–50 rotations per minute.

The configuration of the main body 1A of the container may be any if the space can be efficiently used, and the size and capacity of the toner container can be selected properly one skilled in the art. Even if the toner amount is as large as approximately 2 kg, for example, what is rotated is only the feeding member 2, and therefore, the required rotation torque is as small as 2–3 kgf-cm. The sealing member 3 is press-fitted into the toner supply portion 1a, but a seal member may be used to seal the portion, or a threaded portion corresponding to the main body 1A and the sealing member 3 may be used to seal the portion.

Figure 11:
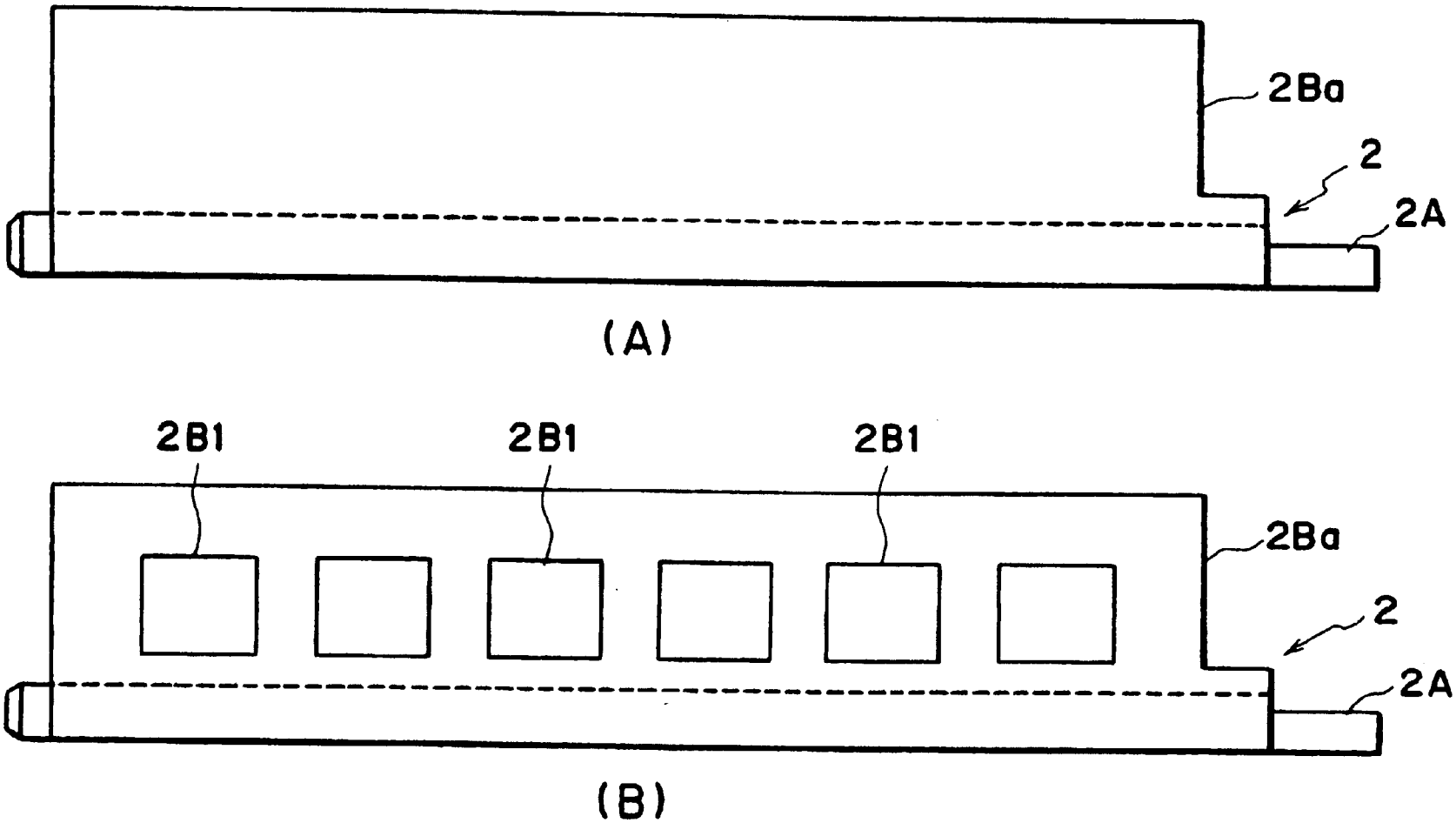
FIG. 11 shows a feeding member, wherein (A) is a front view of the feeding member mounted to a shaft portion of the feeding member of the toner supply container, and (B) is a front view of a feeding member provided with a port.

In the first embodiment, the feeding element of the feeding member 2 is of a helical shape which has a high feeding power, but the helical shape is not inevitable. For example as shown in FIG. 11, (A), a blade portion 2Ba in the form of a film as a feeding element may be mounted on the shaft portion 2A. In such a case, the toner is discharged using the flowability of the toner. As shown in FIG. 11 (B), the blade portion 2Ba may be provided with a window 2B1 by which the driving torque of the feeding member 2 can be reduced.

A second embodiment of the present invention will be described wherein the toner supply container 1 has a feeding member 2 provided with such a blade portion.

Figure 12:
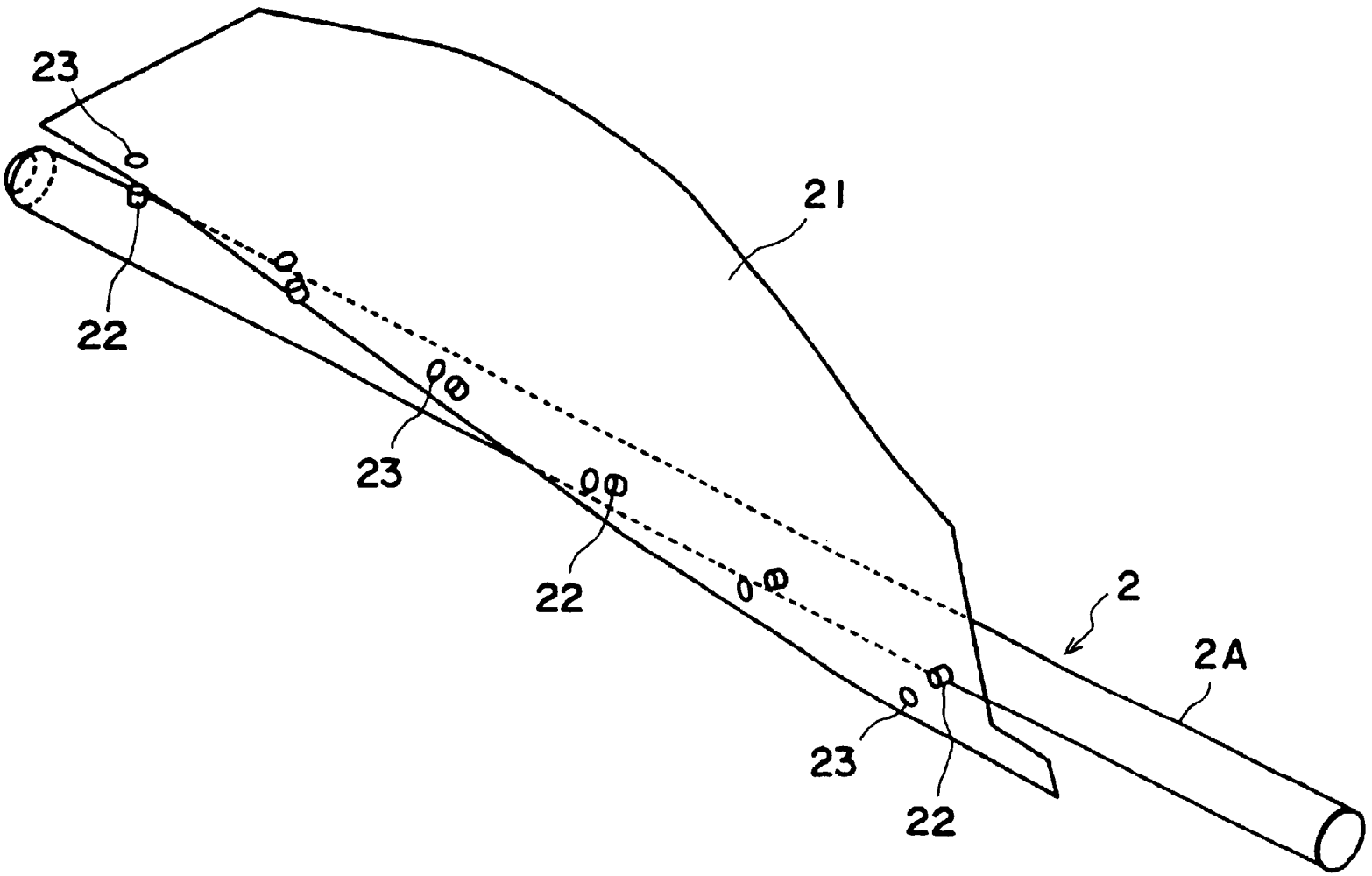
FIG. 12 is a perspective view of a feeding member of a toner supply container according to a second example of the first embodiment of the present invention.

FIG. 12 is a perspective view of the feeding member 2 for the toner supply container according to the second embodiment. In this Figure, designated by 21 is a blade portion of the feeding member 2 mounted such that the phase thereof is continuously changed in the axial direction of the shaft portion 2A. The feeding member 2, provided with such a blade portion 21, is preferably formed integrally through injection molding or the like, but may be divided into two or more parts which are unified by welding or bonding or the like.

As a material of the shaft portion 2A when the feeding member 2 is divided into two parts, there are plastic resin material, metal or the like having a rigidity. The blade portion 21 is preferably made of a sheet material having a flexibility. More particularly, it may be made of single layer material or multiple layer material of polyester, polypropylene, Nylon, polyethylene or fluorine resin material. The thickness of the blade portion 21 is preferably approximately 50 $\mu$m–1 mm.

In this embodiment, a polyester sheet having a thickness of 188–250 $\mu$m is satisfactorily used.

The configuration of the blade portion 21 is not necessarily a particular shape such as trapezoidal shape, but what is needed is that the length from the center of rotation of the shaft portion 2A to the free end of the blade portion 21 is substantially constant along the total length of the blade portion 21 (as with rectangular configuration for example). From the standpoint of assembling property of the feeding member 2, the blade portion 21 is an integral member along its entire length.

Therefore, an integral blade portion 21 is preferable, and by doing so, the material can be efficiently used since the blade portion 21 can be cut out from a blank. When the toner is caked in the main body 1A of the container as a result of the main assembly 100 being kept unused for a long term, the toner can be continuously scraped off and efficient toner discharging is accomplished when the blade portion 21 is integral.

A description will be provided as to the mounting method of the blade portion 21 to the shaft portion 2A.

When the feeding member 21 is constituted by the shaft portion 2A and the blade portion 21, it is required that blade portion 21 is mounted to the shaft portion 2 with a twist relative to the axial direction of the shaft portion 2A so that the phase is continuously changed relative to the axial direction of the shaft portion 2A.

As for the mounting method, as shown in FIG. 12, the drum portion of the shaft portion 2A is provided with crimp bosses 22 at several portions to permit mounting of the blade 2B. On the other hand, the blade portion 21 is provided with a crimp hole portion 23 for receiving the crimp bosses 22 of the shaft portion 2. The crimp bosses 22 are engaged in the crimp hole portions 23, and they are coupled and unified by a heat crimp or an ultrasonic crimp.

Figure 13:
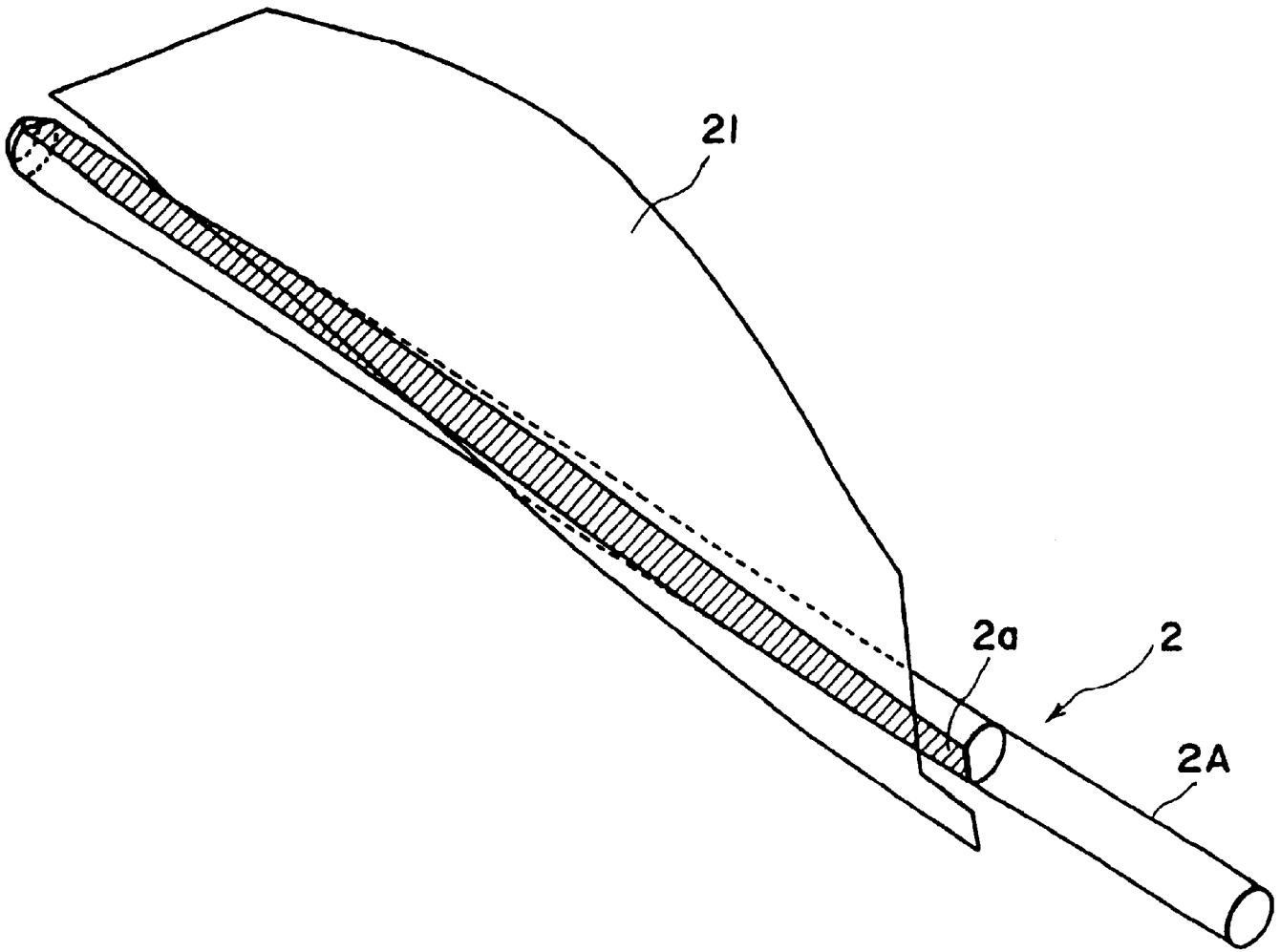
FIG. 13 illustrates an example of assembling of the feeding member according to the first embodiment.

On the other hand, when the blade mounting surface of the shaft portion 2A is twisted relative to the axial direction, as shown in FIG. 13, the mounting surface 2d (hatched portion) of the blade portion 21 of the shaft portion 2 is continuously changed with respect to the axial direction of the shaft portion 2A. Then, the blade portion 21 is mounting to and unified with the shaft portion by adhesive material or double coated tape or the like on the surface 2d.

In any of the types, it is preferable that the phase difference of the blade portion 21 relative to the axial direction is approximately 90 degrees.

Figure 14:
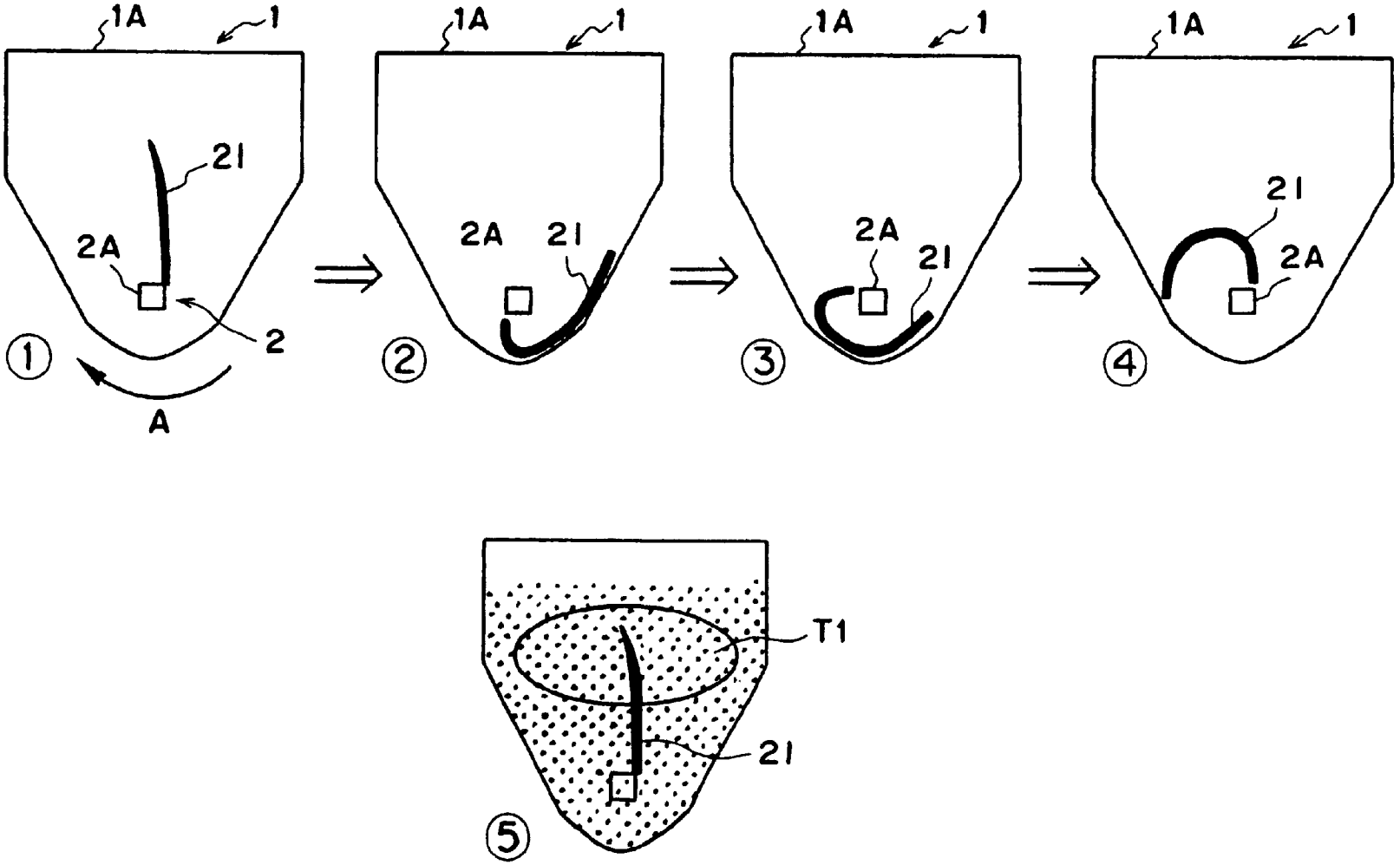
FIG. 14 is a sectional view of a container and illustrates a toner discharging operation of the toner supply container according to an embodiment of the present invention.
Figure 15:
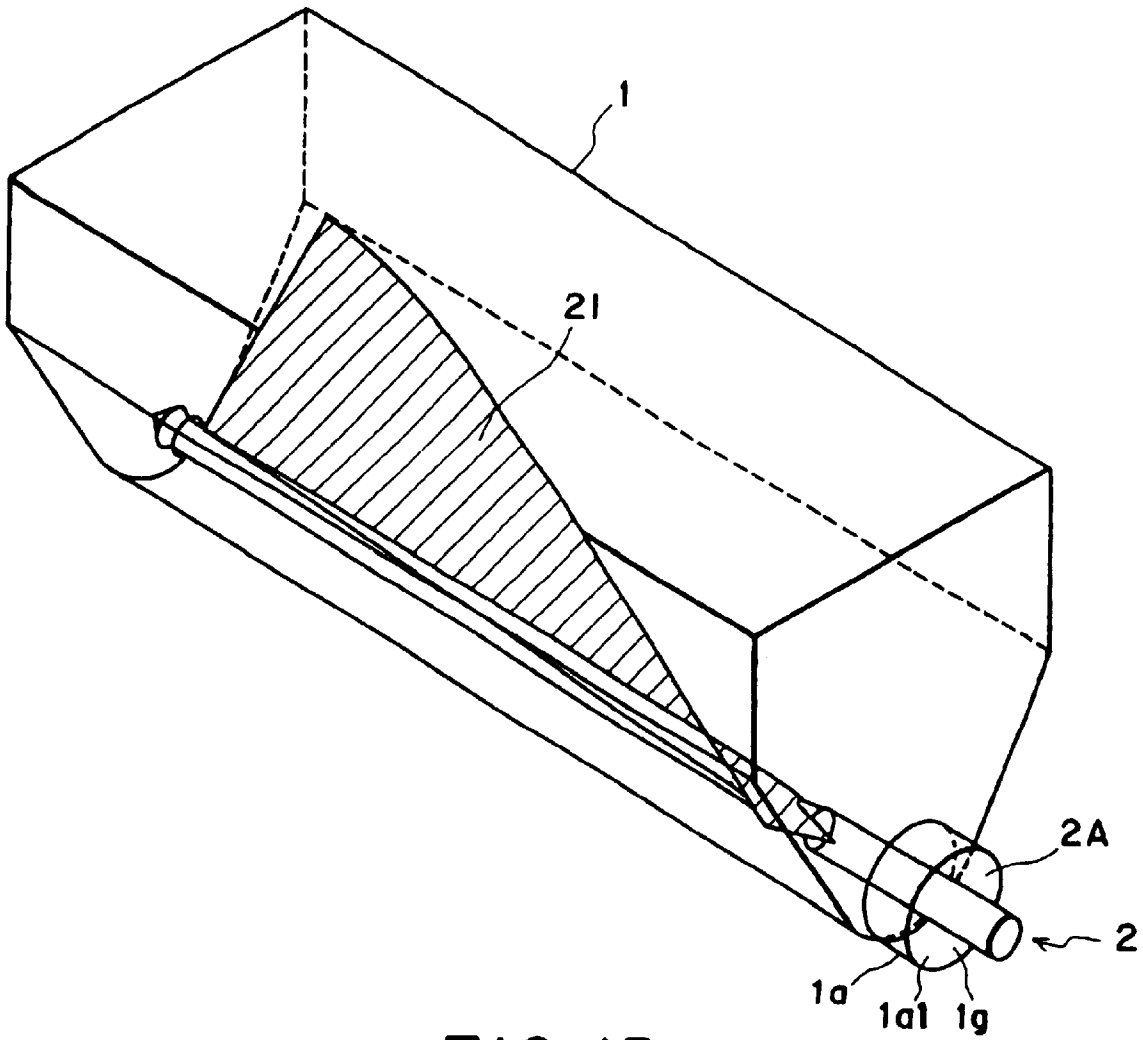
FIG. 15 is a perspective view illustrating a toner discharging principle of the toner supply container according to this embodiment.

Referring to FIG. 14, the toner discharging operation of the feeding member 2 having the above-described structures will be described.

By rotation, through 0–360 degrees, of the shaft portion 2A of the feeding member 2 in the direction of arrow A in (1) of this figure, the entirety of the feeding member 2 sequentially rotates in the order of (1)→(2)→(3)→(4)→(1). During the rotation (1)→(2), the blade portion 21 is flexed and curved while entering the space formed between the inner lower surface of the main body 1A of the container and the shaft portion 2A. The blade portion 21 rotates through (2)→(3)→(4) while rubbing the inner lower surface of the main body 1A of the container.

At the time, since the phase of the blade portion 21 continuously changes in the direction of the axis of the shaft portion 2A, the degrees of flexing of the blade portion 21 are different between the axial ends of the blade portion. Therefore, the toner feeding function in the axial direction of the shaft portion 2A is produced, so that toner is fed in the longitudinal direction (lateral direction of the main assembly) of the main body 1A of the container.

Since the blade portion 21 contacts to the inner lower surface of the main body 1A of the container, the toner can be effectively fed even when the toner amount in the main body 1A of the container decreases, and as a result, the remainder toner amount can be reduced after the end of the toner discharge therefrom.

Furthermore, the toner is fed toward the discharging outlet by the spring-back action of the blade portion 21 at the time of (4) to (1) in FIG. 14. Thus, in addition to the toner feeding effect by the flexibility of the blade portion 21 at the time of contact thereof to the inner lower surface of the main body 1A of the container, the spring-back effect of the blade portion 21 further feeds the toner, and therefore, the toner can be further efficiently fed.

As shown in FIG. 14, (5), by providing sufficient length from the shaft portion 2A to the free end of the blade portion 21, cake toner T1 can be uncaked by the elasticity of the blade portion 21. Thus, this embodiment is unusable with a container of the type wherein the height of the main body 1A is so large that toner supply port portion 1a takes a position below the main body 1A of the container, so that the latitude is enhanced to reduce the limit to the configuration, by which the space in the main assembly of the image forming apparatus can be effectively utilized.

Toner discharging experiments have been carried out using the toner supply container 1 of the above-described structure, and it was confirmed that stable toner discharging property (toner discharging amount per unit time) was accomplished, and the remainder toner amount in the container after the end of the discharge was as small as approximately 10 g. The initial torque required for the rotation of the feeding member 2 was approximately 2 kgf-cm. In the experiments, the blade portion 21 of the feeding member 2 was of a polyester sheet having a thickness of approximately 188 $\mu$m, and was mounted to the shaft portion 2A of ABS resin material using a double coated tape. The main body 1A of the container contained approximately 1,500 g of the toner, and the feeding member 2 was rotated at the speed of rotational frequency approximately 30 rotations per minute to toner discharge the toner.

The rotational speed of the feeding member 2 was changed in the range of 20–50 rotations per minute, and the discharging property change was checked, and it was found that toner discharging amount per unit time increased with an increase of the rotational speed. It therefore was found that the toner discharging amount per unit time can be controlled by controlling the rotational speed of the feeding member 2.

As a case of caked toner in the main body 1A of the container, the main body 1A of the container was tapped after the toner was filled, and thereafter, the discharging experiments were carried out. More particularly, the container filled with the toner, was fixed on a tapping table with the same pose of the container as in the toner discharge, and the tapping table was let fall 1000 times from the height of 10 mm and the frequency of 2 Hz.

As a result, the toner discharging property and the remainder toner amount were substantially the same as with the experiments without the tapping, so that it was confirmed that toner can be efficiently discharged while uncaking the caked toner. The required initial torque for the rotation of the feeding member 2 is slightly higher (approximately 5 kgf-cm), but is not so high that driving source is overloaded.

The rotation torque is a maximum when the blade portion 21 enters the caked toner (between (1) and (2) in FIG. 14). When the feeding member 2 has such a structure that the phase of the blade portion 21 in the axial direction is changed, the timing of the blade portion 21 entering into the toner is different in the axial direction, so that the rotation torque can be reduced.

In this embodiment, the phase of the blade portion 21 is changed in the axial direction, and therefore, even if a part of the blade portion 21 is in the state shown in FIG. 14. (3), the state of (1) in FIG. 14 exists in another portion, so that blade portion 21 is prevented from winding around the shaft portion 2A.

Thus, according to the present invention, the blade portion is prevented from winding around the shaft portion.

Figure 16:
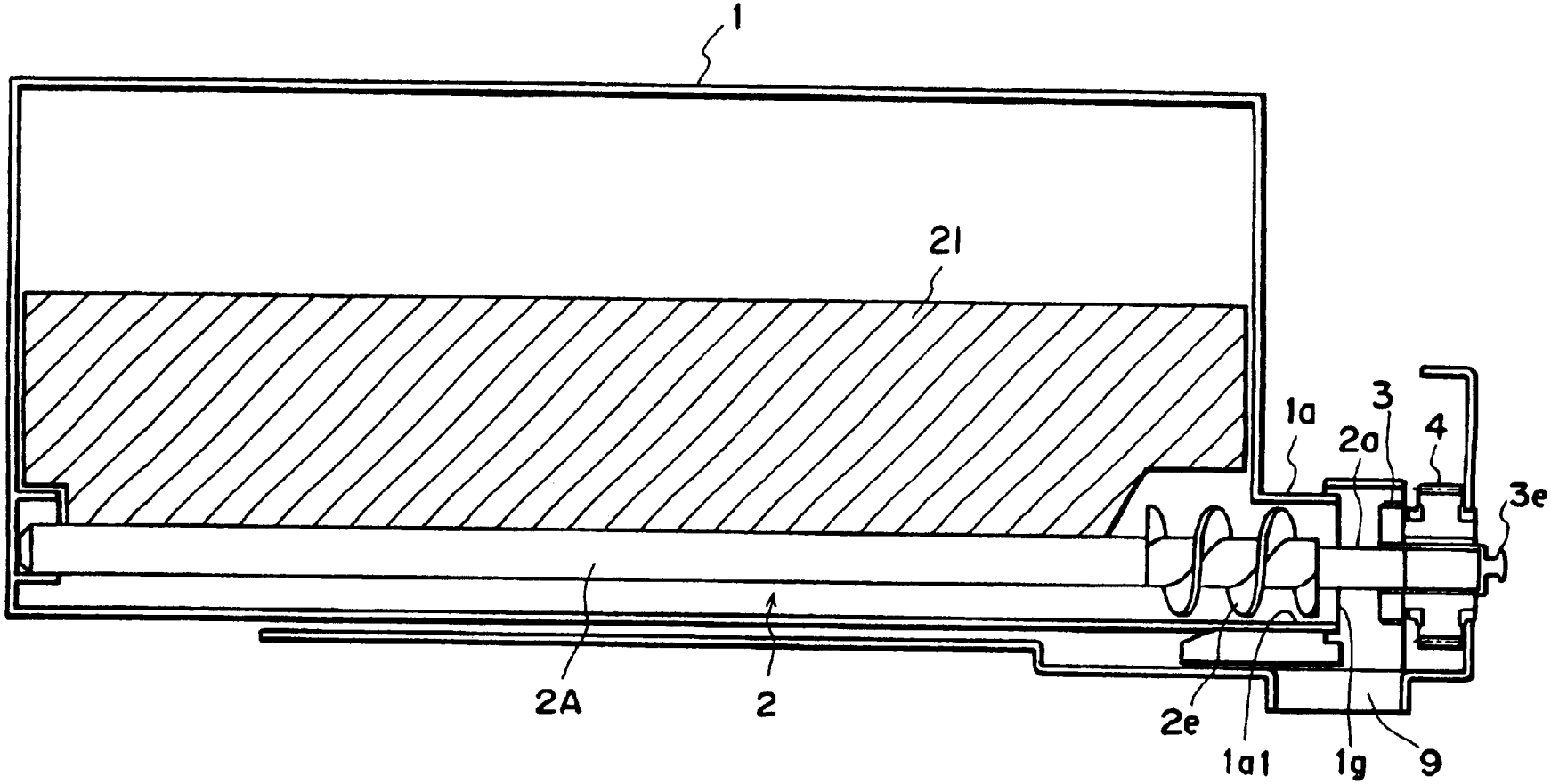
FIG. 16 illustrates a structure of the feeding member according to a second example of this embodiment.

FIG. 16 shows a feeding member 2 according to the second embodiment wherein a screw number 2e is added to the structure of FIG. 12 adjacent the toner supply port portion 1a of the feeding member 2. In the other respects, the structures of this embodiment is the same as that of the first embodiment, and the toner discharging experiments were carried out under the same conditions using the toner supply container 1 of the first embodiment.

As a result, the toner discharging property was better than in the first embodiment, and the remainder toner amount after the end of the toner discharge was approximately 10 g. As a result of the addition of the screw member 2e, the variation of the toner discharging amount was 5–10 g/min., which was better than 10–20 g/min. In the first embodiment, and the improved stability of the toner discharging amount was confirmed. The required initial torque for the rotation of the feeding member 2 was approximately 4 kgf-cm.

The rotational speed of the feeding member 2 was changed in the range of 20–50 rotations per minute, and the change of the discharging property was checked, and it was found that toner discharging amount per unit time increased with the increase of the rotational speed. It therefore was found that the toner discharging amount per unit time can be controlled by controlling the rotational speed of the feeding member 2.

The toner discharging amount per unit time was stable from the initial stage to the final stage of the toner discharging when the toner was caked before the toner discharge by tapping the container and when the toner was uncaked by shaking the supply container 1 by the use before it is mounted to the main assembly 100 of the apparatus. For example, when the feeding member 2 is rotated at 36 rpm, the toner discharging amount was 70–100 g/min, irrespective of the state of the toner beforehand. When the toner is not caked and loose, the toner having high flowability tends to rush into the discharging outlet (toner supply port 1g) and discharges at an unnecessarily high speed (flushing), but such a phenomenon does not occur with the embodiment of FIG. 16. This is because at least one full turn of the screw member 2e having the helical configuration is disposed in the cylindrical toner supplying portion 1a so that rushed toner can be properly stopped thereby.

Discharging experiments were carried out for the toner supply container 1 filled with the toner after it was tapped 1000 times. As a result, the toner discharging property and the remainder toner amount in the container were similar to the case without the tapping. The required initial torque for the rotation of the feeding member 2 is slightly higher (approximately 8 kgf-cm), but it is not so high that driving source is overlooked.

Figure 17:
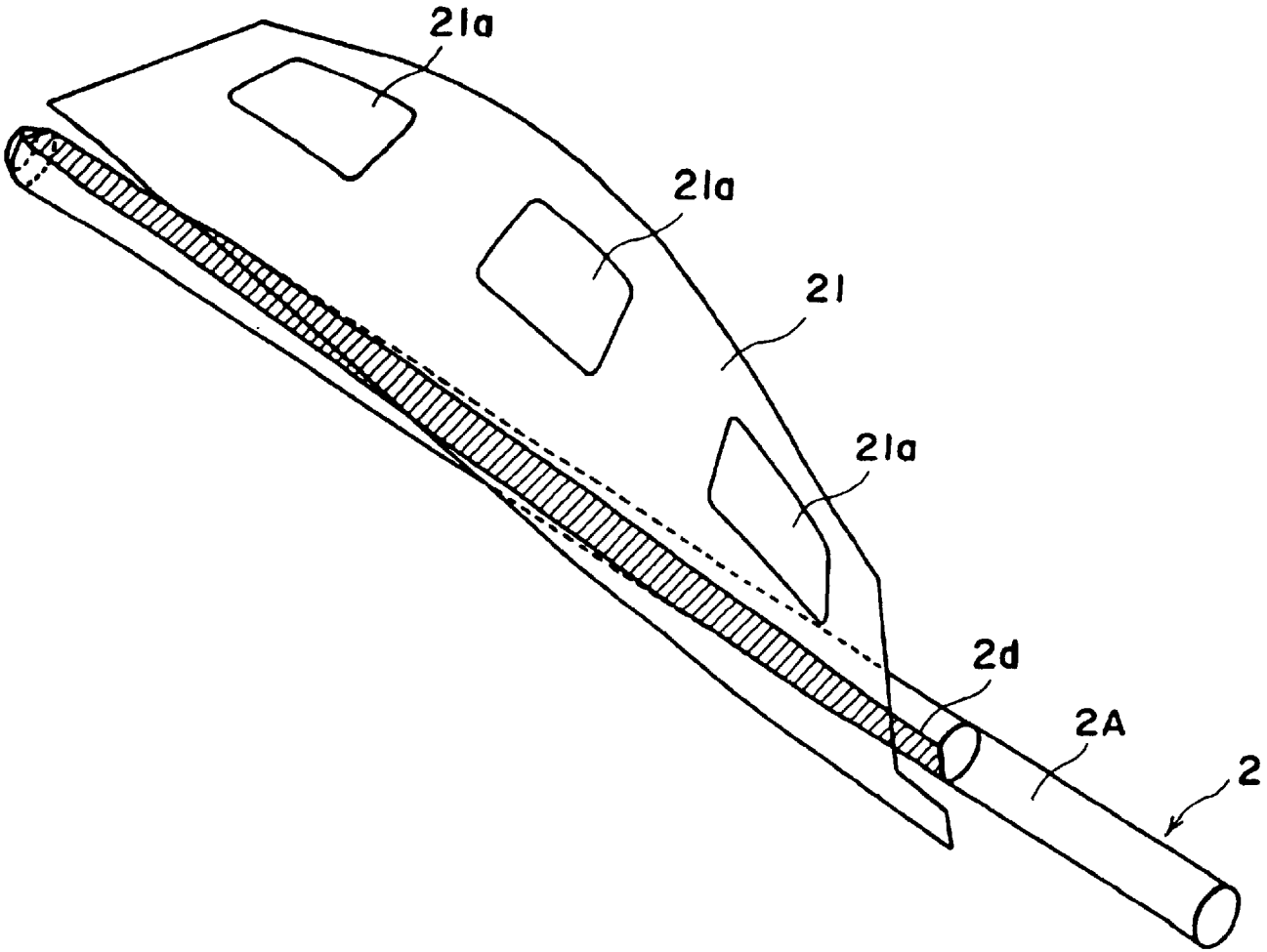
FIG. 17 illustrates a structure of the feeding member according to a third embodiment.

FIG. 17 shows a structure wherein a part of the blade portion 21 of the feeding member 2 shown in FIG. 13 is removed to provide a window configuration 21a, according to a third embodiment of the present invention. With the provision of the window configuration 21a, the toner discharging experiments were carried out under the same conditions for the toner supply container 1 having the same structure as with the first embodiment except for the window.

As a result, the toner discharging property, the remainder toner amount in the main body 1A of the container after the end of the discharge, were the same as with the first embodiment. The initial torque required by the rotation of the feeding member 2 when no tapping was carried out, was approximately 2 kgf-cm which is the same as first embodiment. The required initial torque after the 1000 tappings, was decreased from approximately 5 kgf-cm which is the torque without the window to approximately 4 kgf-cm; the initial torque when the toner is agglomerated is decreased by the window.

Figure 18:
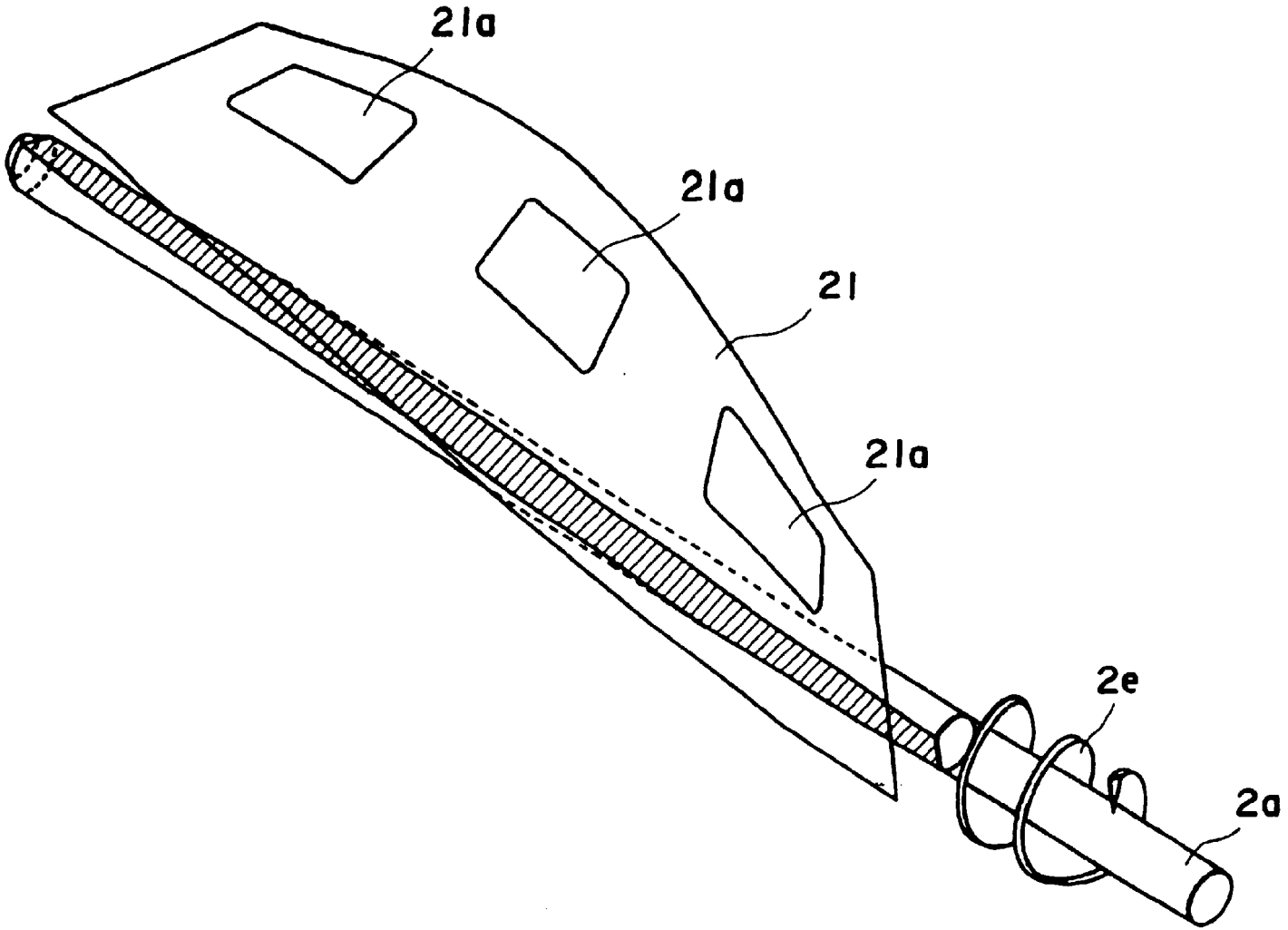
FIG. 18 illustrates a structure of the feeding member according to a fourth embodiment.

FIG. 18 shows a structure of a feeding member 2 according to a fourth embodiment wherein a screw member 2e shown in FIG. 16 is added to the feeding member 2 shown in FIG. 17. The toner discharging experiments were carried out under the same conditions as with the first embodiment except for the provision of the screw member 2e and the window configuration 21a.

As a result, the toner discharging property was better than that with the third embodiment in stability, and the remainder toner amount in the container after the end of the discharge was equivalent to that of the third embodiment. The required initial torque without tapping was approximately 4 kgf-cm similarly to the second embodiment. The required initial torque after 1000 tappings decreased from approximately 8 kgf-cm without the window to approximately 6 kgf-cm.

Thus, by the provision of the blade portion 21 on the shaft portion 2A of the feeding member 2 in which the phase of the blade is continuously changed relative to the axial direction of the shaft portion 2A, the toner feeding function becomes more effective, and the toner amount remaindering on the main assembly of the container can be reduced. Furthermore, by the provision of the windows at one or more portions of the blade portion 21, the required rotation torque can be reduced.

Figure 19:
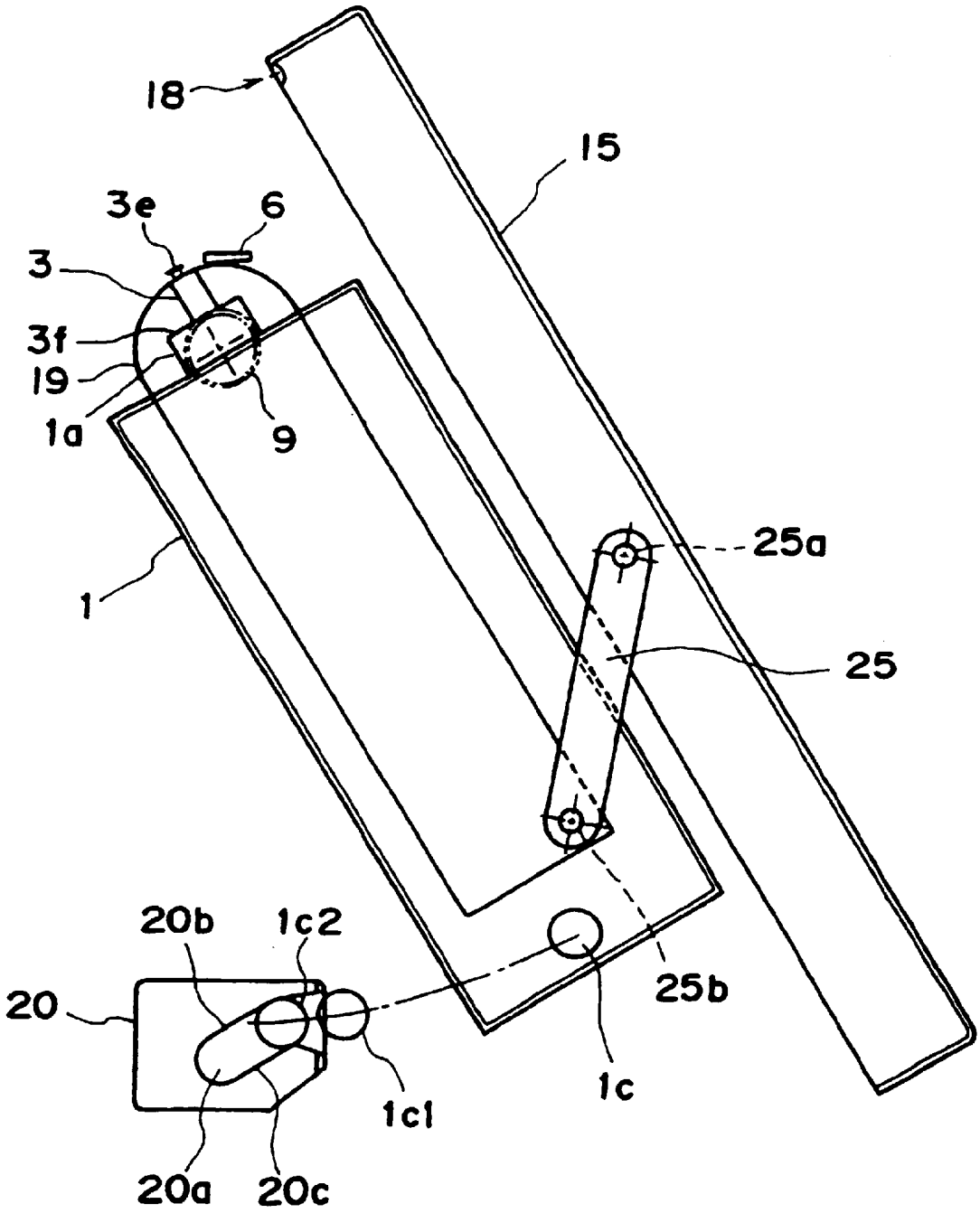
FIG. 19 illustrates the toner supply port opening and closing means and the parts therearound when the cover of the electrophotographic copying machine is open.

In this invention, the convert 15 for the exchange and the hinge portion 18 therefor can be provided at the positions shown in FIG. 19.

Figure 20:
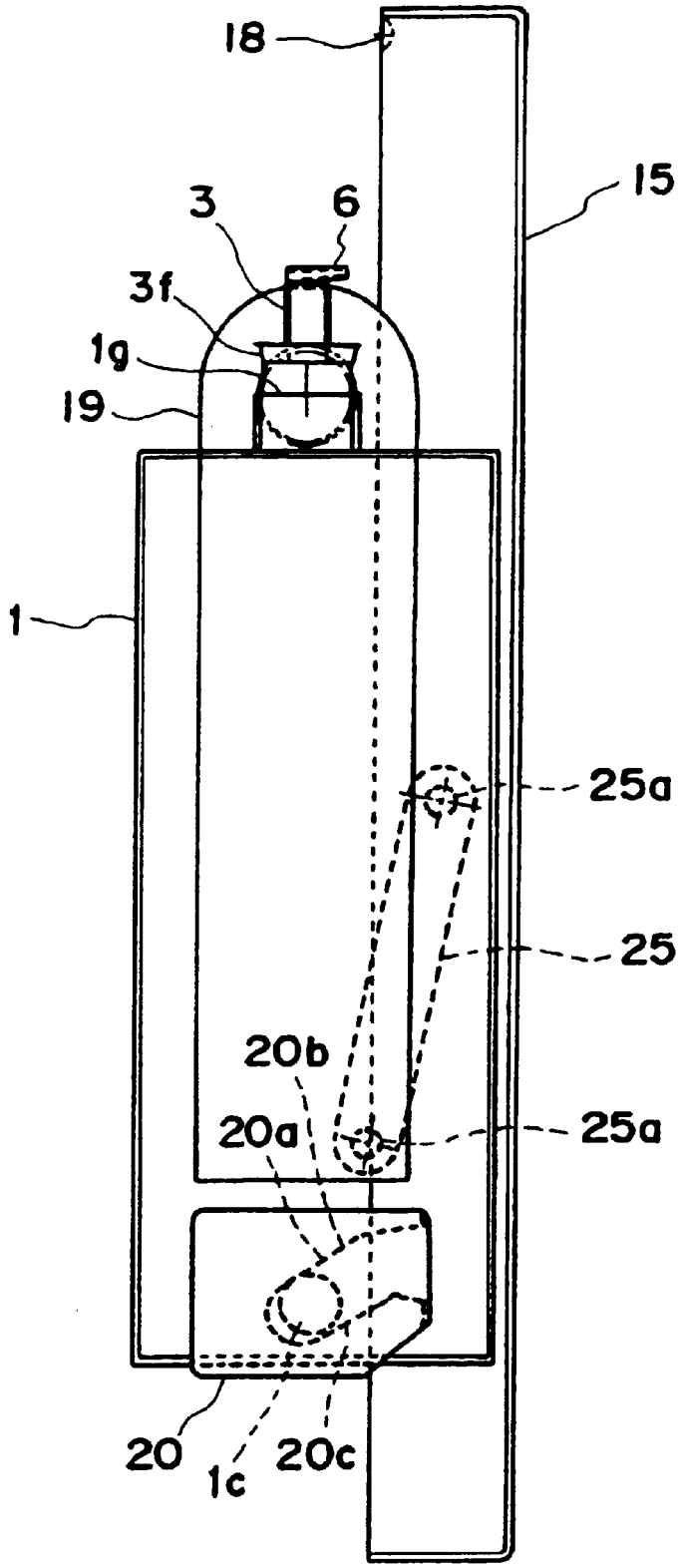
FIG. 20 illustrates the toner supply port opening and closing means and the parts therearound when the cover of the electrophotographic copying machine is closed.

Referring to FIGS. 19 and 20, the structure for opening and closing the toner supply port 1g by the motion of the exchanging cover provided at the position, will be described. FIG. 19 shows the state wherein the cover 15 is open, and FIG. 20 shows the state wherein the cover 15 is closed. In these figures, the same reference numerals as in FIG. 8 are assigned to the elements having the corresponding functions, and detailed descriptions thereof are omitted for simplicity.

In FIGS. 19, 20, designated by 19 is a toner supply container holder member having a center of rotation which is concentric with the toner receiving port 9, and the toner supply container 1 is mounted to the toner supply container holding member 19 upon the exchange operation. Designated by 20 is a guiding member provided with an engaging groove 20a which is engageable with an engaging projection 1c provided in the main body 1A, and is fixed in the main assembly 100 of the apparatus. Designated by 25 is a link for interrelating the cover 15 and the toner supply container holding member 19 at the connecting portions 25a, 25b. When the cover 15 is closed, the toner supply container holding member 19 is rotated to a position shown in FIG. 20 by the link 25.

With such a structure, when the user closes the cover 15 after the new toner supply container 1 is mounted on the toner supply container holding member 19, the toner supply container holding member 19 is rotated to the position shown in FIG. 20 by the link 25. With the rotation of the toner supply container holding member 19, the main body 1A of the container also rotates so that engaging projection 1c provided in the main body 1A moves through 1C-1C1-1C2 as shown in FIG. 19. Here, with the rotation of the main body 1A, the sealing member 3 rotates in the clockwise direction, and the locking projection 3e of the sealing member 3 is locked with the locking member 6 at a position where the engaging projection 1c reaches 1C1.

After the sealing member 3 is locked with the locking member 6, the cover 15 is further closed, and the engaging projection 1c enters the engaging groove 20a of the guiding member 20 and moves along the wall portion 20b of the engaging groove 20a in the direction away from the rotational center of the toner supply container holding member 19. By this, the main body 1A of the container is moved away from the sealing member locked with the locking member 6, so that toner supply port 1g is opened as shown in FIG. 20.

On the other hand, when the user opens the cover 15 in the state shown in FIG. 20, after substantially all of the toner in the toner supply container 1 is used up, the engaging projection 1c of the main body 1A moves along the wall portion 20c of the guiding member 20. With the movement of the engaging projection 1c, the main body 1A moves until the toner supply port 1g abuts the flange portion 3f of the sealing member 3, by which the toner supply port 1g is closed.

A third embodiment of the present invention will be described.

In this embodiment, a feeding member and a stirring member which is a separate member from the feeding member are provided.

Figure 21:
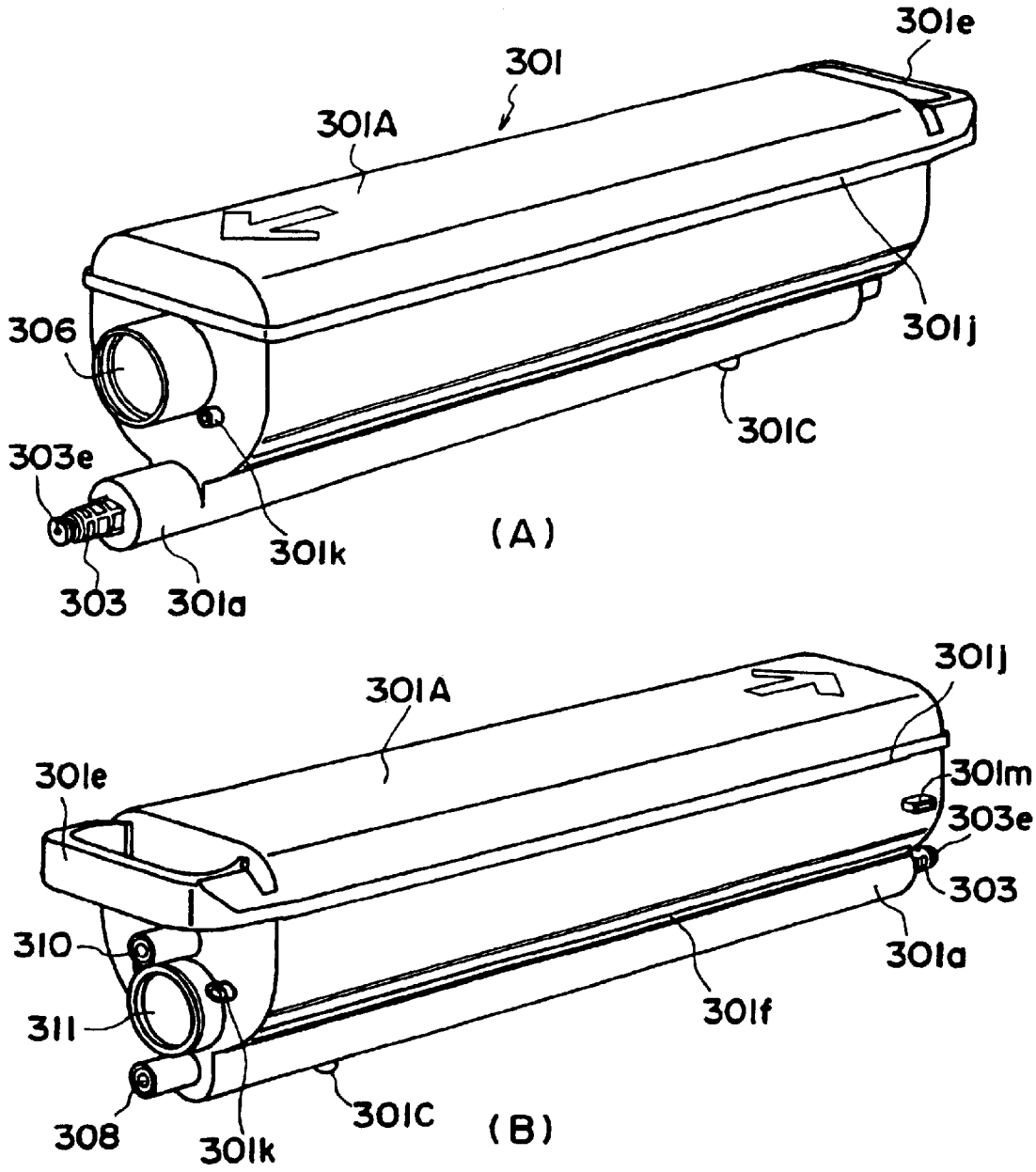
FIG. 21 shows a toner supply container according to a third embodiment, wherein (A) is a perspective view as seen from the side near a sealing member, and (B) is a perspective view as seen from the side near a handle.

FIG. 21 is a perspective view of a toner supply container 301 according to the third embodiment of the present invention.

Figure 22:
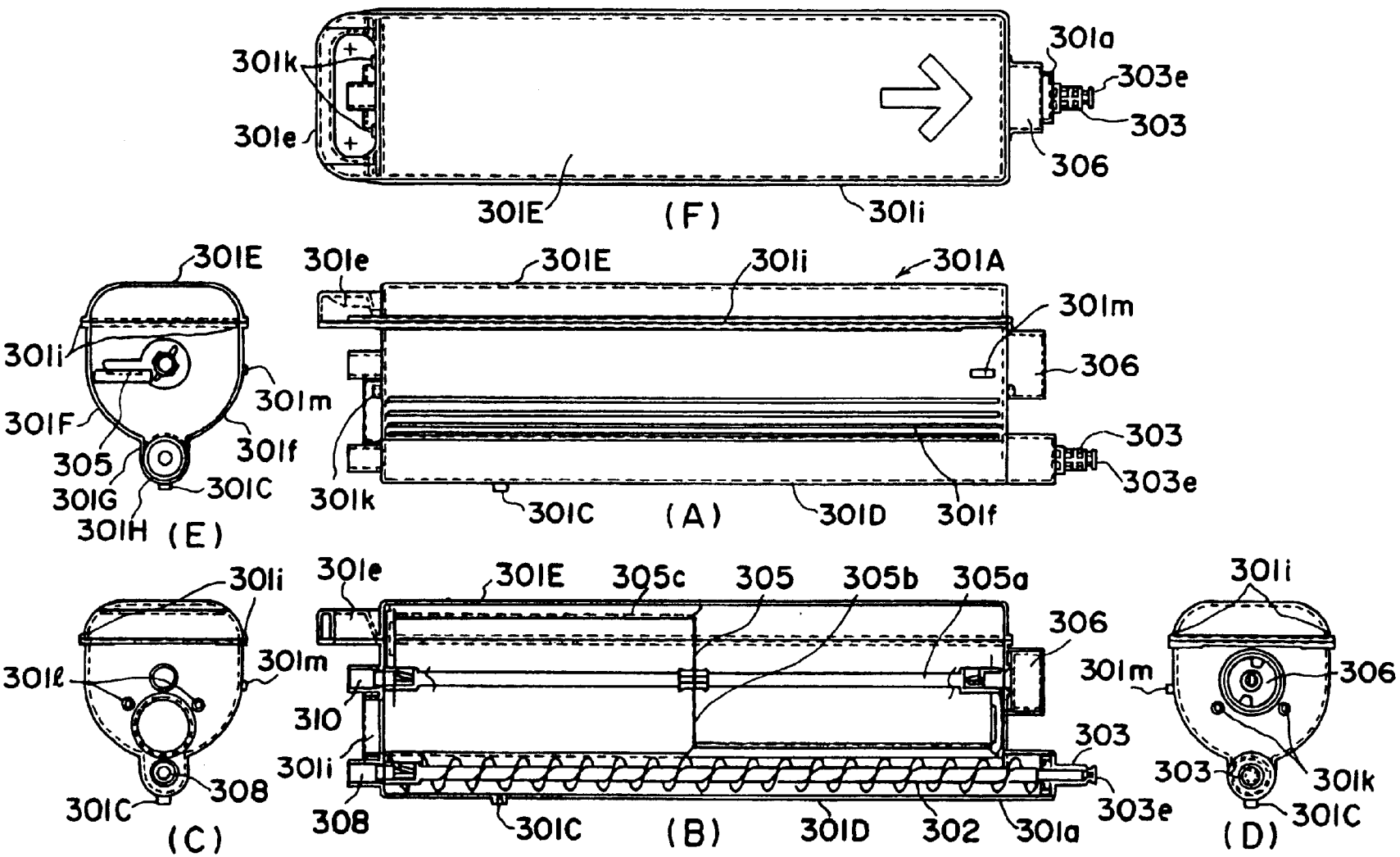
FIG. 22 shows a toner supply container according to a third embodiment, wherein (A) is a front view thereof, (B) is a sectional view thereof, (C) is a left side view thereof, (D) is a right side view thereof, (E) is a sectional side view thereof, and (F) is a top plan view thereof.
Figure 23:
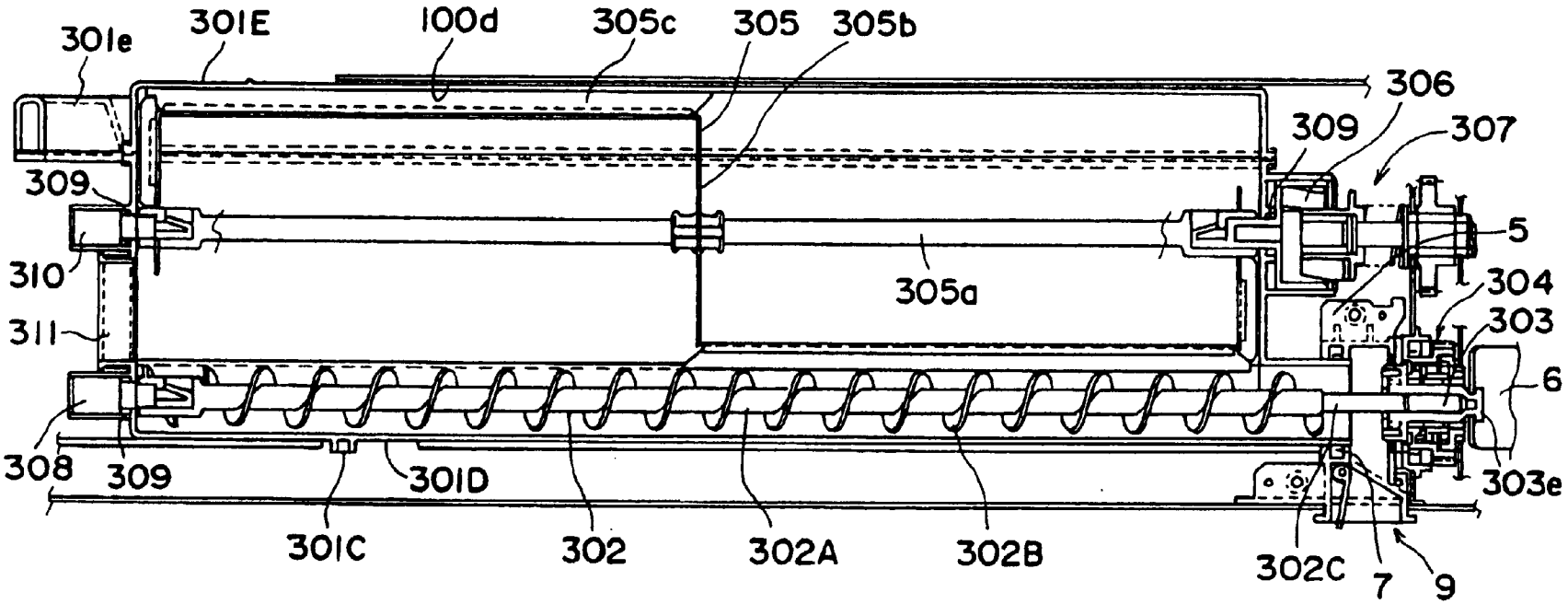
FIG. 23 is a sectional front view of a toner supply container which is placed in the main assembly of the apparatus and a supply port of which is in the sealed state.
Figure 24:
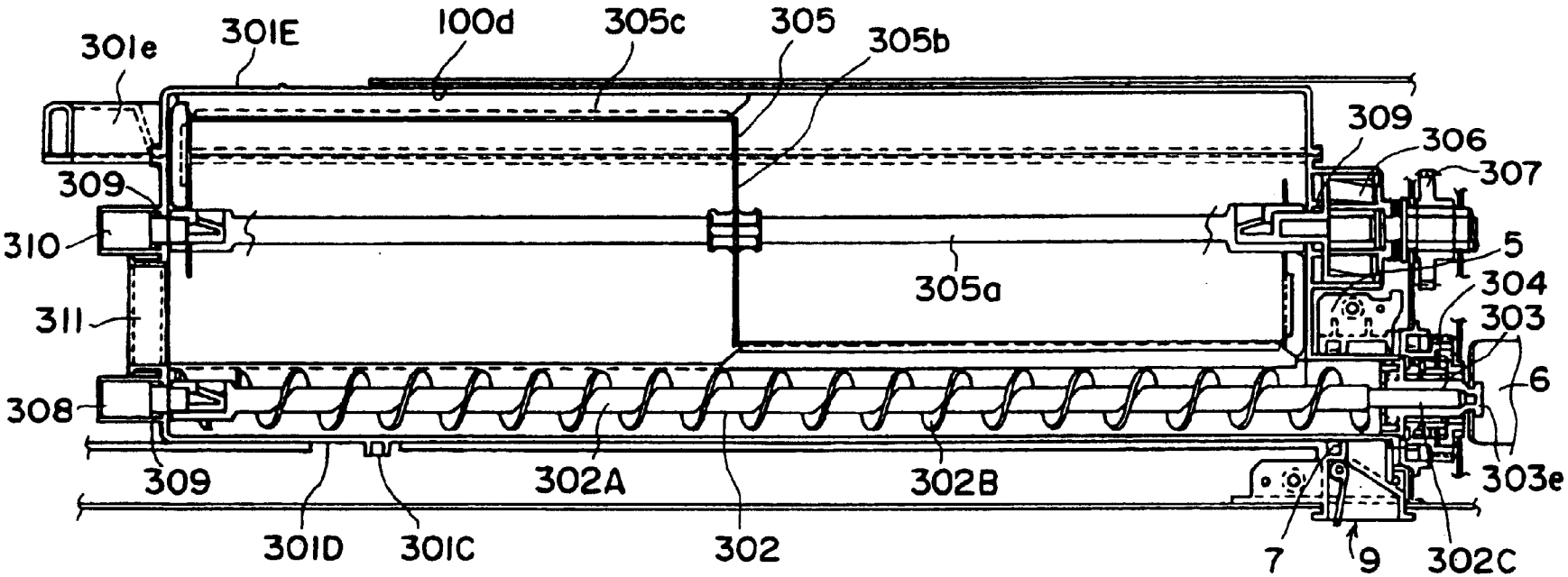
FIG. 24 is a sectional front view of a toner supply container which is placed in the main assembly of the apparatus and a supply port of which is in the unsealed state.

FIG. 22 (A) is a front view of the toner supply container according to this embodiment, and (B) is a sectional view. FIG. 22, (C) is a left side view of the toner supply container, (D) is a right side view of the toner supply container, (E) is a sectional side view of the toner supply container, and the (F) is a top plan view of the toner supply container FIG. 23 is a sectional front view wherein the toner supply container is loaded in the main assembly 100 of the apparatus, and the supply port is open. FIG. 24 is a sectional front view wherein the toner supply container is loaded in the main assembly 100 of the apparatus, and the supply port is sealed.

In FIGS. 21–24, designated by 301A is a main assembly of the container, and 302 designates a feeding member for feeding the toner accommodated in the main body 301A of the container toward the toner supply port portion 301a. Designated by 303 is a sealing member for sealing the toner supply port 301g, and 304 denotes a coupling member for transmitting the driving force to the sealing member 303 when the toner supply container is mounted to the main assembly 100 of the apparatus. Designated by 305 is a stirring member for stirring the toner in the main body 1A. Designated by 306 is a transmitting member engageable with the stirring member 305 to transmit the rotation force from the image forming apparatus to the stirring member. Designated by 307 is a second coupling member for transmitting the drive force to the transmitting member 306 when the toner supply container is mounted to the main assembly 100.

Designated by 309 is an oil seal for preventing leakage of the toner.

Figure 25:
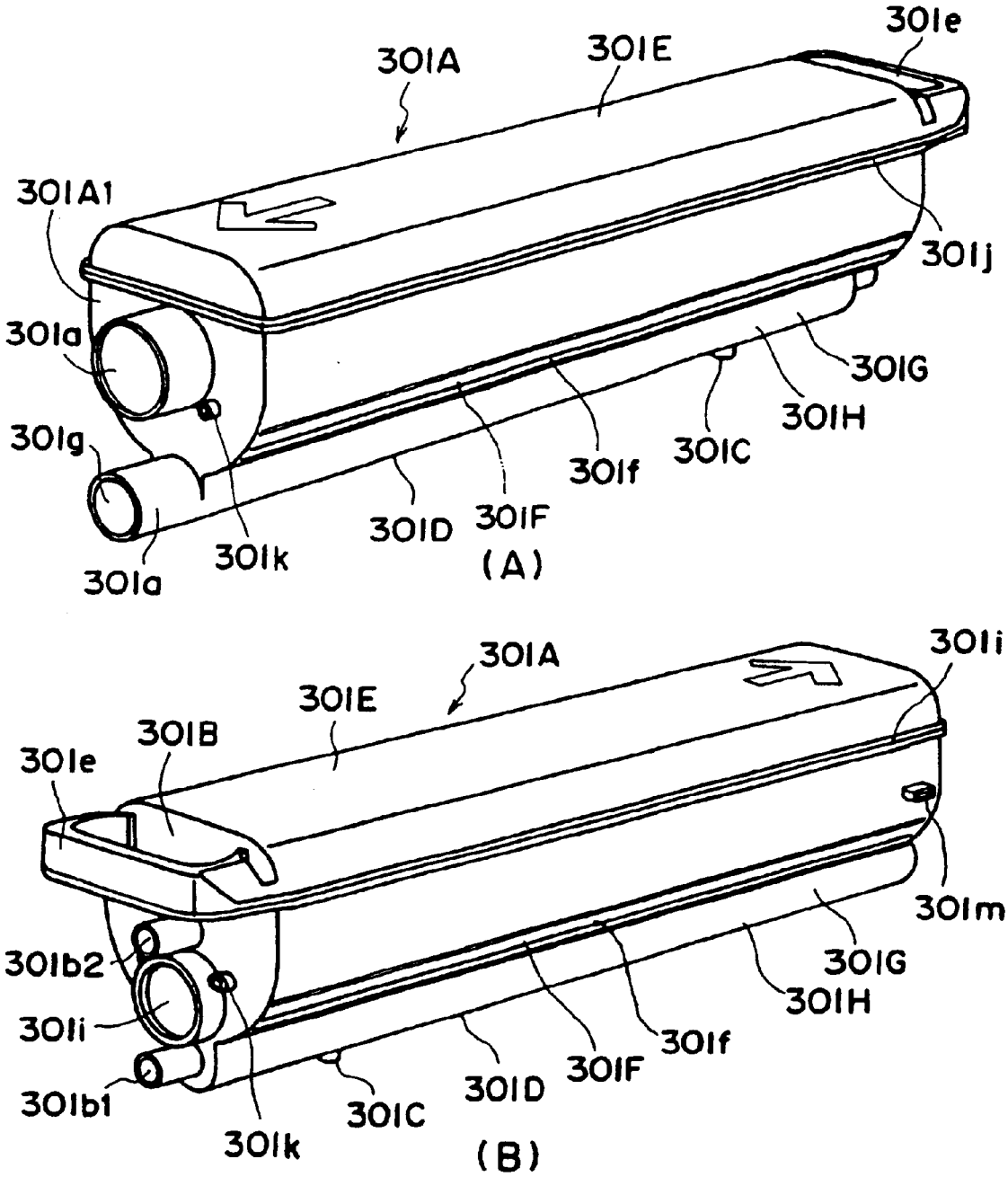
FIG. 25 shows a toner accommodating member according to the third embodiment, wherein (A) is a perspective view as seen from a side near a supplement port, and (B) is a perspective view as seen from a side near a handle.
Figure 26:
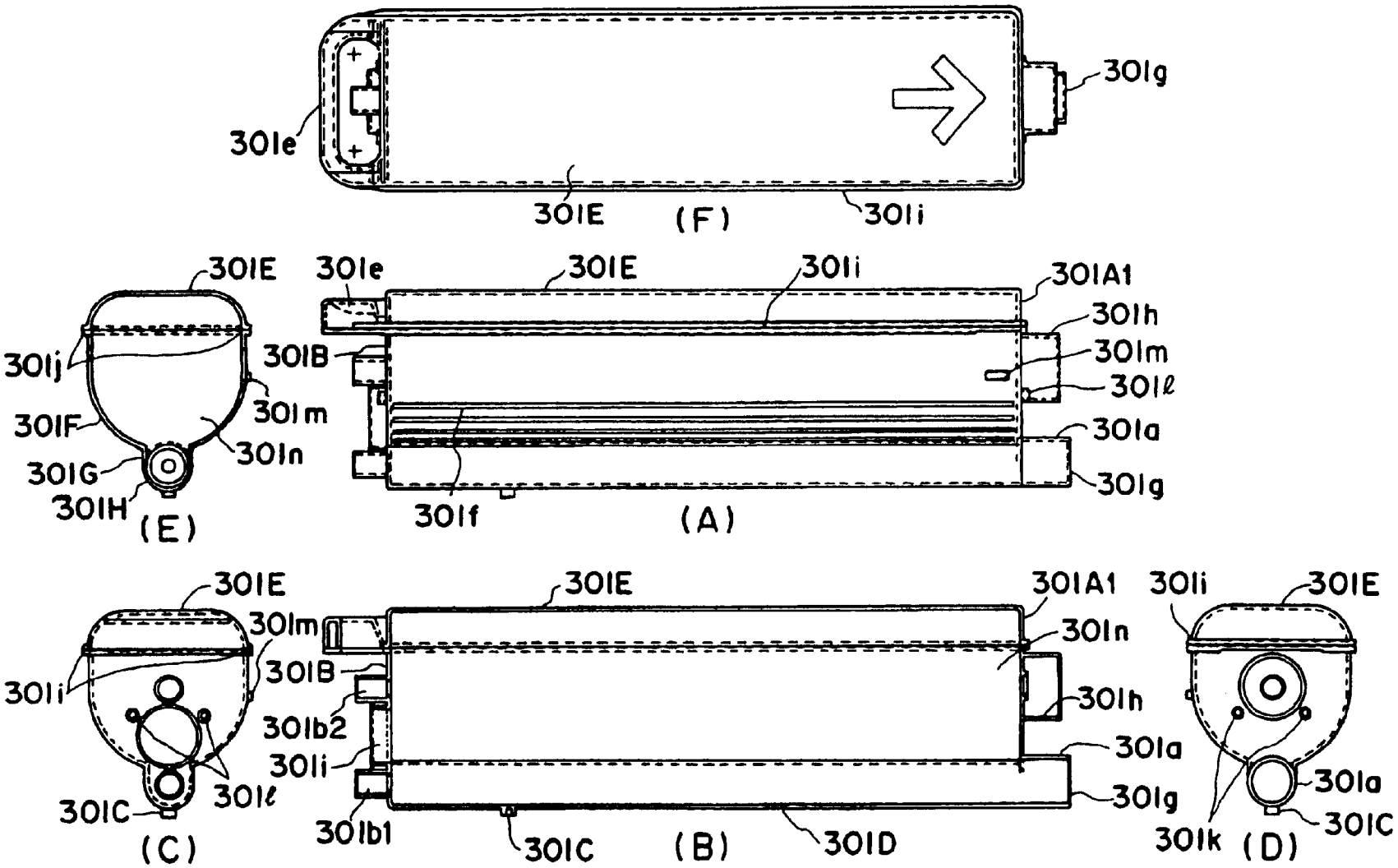
FIG. 26 shows a toner accommodating member, wherein (A) is a front view thereof, (B) is a sectional view thereof, (C) is a left side view thereof, (D) is a right side view thereof, (E) is a sectional side view thereof, and (F) is a top plan view thereof.

Referring to FIG. 25 and FIG. 26, the toner supply container part 301A which is a main assembly of the toner supply container will be described. FIG. 25 is a perspective view of the main assembly of the container.

FIG. 26(A) is a front view of the main assembly of the container, (B) is a sectional view, (C) is a left side view, (D) is a right side view, (E) is a cross-sectional view, (F) is a top plan view.

The main body 1A of the toner supply container includes a curved portion 301F having a width decreasing toward the lower portion, a flat surface portion 301G having a substantially constant width extended from the lower portion of the curved portion, and an arcuate configuration portion 301H extended from the lower portion of the flat surface portion.

At a lower portion of one side surface 1A1 of the main body 301A of the container, a cylindrical member defining a toner supply port portion 301a is projected, which functions to supply toner accommodated in the toner accommodating portion 1n to the main assembly of the apparatus. A toner supply port 301g is provided at one end portion of the toner supply port portion 301a. At a position corresponding to the toner supply port portion 301a of the other side surface 301B, a first receiving portion 301b for rotatably supporting the feeding member 2 is formed. Outside the 301D, there is provided an engaging portion 301c for engaging with the toner supply port opening and closing means provided in the main assembly 100 to move the toner supply container 301 in the mounting and demounting direction. In this embodiment, the engaging portion 301C is in the form of a dowel projected outwardly from the lower surface 301D. The upper surface 301E is provided with a handle 301e for facilitating mounting of the toner supply container 391 to the main assembly 100 and removal thereof from the main assembly 100. At the lower inclined surface (curved portion) 301F of the front side and the rear side, there are provided grooves 301f extended substantially parallel with each other in the longitudinal direction of the container to facilitate handling of the main body 1A of the container when the toner supply container 1 is mounted to the main assembly 100 of the apparatus.

Above the first receiving portions 301b1 of the other side surface 301B, there is provided a second receiving portion 301b2 for rotatably supporting the stirring member 305.

The toner supply port portion 301a is disposed in a side surface 301A1 opposite from the side surface 301B having the handle 301e in the longitudinal direction of the main body 301A. By this arrangement, when the use mounted the toner supply container 301 to the main assembly 100, the user is prevented from inadvertently touching the toner supply port portion 301a. The toner supply port portion 301a is located at the lower position of the side surface 301A1. Therefore, even if the amount of the toner accommodated in the main 301A becomes small, the toner can be discharged efficiently.

The toner supply port portion is projected from the side surface 301A by 20 mm–40 mm, preferably approximately 27.8 mm. The toner supply port portion 301a is cylindrical in shape, and the outer diameter of the cylindrical portion is 20 mm–30 mm, preferably approximately 27.6 mm.

As described hereinafter, an engaging portion 301C is provided on the outside of the lower surface 301D. The engaging portion 301C is correctly positioned by a locking portion 51C (FIG. 8) provided in the main assembly 100 of the apparatus when the toner supply container is mounted to the main assembly 100. The engaging portion 301C, as described hereinbefore, is in the form of a columnar projection (dowel) projecting outwardly from the lower surface 301D. The circular column shape portion has an outer diameter 8 which is 5 mm–12 mm, preferably approximately 8 mm. The positioning portion is disposed at a position 2 mm–6 mm away from the lower surface 301D, and the engaging portion 301C (positioning portion) is disposed at a position 60 mm–80 mm preferably approximately 71 mm away from the lateral end surface 301B opposite from the side of the toner supply port portion 301a in the longitudinal direction of the lower surface 301D.

The side surface 301A1 and the other side surface 301B, are each provided with two bosses 301k, 301l for positioning the main assembly of the container when the dimensional inspection for the main assembly of the container is carried out before the container is delivered from a plant.

Designated by 301m is a rib for preventing erroneous mounting.

The user is prevented from mounting an erroneous container by disposing the rib 301m at difference positions for the toner supply containers.

The main body 301A is preferably manufactured through an injection molding of resin material such as plastic resin material, blow molding or injection blow molding, but another material and/or another manufacturing method is usable. The main body 301A of the container may be divided into two or more portions, which are unified by welding, bonding or the like.

In the embodiment, upper frame and lower frame of high impact polystyrene are unified by vibration welding.

The feeding member 302, as shown in FIG. 23, includes a shaft portion 302A and a helical rigid feeding blade 302B, on the shaft portion 302A, which functions as a feeding portion for feeding the powder toner in a predetermined direction by rotation of the shaft portion 302A. The feeding member 302 is mounted to the main body 301A of the container with the axis of the shaft portion 302A substantially aligned with the center of the substantially circular toner supply port 301g.

The feeding member 302 is not limited to the screw type, as described above, but a flexible blade may be mounted to the shaft portion 302A, for example. The shaft portion and the blade may be integrally molded, and may be separate members. In this embodiment, the shaft position 302A and the blade 302B are made of plastic resin material molded integrally.

In the embodiment, the feeding member 302 has an extending portion 302C extending into the cylindrical portion of the toner supply port portion 301a. In this embodiment, the extending portion 302C is further extended out of the toner supply port portion 301a. A free end portion of the extended-out portion of the extending portion 302C receives the rotation force from the main assembly 100. Therefore, in this embodiment, the sealing member 303 is movably (in the axial direction) mounted to the free end portion.

One end portion 302a of the extending portion 302C has a configuration, such as a polygonal, more particularly, a rectangular configuration, to receive the rotation force through the sealing member 303 from the main assembly 100. The one end portion of the shaft portion 302A is supported on the sealing member 303 through one end portion 302a of the extending portion 302C. The other end portion 302b of the shaft portion 302A is provided with a first bearing member 308. It is supported rotatably (upon unsealing) to the main body 301A through the first bearing member 308.

The feeding member 302 is supported on the sealing member 303 such that feeding blade 302B is out of contact to the internal wall surface 301a1 of the toner supply port portion 301a and that internal wall surface of the toner supply port portion 301a is substantially parallel with the shaft portion 302a. By supporting the feeding member 302 in this manner, the toner can be fed substantially horizontally to the toner supply port 301g by rotation of the feeding member 302. It is possible that fine toner particles enter between the feeding blade 302B and the internal wall surface 301a1 of the toner supply port portion 301a and are fused on the internal wall surface 301a1 by strong rubbing therebetween with the result of massive toner particles produced. However, this can be avoided by supporting the feeding member 302 in that manner.

The feeding member 2 is also preferably manufactured through injection molding or the like of plastic resin material or the like, but another method and/or another material is usable. It may be made of separate members which are connected.

Figure 27:
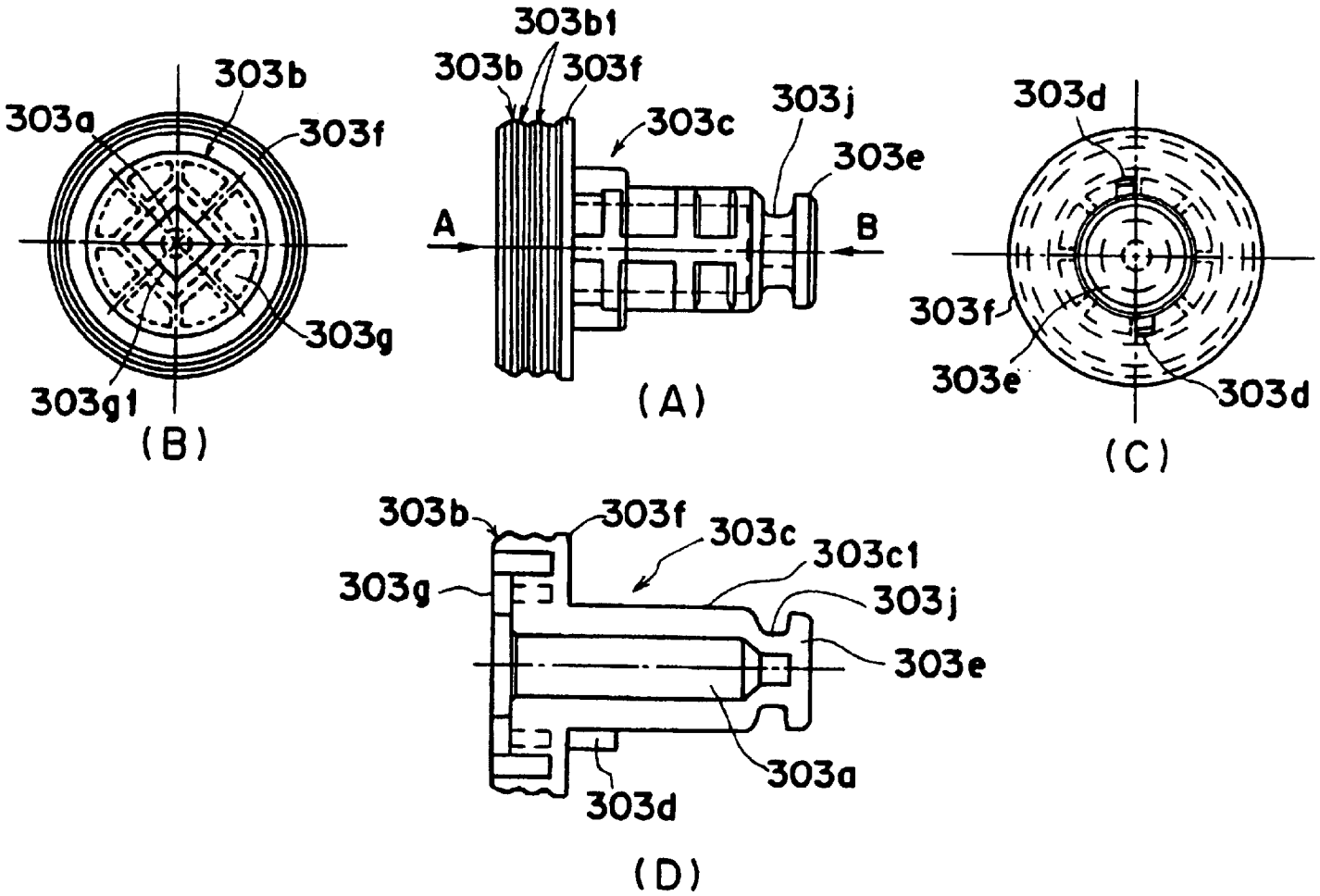
FIG. 27 shows a sealing member, wherein (A) is a front view thereof, (B) is a view taken along a line A, (C) is a view taken along a line B, and (D) is a sectional front view thereof.

Referring to FIG. 27, a description will be provided as to a sealing member 303. In FIG. 27, (A) is a front view of a sealing member, (B) is a view taken along a line A—A, (C) is a view taken along a line B—B, and (D) is a sectional front view.

In (A)–(D) of FIG. 27, designated by 303b is a sealing portion which is provided at a side opposite from the toner supply container 301 of the sealing member 303 to openably seal the toner supply port 301g of the toner supply container 301. The outer diameter of the sealing portion 303b is larger than an inner diameter of the toner supply port 301g by a proper amount. The sealing member 303 hermetically seals the toner supply port 301g by press-fitting the engaging portion 303b1 of the sealing portion 303b into the toner supply port portion 301a from the toner supply port 301g.

Designated by 303c is a coupling engaging portion which functions as a driving force receiving portion (driver) for receiving the driving force for rotating the feeding member 302 from the main assembly 100 of the apparatus when the toner supply container 301 is mounted to the main assembly 100. The coupling engaging portion 303c is provided with a projected portion 303c1 extended from the sealing portion 303b substantially co-axial with the axis of the shaft portion 302A of the feeding member 302 in the direction opposite from the main body 301A of the toner container (when the sealing member 303 is mounted to the main body 301A of the container). The coupling engaging portion 303C is provided on the curved surface of the projected portion 303c1, and is provided with an elongated projections (ribs) 303d (spline-like), which functions as a driving force receiving portion engageable with the coupling member 304. In this embodiment, two of such spline projections 3d are provided equidistantly.

More particularly, they are disposed approximately 180° interval.

The rib 303d is projected from the outer surface of the sealing member by 0.5 mm–3 mm and preferably approximately 1.8 mm.

The outer diameter of the projected portion 303C1 is 10 mm–14 mm and preferably approximately 12 mm.

The sealing member 303 includes an engaging hole 303a as a driving force transmitting portion for transmitting driving force received from the main assembly 100 to the feeding member 302 by engagement with one end portion 302a of the feeding member 302. The engaging hole 303a is formed as an opening (hole) through the sealing portion 303b and the coupling engaging portion 303c. Here, the engaging hole 303a has a rectangular portion corresponding to the rectangular configuration of the end 302a of the shaft of the feeding member 302 projected from the powder toner supply portion 301a. It has a dimension slightly larger than that of the end 302a of the shaft, so that end 302a is loosely fitted in the engaging hole 303a.

The feeding member 302 and the sealing member 303 are locked with each other in the rotational direction by the loose fitting between the end 302a and the engaging hole 303a. On the other hand, in the axial direction, relative motion therebetween is permitted. By doing so, the sealing member 303 and the main body 301A of the container are separable from each other so that toner supply port 301g is openable upon the toner supply container mounting.

The engagement length between the engaging hole 303a and the shaft end 302a, is long enough to prevent disengagement therebetween when the sealing member 303 and main body 301A of the container are moved away from each other. Therefore, even if the sealing member 303 is moved away from the main body 301A, the feeding member 302 can receive the driving force through the sealing member 303 (coupling engaging portion 303c).

Between the coupling engaging portion 303c and the sealing portion 303b, a flange portion 3f is provided which abuts the end of the powder toner supply portion 301a when the sealing portion 303b is press-fitted into the toner supply port portion 301a. The outer diameter of the flange portion is substantially equal to the outer diameter of the toner supply port portion 301a (preferably, it is smaller than the outer diameter of the toner supply port portion 301a). By the flange portion 303f, the sealing portion 303b enters the toner supply port portion 301a by the length of the sealing portion 303b.

On the other hand, designated by 303e is a locking projection 303e, formed at a free end of the coupling engaging portion 303c, for locking engagement with the locking member 6 provided in the main assembly 100 of the apparatus. By locking the locking member 6 with the locking projection 303e, the sealing member 303 can be fixed when the toner supply port 301g is opened.

The sealing member 303 is preferably manufactured by integral injection molding of plastic resin material or the like resin material, but another material, manufacturing method and/or non-integral structure is usable. The sealing member 303 is required to have a proper elasticity to effect press-fitting into the toner supply portion 301a to seal it. The preferable material is polypropylene, Nylon, high density polyethylene or the like, but further preferable material is low density polyethylene.

Designated by 303j is a locking groove for receiving a locking member 6 provided in the main assembly 100 of the apparatus. The width of the locking groove 303j is 1.5 mm–5 mm, preferably approximately 3 mm. The depth of the locking groove is 0.5 mm–5 mm, preferably approximately 2.5 mm.

As described in the foregoing, the sealing member 303 has a substantially cylindrical engaging portion 303b1 engageable with the toner supply port portion 303a. The flange portion 303f is substantially coaxial with the engaging portion 303b1. It further includes a projected portion 303c1 projected from the flange portion 303f substantially coaxially with the engaging portion 303b1 at a side opposite from the side where the engaging portion 303b1 is provided. Adjacent the free end portion of the projected portion 303c1 it is provided with a locking groove 303c, and a free end portion is formed into a locking portion 303e. There is provided a hollow portion extending from the engaging portion 303b1 side to the locking portion 303e side, and in the hollow portion, a driving force transmitting portion 303a is provided. The locking portion 303e of the hollow portion does not open, and therefore, when the engaging portion 303b1 is engaged with the toner supply port portion 303a, the toner does not leak from the hollow portion to the outside. Thus, the toner supply port portion 303a is sealed by mounting the sealing member 303.

Similarly to Embodiment 1 and 2, the sealing member 303 has four functions. More particularly, the functions are (1) to seal the toner supply port portion 301a, (2) to receive the transmission of the rotation force from the main assembly 100 of the apparatus, (3) to transmit the rotation force to the feeding member 303 and (4) to engage with the engageable member 6 provided in the main assembly of the apparatus. Thus, the sealing member 303 transmits the driving force received from the main assembly 100 of the apparatus to the shaft portion 302A through the extending portion 302C to rotate the feeding member 302.

Figure 28:
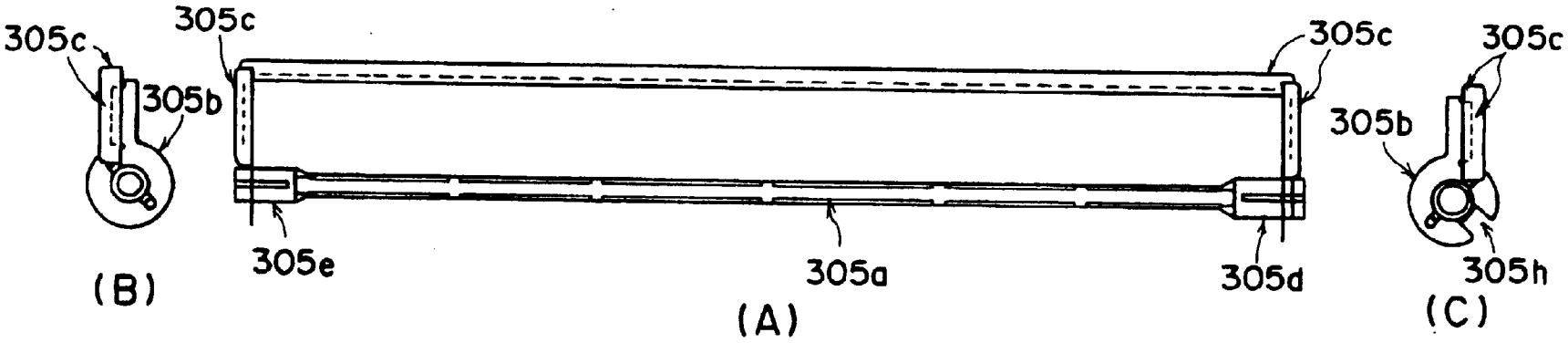
FIG. 28 shows a stirring member, wherein (A) is a front view thereof. (B) is a left side view thereof, and (C) is a right side view thereof.
Figure 30:
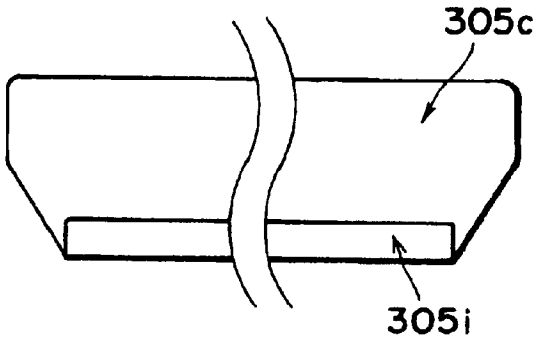
FIG. 30 is an enlarged view of a flexible blade portion.
Figure 29:
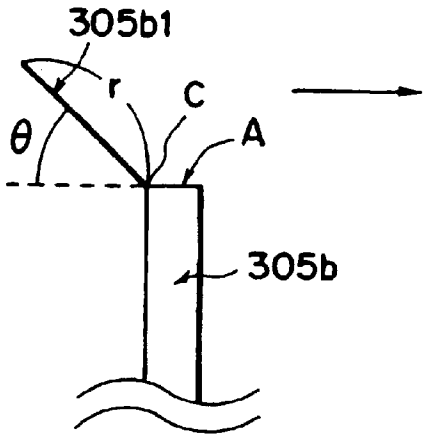
FIG. 29 is an enlarged side view of a rigid blade portion.

A description will be provided as to the stirring member 305. Referring to FIG. 28, (A) is a front view of the stirring member 305, (B) is a left side view, and (C) is a right side view. As shown in FIG. 28, the stirring member 305 includes a shaft portion 305a, a rigid blade portion 305b and a flexible blade portion 305c. FIG. 29 is an enlarged side view of the rigid blade portion 305, and FIG. 30 is an enlarged view of the flexible blade portion 305c. The shaft portion 305a is made of a relatively high rigid plastic resin material and is manufactured by injection molding. The rigid blade portion 305b is of metal such as stainless steel or a highly rigid material, and the flexible blade portion 305c is made of low rigidity material, such as plastic resin material film or sheet or elastomer sheet. In this embodiment, it is of a polyester sheet.

One end 305d of the stirring member 305 is engaged with the above-described transmitting member 306 at the bearing portion 301h of the main body of the toner supply container. The other end 305e is engaged with a stopper member (second bearing member) 310f at the second receiving portion 301b2 of the main body of the toner supply container. The shaft portion 305a in this embodiment is made of relatively high rigidity plastic resin material and is manufactured through injection molding, but may be of another material such as metal.

The rigid blade portion 305b is preferably integrally molded using metal or the like, another material and/or manufacturing method is usable, or it may be divided into two or more parts, which are unified by welding or bonding or the like. In this embodiment, a pressed stainless steel plate having a thickness of approximately 0.8 mm is used. The engaging portion of the rigid blade portion 305b which are engageable with the shaft portion 305a has a configuration conforming with the shaft portion 305a to receive the driving force from the shaft portion 305a, and it rotates with the rotational motion of the shaft portion 305a to stirring the toner in the container.

It is preferable to provide a cut-away portion 305h at one end as shown in FIG. 28 since then the assembling is easy. The entire length of the rigid blade portion 305b is in the form of a substantially parallel plate relative to the tangential direction of rotation, and the downstream of the blade portion with respect to the rotational direction is bent toward the internal wall surface of the toner supply container. The length r of the bent portion 305b1 shown in FIG. 29 is approximately 2 mm–8 mm, and the bending angle 6 is preferably approximately 30°–50°. Further preferably, the length r of the bent portion 305b is approximately 3 mm–5 mm, and the bent angle is preferably approximately 45°.

In this embodiment, the length of the bent portion 305b1 is approximately 5 mm, and the bending angle is approximately 45°. The distance from the center of the rotation shaft to the free end of the rigid blade portion is properly determined depending on the size of the main body of the container, and it is preferably approximately 70–95% of the inner radius of the main body of the container. In this embodiment, the inner diameter of the main body of the container is approximately 44.5 mm, and therefore, it is approximately 39.4 mm (89%).

The flexible blade portion 305c is of low rigidity material such as plastic resin material film or sheet or elastomer sheet. The thickness thereof is preferably approximately 50 μm–500 μm and further preferably 100 μm–300 μm. In this embodiment, the use was made with polyester sheet having a thickness of approximately 100 microns.

The flexible blade portion 305c is bonded such that the free end contacts to the internal wall surface of the main body over the entire length of the bent portion 305b1 of the rigid blade portion 305b. It rotates, scraping the toner off the internal wall surface of the container with the rigid blade portion. The length, in the radial direction, of the flexible blade portion 305c is preferably longer by approximately 0.5 mm–10 mm than the distance between the internal wall surface of the container and the free end of the rigid blade portion 305b since then the above-described effect can be enhanced.

In this embodiment, it is longer by approximately 6 mm. The bonding between the rigid blade portion 305b and the flexible blade portion 305c is made by a double coated tape 305i (DIC#8800CH) as shown in FIG. 30 on the bent portion 305b of the rigid blade portion 305b. Another method using rivets or another known means is usable, or the integral molding with the rigid blade portion is usable.

Figure 31:
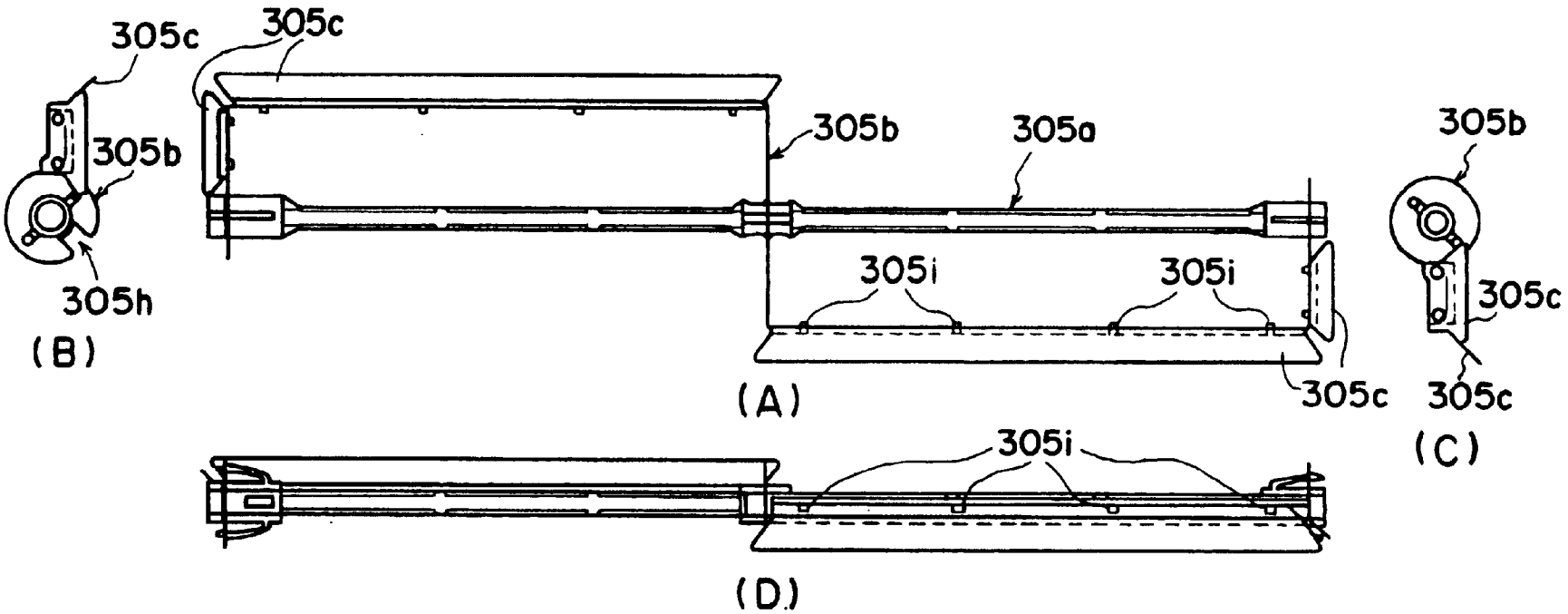
FIG. 31 shows a stirring member according to another embodiment of the present invention, wherein (A) is a front view thereof, (B) is a left side view thereof, (C) is a right side view thereof, and (D) is a bottom view thereof.

As shown in FIG. 31, the rigid blade portion 305b may be divided with a phase difference of 180°substantially at the central portion relative to the axis direction, so that divided parts as staggered. The number of division is properly determined depending on the configuration and length of the main body of the container, and it may be 3 or 4 or more. The phase of the rigid blade portion 305b may be changed over the entire length to provide a spiral-like configuration. The engaging portion between the central portion of the shaft portion and the opposite ends of the rigid blade portion 305b are preferably provided with a cut-away portion 305h as shown in the figure since then the assembling property is improved. The length of the bent portion of the rigid blade is approximately 3 mm to reduce the resistance of the toner and to decrease the projected area of the rigid balance portion in the rotational direction. The length and the bending angle of the bent portion is preferably 2–8 mm and 30–50°, and further preferably approximately 3–5 mm and approximately 45°.

The rigid blade portion 305b and the flexible blade portion 305c may be crimped by means of aluminum rivets 4i. In this case, if the position of the rivet hole of the flexible blade portion 305c is derived even slightly, waving may result, and therefore, it is preferable to provide perforation or half cutting at a portion of the flexible blade portion 305c contacted to the bent portion C of the rigid blade portion 305b. The bonding means may be a double coated tape or another known means.

A description will be provided as to assembling method of the toner supply container 301.

In the assembling method of the toner supply container 301, the feeding member 302 is inserted into the lower portion of the lower frame 301K from the top. An oil seal 309 is inserted into the first receiving portion 301b1, and thereafter, a bearing member 308 is engaged with the other end portion 302b of the feeding member 302. The toner supply port 301g is sealed by the sealing member 303. Then, the stirring member 305 is inserted from the top. An oil seal 309 is inserted into the main body of the container, and thereafter, the second bearing member 310 and the transmitting member 306 are engaged at the opposite ends of the stirring member 305. Then, the upper frame 301J is welded to the lower frame 301K by vibration welding, and a predetermined amount of the toner is supplied into the main body 301A of the container through the filling port 301i of the main body of the toner supply container 301, and the filling port 301i is sealed by the sealing member 311, so that assembling is completed. In this manner, the assembling of the toner supply container 301 is very easy, and the number of steps of the assembling is very small.

The filling of the toner may be effected through the toner supply port 301g.

In this embodiment, the exchange steps of the toner supply container 301 are the same as with the first embodiment and the second embodiment.

When the toner supply port portion 301a is opened by the toner supplying portion opening and closing means, the main body 301A of the container receives forces at the toner supply port portion 301a and the engaging portion 301c. At this time, as described hereinbefore, the engaging portion 301c is disposed at a side opposite from the side having a toner supply port portion 301a in the longitudinal direction at the lower surface of the main body 301A of the container, the main body 301A is prevented from rising relative to the main assembly 100. Even if the main body 301A is raised, the motion of the main body 301A beyond a predetermined distance is limited by contact of the upper surface 301E to the top surface portion 100d (FIG. 32) of the main assembly 100 of the apparatus.

The engaging projection 301c and the toner supply port 301g of the toner supply container 301 are preferably disposed on a line in the sliding direction of the container. By doing so, the production of a moment in either direction in FIG. 32 relative to the slide direction in the toner supply container 301 can be prevented. Even if a moment in either direction is produced, the movement of the main body 301A beyond a predetermined distance can be prevented by abutment of the rib 301j as a lateral stopper portion provided in the 301B to the side wall portion 100e provided in the main assembly 100.

The height of the engaging projection 301c of the toner supply container 301 is such that overlapping x between the engaging portion 301c and the container chucking member 51 (FIG. 32) is larger than the clearance Y between the upper portion 301E of the container and the top surface 100d of the main assembly of the apparatus (FIG. 32) in order to prevent the upward disengagement of the toner supply container 301 during the slide movement.

Figure 32:
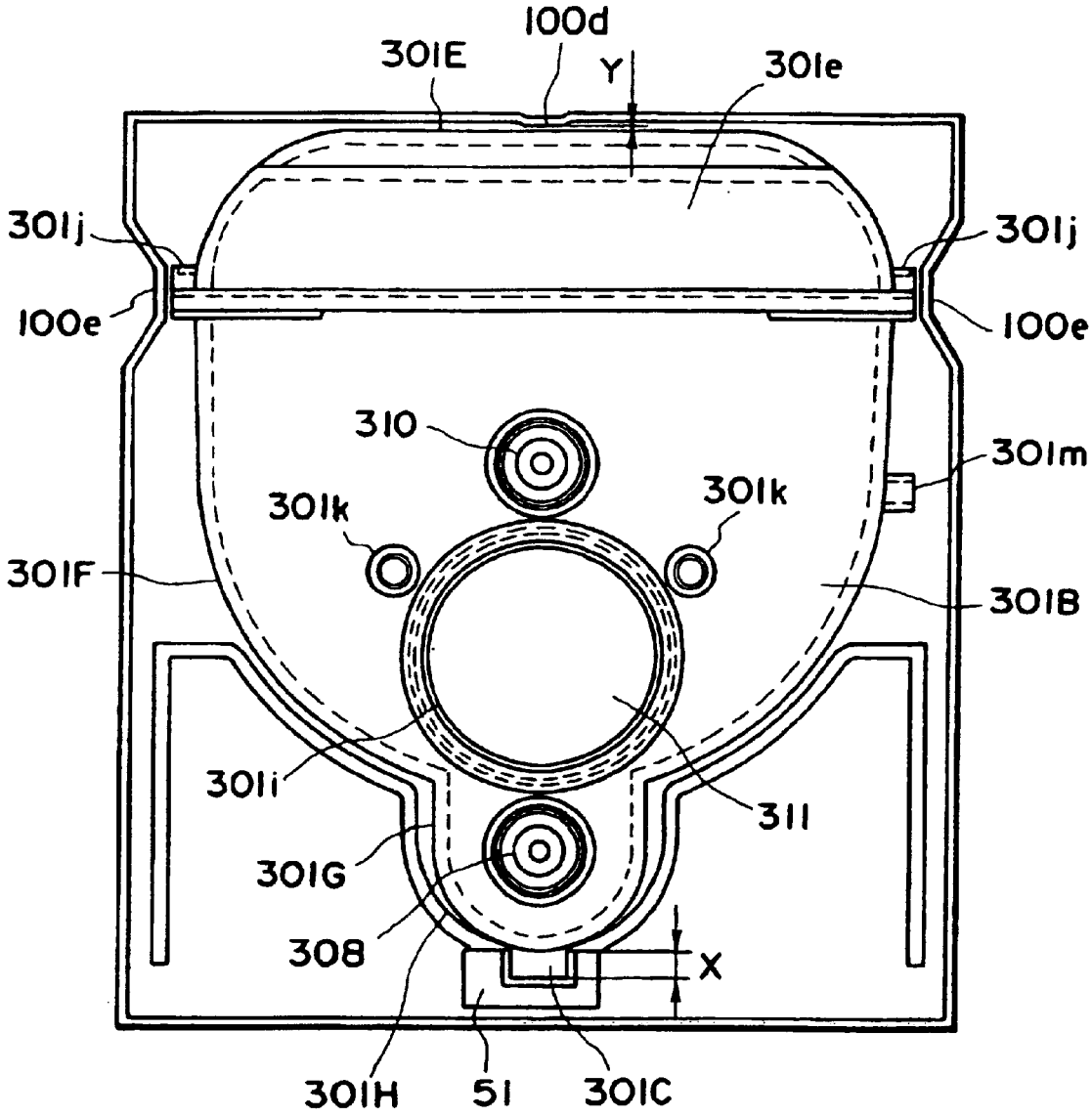
FIG. 32 shows a toner supply container which is mounted in the main assembly of the apparatus.

The horizontal ribs 301j of the toner supply container 301 in FIG. 32 are preferably provided on the top part of the toner supply container 301 to prevent the clogging, and in this embodiment, they are disposed at an upper portion (upper than the height center) of the toner supply container 1 with a proper clearance from the side wall portion 100e.

A description will be provided as to a driving mechanism for the toner supply container 301 in this embodiment.

When the toner supply container 301 is to be mounted, the coupling engaging portion 303c of the sealing member 303 is brought into engagement with the first coupling member 304 of the main assembly 100 of the apparatus as shown in FIG. 23. The first coupling member 304 functions to transmit a driving force of a driving device (unshown) provided in the main assembly 100 to the selling member 303.

Figure 33:
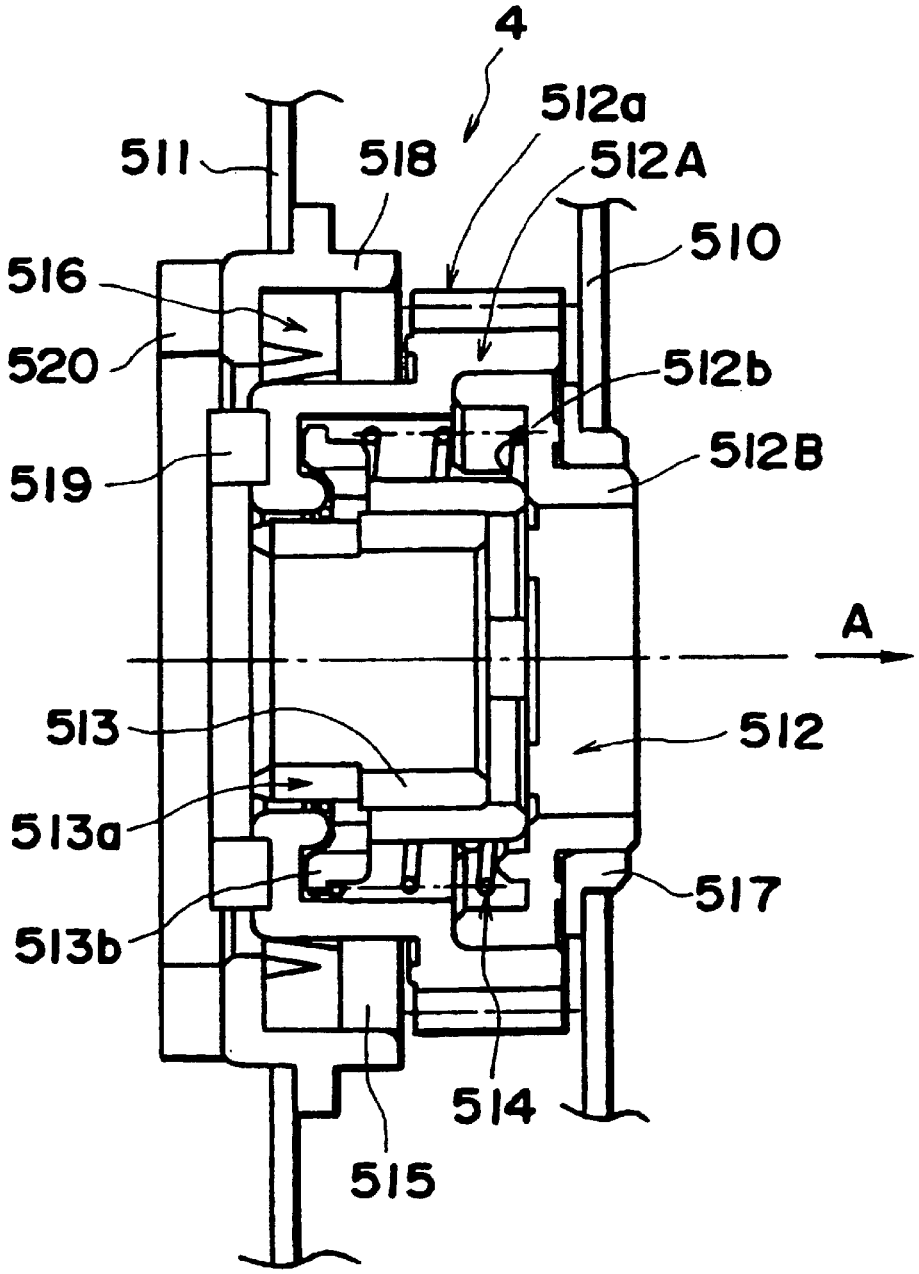
FIG. 33 shows a detailed configuration of the first coupling member.

FIG. 33 shows details of the first coupling member 304.

Designated by 512 is a gear member having a gear portion at the outer surface 512a. The gear member 512 is constituted by two members, namely, gear portion 512A and cap portion 512B, which are securedly fixed snap fitting, bonding or the like. The inside of the gear member 512 is provided with urging means 514 and a movable member 513. The urging means 514 abuts the 512b portion of the gear member 512 and the 513b portion of the movable member 513.

Figure 34:
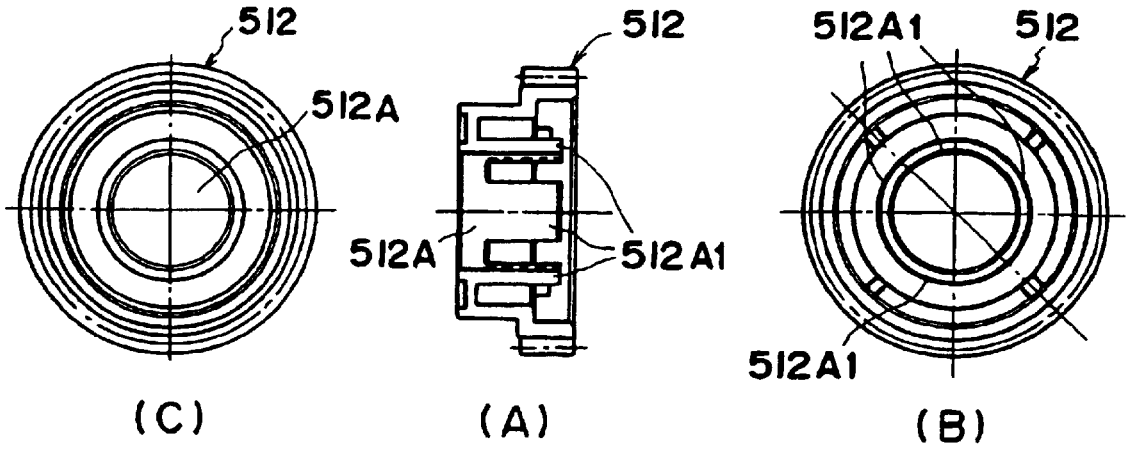
FIG. 34 is a detailed illustration of a gear portion.
Figure 35:
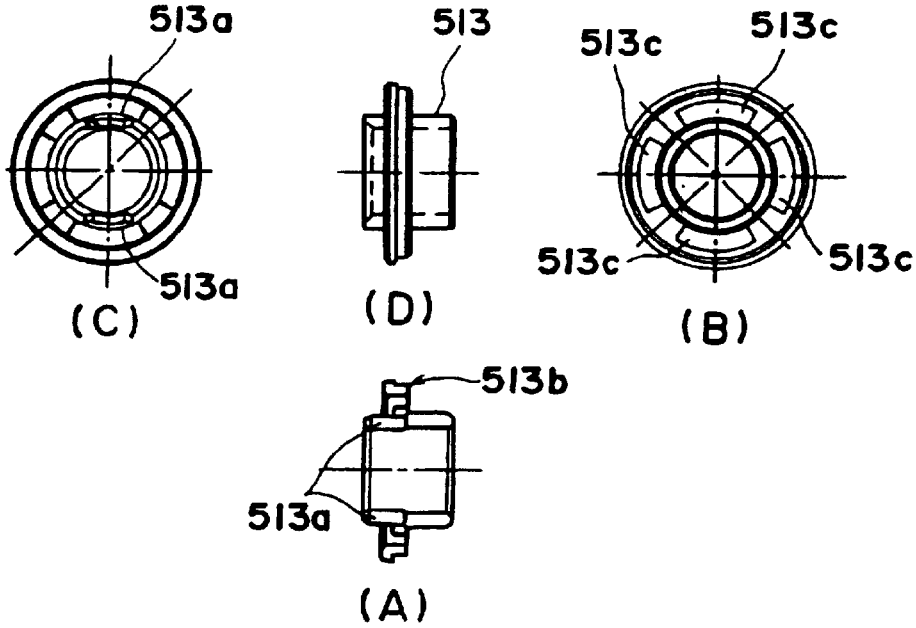
FIG. 35 is a detailed illustration of a movable member.

FIG. 34 is a detailed illustration of the gear portion 512, wherein (A) is a sectional front view, and (B) and (C) are side views. FIG. 35 is a detailed information of the movable member 513, wherein (A) is a sectional front view, and (B) and (C) are side views, and (D) is a front view.

In FIG. 34, gear portion 512A is provided with four slide guiding ribs 512A1 arranged circumferentially. In FIG. 35, the movable member 513 has four slide guiding hole portions 513c circumferentially arranged, and are engaged with the slide guiding ribs 512A1 of the gear portion 512A, by which the movable member 513 is slidable on the gear member 512.

Designated by 513a is a drive transmitting portion of the movable member 513. The drive transmitting portion 513a is engaged with an elongated projection 303d of the sealing member 303 to transmit the rotation force to the sealing member when the toner supply container 1 is mounted to the main assembly 100 of the apparatus.

In FIG. 33, designated by 517, 515 are bearing members for rotatably supporting the gear member 512, and 516 is an oil seal. The toner discharged through the toner supply port 301g is prevented, by the oil seal 516, from entering the bearing members 515, 517 resulting in the locking of the gear member 512. Designated by 519 is a gear seal member, and when the toner supply container 301 is mounted to the main assembly 100 of the apparatus, it is press-contacted to the 303h portion (FIG. 27) of the sealing member 303 to prevent: the toner discharged through the toner supply port 301g from entering the gear member 512. Designated by 511, 510 are driving side plates for supporting the first coupling member 304. Designated by 518 is a bearing holder, which functions to support the bearing 515 and the oil seal 516 and which is securedly fixed on the driving side plate 511 by screws or by bonding. Designated by 520 is a holder seal member, which prevents the toner from leaking between the bearing holder 518 and the holder 5 as shown in FIG. 27.

The gear seal member 519 and the holder seal member 518 are fixed to the gear member 512 and the bearing holder 518, respectively, by double coated tape or the like, and the material thereof is elastic material such as urethane foam.

A description will be provided as to an operation of the first coupling member 304. The movable member 513 of the coupling member is retractable in a direction A in FIG. 33 because of the structure described in the foregoing. Normally, it is urged to a position shown in FIG. 33 by urging means 514. When the toner supply container 301 is mounted to the main assembly 100 of the apparatus, the sealing member 303 enters the coupling member as shown in FIG. 27. If the pulses of the projections 303d of the sealing member 303 and those of the drive transmitting portions 513a of the movable member 513 are matched, the gear member 512 and the movable member 513 are rotated by unshown main assembly driving mechanism, so that sealing member 303 is rotated through the drive transmitting portion 513a. When the phases are not matched, the movable member 513 is urged in the direction A in FIG. 33 by the projection 303d of the sealing member 3. When the gear member 512 and the movable member 513 are rotated by the main assembly driver with this state, the movable member 513 rotates idle until the phase matching is reached between the projection 303d of the sealing member 303 and the drive transmitting portion 513a of the movable member 513. When the phases are matched, the movable member 513 is slid by the urging means 514 to the position shown in FIG. 33 where the drive transmitting portion 513a and the elongated projection 303d of the sealing member 303 are engaged to transmit the driving to the sealing member 303.

Figure 36:
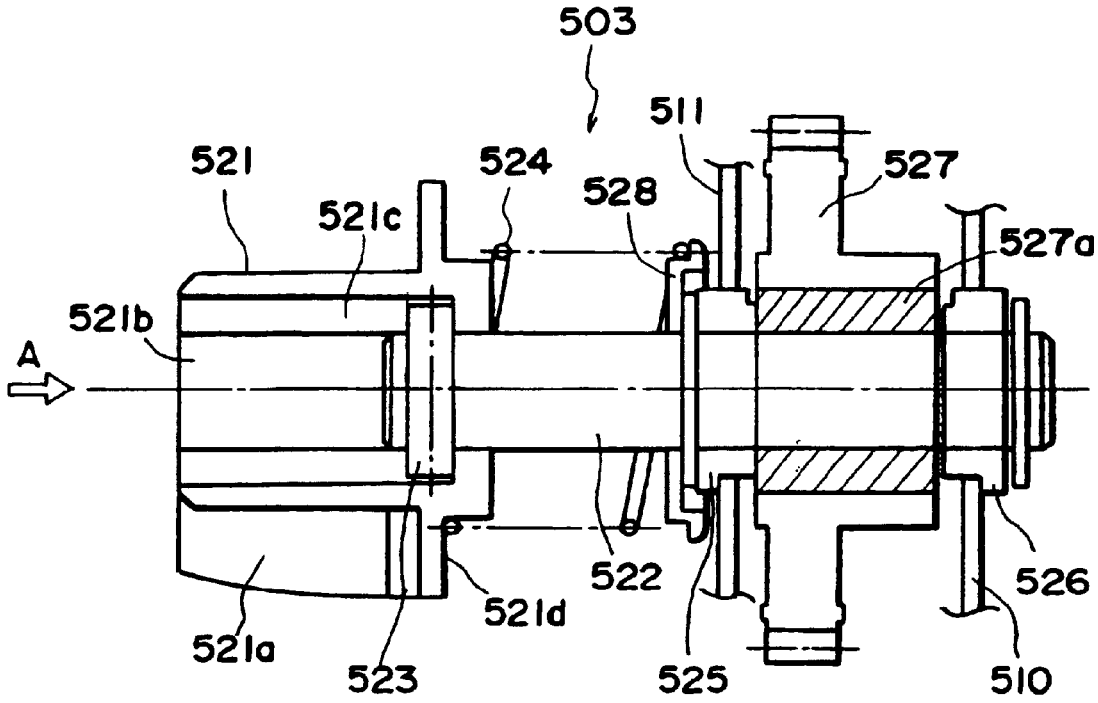
FIG. 36 is a detailed illustration of a second coupling member.
Figure 37:
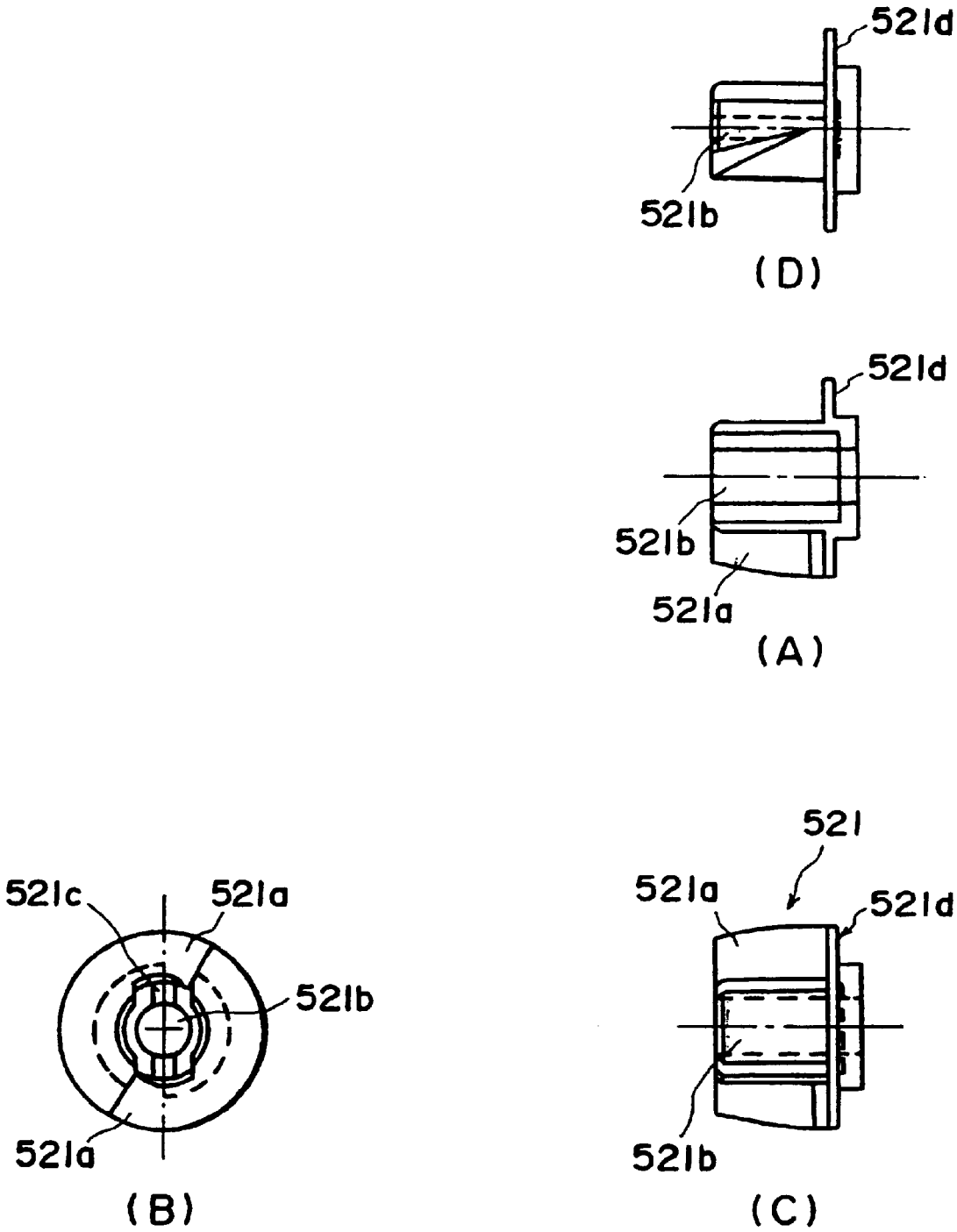
FIG. 37 shows a drive transmission claw, wherein (A) is a sectional front view thereof, (B) is a side view thereof, (C) is a front view thereof, and (D) is a top plan view thereof.
Figure 38:
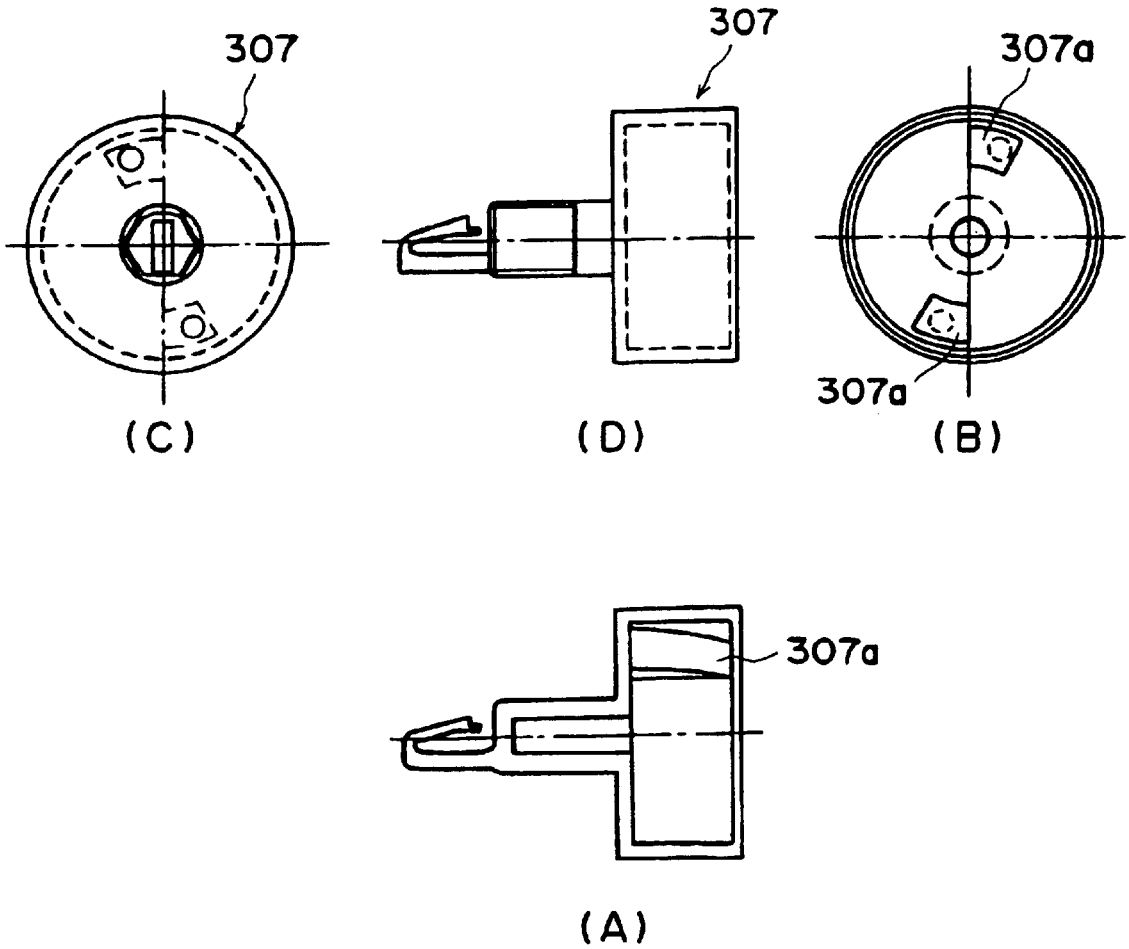
FIG. 38 shows a transmitting member, wherein (A) is a sectional front view thereof, (B) and (C) are side views thereof, and (D) is a front view thereof.

FIG. 36 shows the details of the second coupling member 307. Designated by 521 is a drive transmission claw. In FIG. 37. (A) is a sectional front view of the drive transmission claw 521, (B) is a side view, (C) is a front view, and (D) is an upper surface figure. In FIG. 37, designated by 521a is a claw portion, 521b is a slide guiding portion, 521c is a parallel pin groove portion, and 521d is a spring receiving surface. FIG. 38 is a detailed illustration of the transmitting member 306 shown in FIG. 26, wherein (A) is a sectional front view, (B) and (C) are side view, and (D) is a front view. In FIG. 38, designated by 307a is a transmission claw portion.

In FIG. 36, designated by 522 is a driving shaft which is rotatably supported on driving side plates 510 and 511 through bearings 525, 526, and is provided with a one-way gear 527 which is provided with an integral one way 527a, which transmits rotation only in one rotational direction.

The driving transmission pawl or claw 521 is slidable by engagement between the slide guiding portion 521b and the driving shaft 522, and by engagement with the parallel pin groove portion, the rotation of the driving shaft 522 is transmitted to the drive transmission claw 521. Designated by 524 is urging means which is contacted to the spring seat 528 and the spring receiving surface 521d of the drive transmission claw 521.

A description will be provided as to an operation of the second coupling member 307. The drive transmission claw 521 of the second coupling member 307 is movable in the direction A in FIG. 39 because of the structure described in the foregoing, and is normally urged to a position shown in FIG. 36 by the urging means 524. When the toner supply container 301 is mounted to the main assembly 100 of the apparatus, the transmitting member 306 enters the second coupling member 307. When the phase relation is such that transmission claw portions 307a of the transmitting member 307 are abutted to the claw portions 521a of the drive transmission claw 521.

The claw portions 521a of the drive transmission claw 521 are rotated by the transmission claw portions 307a of the reaching member 307. At this time, the driving shaft 522 rotates with the rotation of the transmission member 306, but it rotates idle due to the one way clutch 527a portion of the one way gear 527, and therefore, when the toner supply container 301 is mounted to the main assembly 100 of the apparatus, the drive transmission claw 521 and the transmitting member 306 are not interfered with.

In the toner supply container in the state shown in FIG. 23 to which it is moved from the position shown in FIG. 24, the drive transmission claw 521 moved by the urging means 524 with the reaction of transmitting member 306 to the left, so that engagement between the transmission claw portion 306a of the transmitting member 306 and the claw portion 521a of the drive transmission claw 521 is maintained.

Thus, the transmitting member 306 receives the rotational driving force through the one way gear 527, driving shaft 522 and the drive transmission claw 521 from the unshown main assembly driving means, so that stirring member 305 is rotated.

A description will be provided as to discharging of the toner.

When the toner supply container 301 is mounted to the main assembly 100 of the apparatus, the locking portion 303e at the end of the sealing member 303 is locked with the locking member 51C of the image forming apparatus, and is supported at a position away from the toner supply port 301g of the main body 301A of the container. At this time, the engaging relation, in the rotational direction, between the feeding member 302 and the sealing member 303 is maintained.

The sealing member 303 is engaged with a first coupling member 304 of the main assembly of the apparatus by the coupling engaging portion (driving force receiving portion) 303C. The first coupling member 304 receives the rotation through the drive transmitting means (unshown) such as a gear or the like from the driving source (unshown) such as a motor or the like of the main assembly of the apparatus, and is transmitted to the sealing member 303 through engagement with the spline-like projections 303d. It is further transmitted to the feeding member 302 through engagement with the free end 302a of the feeding member 302 to the non-circular or square hole 303a. Similarly, the transmitting member 306 engaged with the one end 304d of the stirring member 304 is engaged with a second coupling member 307 of the main assembly of the apparatus. The second coupling member 307 of the main assembly of the apparatus receives the rotation force through the (unshown) drive transmitting means such as a gear from the driving source (unshown) such as a motor of the main assembly of the apparatus, and is transmitted to the stirring member 304 through the engagement with the engaging claw 306a. The rotational frequencies of the feeding member 302 and the stirring member 304 are approximately 52 rotations/min. and approximately 10 rotations/min. in this embodiment.

When the stirring member 304 rotates, the toner which has been caked by removal of air due to long term non-use or due to vibration during transportations, is loosened, and is fed toward the toner supply port portion 301a by rotation of the feeding member 302, and is discharged and let fall through the toner supply port 1g to be supplied to the toner hopper 201a.

The discharging experiments were carried out using the containers of the structures. The main body of the container is filled with toner, and the toner was discharged by the stirring member rotated at a speed of approximately 10 rotations/min., and by the feeding member rotated at a speed of approximately 52 rotations/min. The sieve (opening is 75 $\mu$m, and made of SUS) was used to check existence of larger particles, and it was confirmed that no large particle exists. The remainder toner amount in the container is 20 g, and therefore, the reducing effect of the toner remaining amount is also confirmed.

Figure 39:
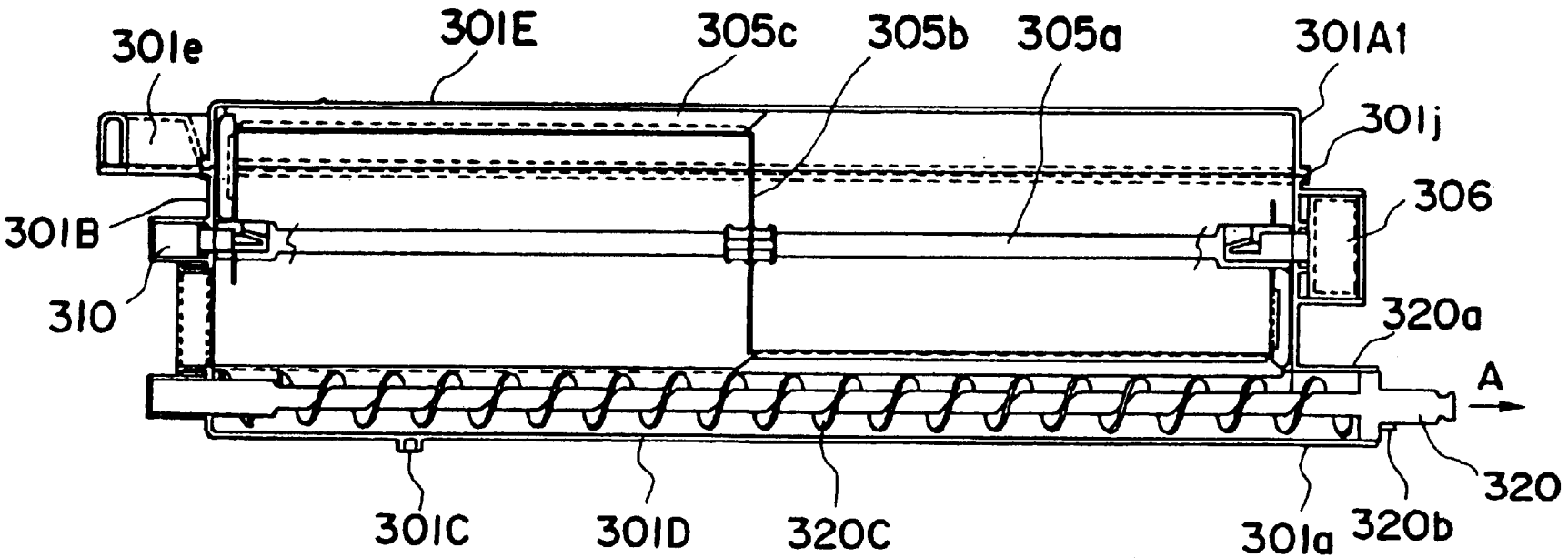
FIG. 39 shows an example wherein the sealing member and the feeding member are integrally formed.

In this embodiment, the sealing member 303 is movable in the axial direction relative to the feeding member 302, but the sealing member and the feeding member may be integral. In FIG. 39, the sealing member 320 includes the sealing portion 320a, the driving force receiving portion 320b and the sealing member 320. The sealing member 320 is movable in the direction A in FIG. 39.

Figure 40:
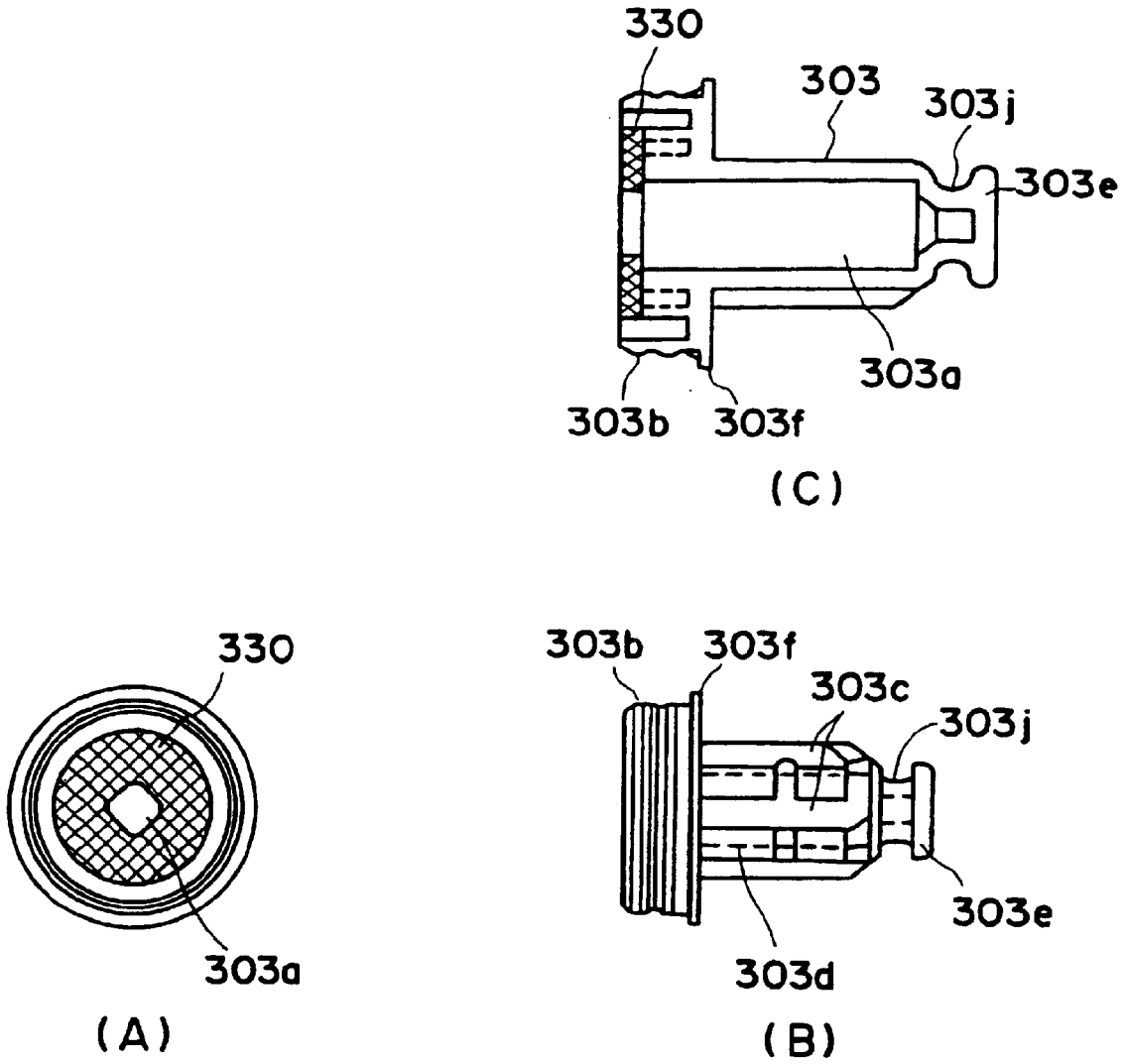
FIG. 40 shows a sealing member having a seal, wherein (A) is a front view thereof, (B) is a side view thereof, and (C) is a cross-sectional view thereof.

The driving portion (driving force transmitting portion) 303a of the sealing member 303 may be provided with a seal. In FIG. 40, (A) is a front view of the sealing member having the seal, (B) is a side view thereof, and (C) is a cross-sectional view thereof.

Figure 41:
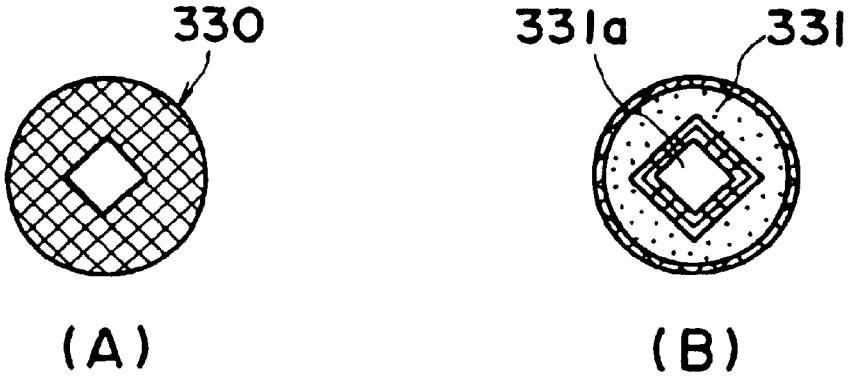
FIG. 41 shows a seal, wherein (A) is a front view of the main body of the container, and (B) is a front view of the sealing member.
Figure 42:
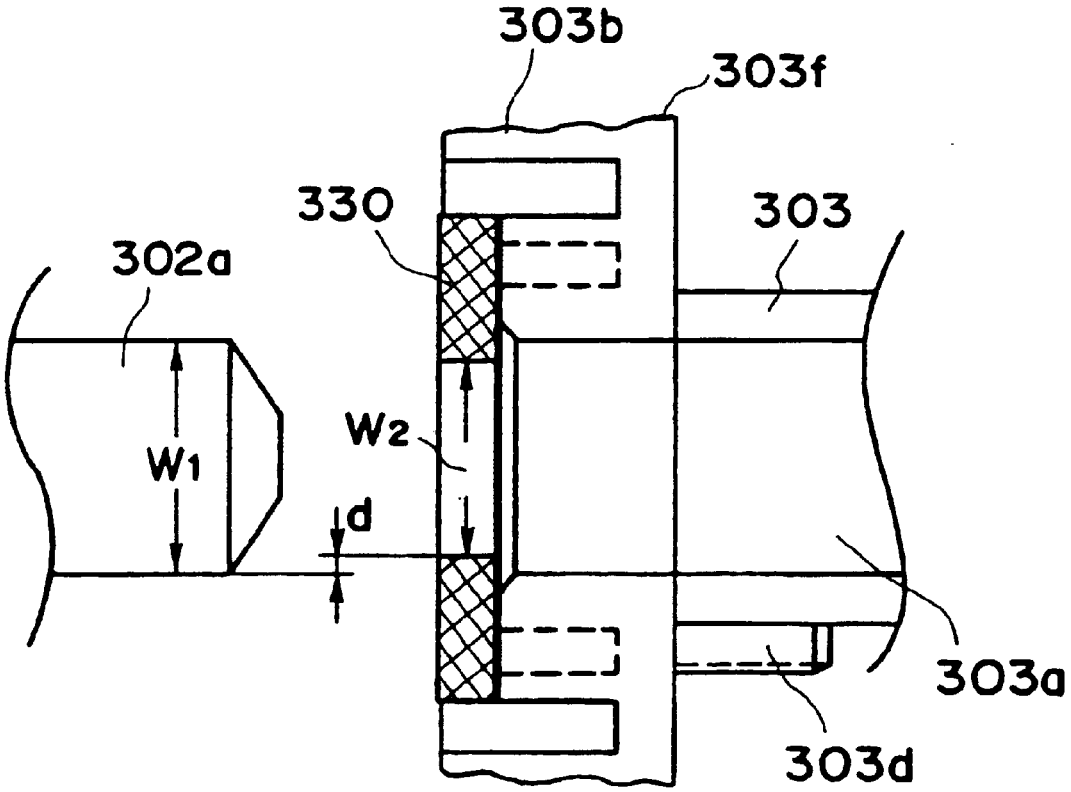
FIG. 42 is an enlarged side view of the sealing member and the feeding member.

Designated by 330 is a seal in the form of a disk, and has a polygonal hole 330a corresponding to the configuration of the end 302a of the shaft of the stirring member 302. In this embodiment, the cross-sectional configuration of the hole 330a is a regular square which is the same as that of the shaft end 302a. The seal 330 is provided at a side of the sealing member 303 opposing to the main body of the container, and the shaft end 302a of the stirring member 302 penetrates the hole 330a and the shaft is loosely fitted in the hole 330a. FIG. 41 is a front view of a seal 330 according to an embodiment of present invention. Designated by 331 is a double coated tape, and is provided on a side of the seal 330 which is opposed to the sealing member 303. The double coated tape 331 has a hole 331a, and when the shaft end 302a is fitted in the hole 303a, the shaft also penetrates the hole 331a, too. The cross-sectional configuration of the hole 331a is larger than of the hole 330a so that double coated tape 331 does not contact the shaft end 302a. In this embodiment, the sealing member 303 and the seal 330 are fixed to each other with the double coated tape, but another fixing method is usable, for example, the sealing member may be integrally formed by two color molding, insertion molding or the like. FIG. 42 is an enlarged side view of the feeding member 302 and the sealing member 303 according to an embodiment of the present invention. The diameter ($W_2$) of the hole 330a is smaller than the shaft diameter ($W_1$=6 mm) of the shaft end 302a, and more particularly, it is preferable that difference (d) between $W_1$ and $W_2$ is 0.5 mm–2 mm. In this embodiment, $W_2$=5 mm, $d=W_1-w_2=1$ mm. The thickness of the seal 330 is preferably 0.5 mm–5 mm from the standpoint of the sealing property and the assembly property. Further preferably, it is 1 mm–3 mm. In this embodiment, the thickness of the seal 330 is approximately 2 mm. The material of the seal 330 is preferably a soft elastic member from the standpoint of the sealing property or assembling property, and in this embodiment, the use is made with low polyurethane foam having a hardness of 20–70°, a compression set of not more than 4% a friction coefficient $\mu$=0.8 or less, a cell size of 60–300 $\mu$m, a specific gravity of 0.2–0.5.

The toner is filled into the container of such structures, and the stirring member was rotated at 25 rotations/min. To effect the toner discharging, and thereafter, the sealing member was continuously opened and closed, and as a result, it was confirmed that toner did not enter to the rear of the hole 303a with good sealing property.

Similar experiments were carried out using the containers having the seal of rubber, of silicon or urethane, thermoplastic elastomer and sponge of polystyrene, polyolefin, polyurethane, polyester or polyamide. As a result, the same results were confirmed as with the low polyurethane foam.

While the invention has been described with reference to the structures disclosed herein, it is not confined to the details set forth and this application is intended to cover such modifications or changes as may come within the purposes of the improvements or the scope of the following claims.

What is claimed is:

1. A toner supply container detachably mountable to a main assembly of an electrophotographic image forming apparatus, comprising:

(a) a toner accommodating portion for accommodating toner;

(b) a toner supply opening for discharging toner accommodated in said toner accommodating portion;

(c) a toner feeding member for feeding the toner accommodated in said toner accommodating portion toward said toner supply opening; and (d) a sealing member including:

a sealing portion for openably sealing said toner supply opening; and a driving portion for driving said toner feeding member.

2. A container according to claim 1, wherein said sealing member has driving force receiving portion for receiving a driving force from a main assembly of said apparatus when said toner supply container is detachably mounted to the main assembly of said apparatus, wherein said toner feeding member is rotated by the driving force received by said driving force receiving portion.

3. A container according to claim 1, wherein said sealing member has an engaging portion engageable with the main assembly of said apparatus to receive a force for unsealing the toner supply opening sealed by said sealing portion when said toner supply container is detachably mounted to the main assembly of said apparatus.

4. A container according to claim 3, wherein said sealing member has a driving force receiving portion for receiving a driving force from a main assembly of said apparatus when said toner supply container is detachably mounted to the main assembly of said apparatus, wherein said toner feeding member is rotated by the driving force received by said driving force receiving portion, wherein said sealing member has said sealing portion, said driving force receiving portion, and said engaging portion on an outside thereof in this order from one longitudinal end to the other longitudinal end, and wherein said sealing member has a hollow portion extending in a direction from the one longitudinal end to the other longitudinal end.

5. A container according to claim 4, wherein said sealing member further includes a seal for preventing the entering of the toner to said driving portion at said one end thereof.

6. A container according to claim 3, wherein said sealing member has a driving force receiving portion for receiving a driving force from a main assembly of said apparatus when said toner supply container is detachably mounted to the main assembly of said apparatus, wherein said toner feeding member is rotated by the driving force received by said driving force receiving portion, wherein said sealing member having the sealing portion, the driving force receiving portion, the driving portion, and the engaging portion is made or resin material and is integrally molded.

7. A container according to claim 4, wherein the hollow portion has a cross-section of a polygonal shape.

8. A container according to claim 2, wherein said driving force receiving portion is in the form of a rib provided on an outer surface of said sealing member.

9. A container according to claim 8, wherein two of such ribs are provided at intervals of 180°.

10. A container according to claim 8, wherein the rib has a height of 0.5 mm–0.3 mm from an outer surface of said sealing member.

11. A container according to claim 1, wherein when said toner supply container is detachably mounted to the main assembly of said apparatus, said toner supply container supplies the toner accommodated in said toner accommodating portion into the main assembly of said apparatus through said toner supply opening by said toner feeding member in accordance with consumption of the toner in the main assembly of said apparatus.

12. A toner supply container detachably mountable to a main assembly of an electrophotographic image forming apparatus, comprising:

(a) a toner accommodating portion for accommodating toner;

(b) a toner supply opening for discharging toner accommodated in said toner accommodating portion;

(c) a toner feeding member for feeding the toner accommodated in said toner accommodating portion toward said toner supply opening; and (d) a sealing member including:

a sealing portion for operably sealing said toner supply opening; and a driving portion for driving said toner feeding member;

wherein said sealing member has a driving force receiving portion for receiving a driving force from a main assembly of said apparatus when said toner supply container is detachably mounted to the main assembly of said apparatus, wherein said toner feeding member is rotated by the driving force received by said driving force receiving portion;

wherein said sealing member has an engaging portion engageable with the main assembly of said apparatus to receive a force for unsealing the toner supply opening sealed by said sealing portion when said toner supply container is detachably mounted to the main assembly of said apparatus; and wherein said sealing member has said sealing portion, said driving force receiving portion, and said engaging portion on an outside thereof in this order from one longitudinal end to the other longitudinal end, and wherein said sealing member has a hollow portion extending in a direction from the one longitudinal end to the other longitudinal end.

13. A container according to claim 12, wherein said sealing member further includes a seal for preventing the entering of the toner to said driving portion at said one end thereof.

14. A container according to claim 13, wherein said sealing member having the sealing portion, the driving force receiving portion, the driving portion, and the engaging portion is made of resin material and is integrally molded.

15. A container according to claim 12, wherein the hollow portion has a cross-section of a polygonal shape.

16. A container according to claim 12, wherein said driving force receiving portion is in the form of a rib provided on an outer surface of said sealing member.

17. A container according to claim 16, wherein two of such ribs are provided at intervals of 180°.

18. A container according to claim 16, wherein the rib has a height of 0.5 mm–3 mm from an outer surface of said sealing member.

19. A container according to claim 12, wherein when said toner supply container is detachably mounted to the main assembly of said apparatus, said toner supply container supplies the toner accommodated in said toner accommodating portion into the main assembly of said apparatus through said toner supply opening by said toner feeding member in accordance with consumption of the toner in the main assembly of said apparatus.

20. A toner supply container detachably mountable to a main assembly of an electrophotographic image forming apparatus, comprising:

(a) a toner accommodating portion for accommodating toner;

(b) a toner supply opening for discharging toner accommodated in said toner accommodating portion;

(c) a toner feeding member for feeding the toner accommodated in said toner accommodating portion toward said toner supply opening; and (d) a sealing member including:

a sealing portion for operably sealing said toner supply opening; and a driving portion for driving said toner feeding member;

wherein said sealing member has a driving force receiving portion for receiving a driving force from a main assembly of said apparatus when said toner supply container is detachably mounted to the main assembly of said apparatus, wherein said toner feeding member is rotated by the driving force received by said driving force receiving portion, wherein said driving force receiving portion is in the form of a rib provided on an outer surface of said sealing member;

wherein said sealing member has an engaging portion engageable with the main assembly of said apparatus to receive a force for unsealing the toner supply opening sealed by said sealing portion when said toner supply container is detachably mounted to the main assembly of said apparatus; and wherein said sealing member further includes a seal, provided at said one end, for preventing entering of the toner to said driving portion at said one end thereof; and wherein said sealing member has said sealing portion, said driving force receiving portion, and said engaging portion on an outside thereof in this order from one longitudinal end to the other longitudinal end, wherein a hollow portion has a cross-section of a polygonal shape, and wherein said sealing member having the sealing portion, the driving force receiving portion, the driving portion, and the engaging portion is made of resin material and is integrally molded; and wherein when said toner supply container is detachably mounted to the main assembly of said apparatus, toner supply container supplies the toner accommodated in said toner accommodating portion into the main assembly of said apparatus through said toner supply opening by said toner feeding member in accordance with consumption of the toner in the main assembly of said apparatus.

21. A container according to claim 20, wherein two of such ribs are provided at intervals of 180°.

22. A container according to claim 20, wherein the rib has a height of 0.5 mm–3 mm from an outer surface of said sealing member.

23. A sealing member usable with a toner supply container which is detachably mountable to a main assembly of an electrophotographic image forming apparatus and which includes a toner accommodating portion for accommodating toner, a toner supply opening for discharging the toner accommodated in said toner accommodating portion, and a toner feeding member for feeding the toner accommodated in said toner accommodating portion toward said toner supply opening, said sealing member comprising:

(a) a sealing portion for openably sealing said toner supply opening; and (b) a driving portion for driving said toner feeding member.

24. A sealing member according to claim 23, wherein said sealing member has a driving force receiving portion for receiving a driving force from a main assembly of said apparatus when said toner supply container is detachably mounted to the main assembly of said apparatus, wherein said toner feeding member is rotated by the driving force received by said driving force receiving portion.

25. A sealing member according to claim 23, wherein said sealing member has an engaging portion engageable with the main assembly of said apparatus to receive a force for unsealing the toner supply opening sealed by said sealing portion when said toner supply container is detachably mounted to the main assembly of said apparatus.

26. A sealing member according to claim 25, wherein said sealing member has a driving force receiving portion for receiving a driving force from a main assembly of said apparatus when said toner supply container is detachably mounted to the main assembly of said apparatus, wherein said toner feeding member is rotated by the driving force received by said driving force receiving portion, wherein said sealing member has had sealing portion, said driving force receiving portion, and said engaging portion on an outside thereof in this order from one longitudinal end to the other longitudinal end, and wherein said sealing member has a hollow portion extending in a direction from the one longitudinal end to the other longitudinal end.

27. A sealing member according to claim 26, wherein said sealing member further includes a seal for preventing the entering of the toner to said driving portion at said one end thereof.

28. A sealing member according to claim 25, wherein said sealing member has a driving force receiving portion for receiving a driving force from a main assembly of said apparatus when said toner supply container is detachably mounted to the main assembly of said apparatus, wherein said toner feeding member is rotated by the driving force received by said driving force receiving portion, wherein said sealing member having the sealing portion, the driving force receiving portion, the driving portion, and the engaging portion is made of resin material and is integrally molded.

29. A sealing member according to claim 26, wherein the hollow portion has a cross-section of a polygonal shape.

30. A sealing member according to claim 24, wherein said driving force receiving portion is in the form of a rib provided on an outer surface of said sealing member.

31. A sealing member according to claim 30 wherein two of such ribs are provided at intervals of 180°.

32. A sealing member according to claim 30, wherein the rib has a height of 0.5 mm–3 mm from an outer surface of said sealing member.

33. A sealing member usable with a toner supply container which is detachably mountable to a main assembly of an electrophotographic image forming apparatus and which includes a toner accommodating portion for accommodating toner, a toner supply opening for discharging the toner accommodated in said toner accommodating portion and a toner feeding member for feeding the toner accommodated in said toner accommodating portion toward said toner supply opening, said sealing member comprising:

(a) a sealing portion for openably sealing and said toner supply opening; and (b) a driving portion for driving said toner feeding member;

(c) a driving force receiving portion for receiving a driving force from a main assembly of said apparatus when said toner supply container is detachably mounted to the main assembly of said apparatus, wherein said toner feeding member is rotated by the driving force received by said driving force receiving portion; and (d) an engaging portion engageable with the main assembly of said apparatus to receive a force for unsealing the toner supply opening sealed by said sealing portion when said toner supply container is detachably mounted to the main assembly of said apparatus;

wherein said sealing member has said sealing portion, said driving force receiving portion, and said engaging portion on an outside thereof in this order from one longitudinal end to the other longitudinal end, and wherein said sealing member has a hollow portion extending in a direction from the one longitudinal end to the other longitudinal end.

34. A sealing member according to claim 33, wherein said sealing member further includes a seal for preventing the entering of the toner to said driving portion at said one end thereof.

35. A sealing member according to claim 34, wherein said sealing member having the sealing portion, the driving force receiving portion, the driving portion, and the engaging portion is made of resin material and is integrally molded.

36. A sealing member according to claim 33, wherein the hollow portion has a cross-sectional of a polygonal shape.

37. A sealing member according to claim 33, wherein said driving force receiving portion is in the form of a rib provided on an outer surface of said sealing member.

38. A sealing member according to claim 37, wherein two of such ribs are provided at intervals of 180°.

39. A sealing member according to claim 37, wherein the rib has a height of 0.5 mm–3 mm from an outer surface of said sealing member.

40. A sealing member usable with a toner supply container which is detachably mountable to a main assembly of an electrophotographic image forming apparatus and which includes a toner accommodating portion for accommodating toner, a toner supply opening for discharging the toner accommodated in said toner accommodating portion and a toner feeding member for feeding the toner accommodated in said toner accommodating portion toward said toner supply opening, said sealing member comprising:

(a) a sealing portion for openably sealing said toner supply opening;

(b) a driving portion for driving said toner feeding member;

(c) a driving force receiving portion for receiving a driving force from a main assembly of said apparatus when said toner supply container is detachably mounted to the main assembly of said apparatus, wherein said toner feeding member is rotated by the driving force received by said driving force receiving portion, wherein said driving force receiving portion is in the form of a rib provided on an outer surface of said sealing member;

(d) an engaging portion engageable with the main assembly of said apparatus to receive a force for unsealing the toner supply opening sealed by said sealing portion when said toner supply container is detachably mounted to the main assembly of said apparatus: and (e) a seal, provided at one end, for preventing the entering of the toner to said driving portion at said one end thereof, wherein said sealing member has said sealing portion, said driving force receiving portion, and said engaging portion on an outside thereof in this order from one longitudinal end to the other longitudinal end, and wherein said sealing member has a hollow portion extending in a direction from the one longitudinal end to the other longitudinal end, wherein the hollow portion has a square cross-section, and wherein said sealing member having the sealing portion, the driving force receiving portion, the driving portion, and the engaging portion is made of resin material and is integrally molded.

41. A sealing member according to claim 40, wherein two of such ribs are provided at intervals of 180°.

42. A sealing member according to claim 40, wherein the rib has a height of 0.5 mm–3 mm from an outer surface of said sealing member.

43. A sealing member usable with a toner supply container which is detachably mountable to a main assembly of an electrophotographic image forming apparatus and which includes a toner accommodating portion for accommodating toner and a toner supply opening for discharging the toner accommodated in said toner accommodating portion, said sealing member comprising:

(a) a sealing portion for openably sealing the toner supply opening;

(b) a driving force receiving portion for receiving driving force from the main assembly of said apparatus when said toner supply container is detachably mounted to the main assembly of said apparatus; and (c) a toner feeding portion for feeding the toner accommodated in said toner accommodating portion toward said toner supply opening by a driving force received from the main assembly of said apparatus.

44. A toner supply container detachably mountable to a main assembly of an electrophotographic image forming apparatus, comprising:

(a) a toner accommodating portion for accommodating toner;

(b) a toner supply opening for discharging toner accommodated in said toner accommodating portion; and (c) a sealing member including:

a sealing portion for openably sealing said toner supply opening;

a driving force receiving portion for receiving a driving force for the main assembly of said apparatus when said toner supply container is detachably mounted to the main assembly of said apparatus; and a toner feeding portion for feeding the toner accommodated in said toner accommodating portion toward said toner supply opening by a driving force received from the main assembly of said apparatus.

45. A toner supply container detachably mountable to a main assembly of an electrophotographic image forming apparatus, comprising:

(a) a toner accommodating portion for accommodating toner;

(b) a toner supply opening for discharging toner accommodated in said toner accommodating portion;

(c) a toner feeding member for feeding the toner accommodated in said toner accommodating portion toward said toner supply opening; and (d) a driving member including:

a driving force receiving portion for receiving a driving force for rotating said toner feeding member from the main assembly of said apparatus;

a driving portion for rotating said toner feeding member by the driving force received from the main assembly of said apparatus by said driving force receiving portion; and an engaging portion engageable with the main assembly of said apparatus to position the driving member relative to the main assembly of said apparatus in a longitudinal direction of said toner supply container when said toner supply container is mounted to the main assembly of said apparatus.

46. An electrophotographic image forming apparatus for forming an image on a recording material, comprising:

(a) mounting means for detachably mounting a toner supply container, said toner supply container including:

a toner accommodating portion for accommodating toner;

a toner supply opening for discharging toner accommodated in said toner accommodating portion;

a toner feeding member for feeding the toner accommodated in said toner accommodating portion toward said toner supply opening;

a sealing member including:

a sealing portion for openably sealing said toner supply opening; and a driving portion for driving said toner feeding member; said apparatus further comprising:

(b) a main assembly side driving portion for supplying a driving force to a driving force receiving portion of said sealing member when said toner supply container is detachably mounted to a main assembly of said apparatus by said mounting means.

47. A sealing member usable with a toner supply container which is detachably mountable to a main assembly of an electrophotographic image forming apparatus and which includes a toner accommodating portion for accommodating toner, a toner supply opening for discharging the toner accommodated in said toner accommodating portion and a toner feeding portion for feeding the toner accommodated in said toner accommodating portion toward said toner supply opening, said sealing member comprising:

(a) a sealing portion for openably sealing said toner supply opening; and (b) a driving portion for driving said toner feeding portion.

*48. A toner supply container detachably mountable to a main assembly of an image forming apparatus, comprising:*

*(a) a toner accommodating portion for accommodating toner;*

*(b) a toner supply opening for discharging toner accommodated in said toner accommodating portion;*

*(c) a toner feeding member for feeding the toner accomodated in said toner accommodating portion toward said toner supply opening; and*

*(d) a sealing member including:*

*a sealing portion for openably sealing said toner supply opening; and*

*a driving portion for driving said toner feeding member.*

*49. A container according to claim 48, wherein said sealing member has a driving force receiving portion for receiving a driving force from a main assembly of said apparatus when said toner supply container is detachably mounted to the main assembly of said apparatus, wherein said toner feeding member is rotated by the driving force received by said driving force receiving portion.*

*50. A container according to claim 48, wherein said sealing member has an engaging portion engageable with the main assembly of said apparatus to receive a force for unsealing the toner supply opening sealed by said sealing portion when said toner supply container is detachably mounted to the main assembly of said apparatus.*

*51. A container according to claim 50, wherein said sealing member has a driving force receiving portion for receiving a driving force from a main assembly of said apparatus when said toner supply container is detachably mounted to the main assembly of said apparatus, wherein said toner feeding member is rotated by the driving force received by said driving force receiving portion, wherein said sealing member has said sealing portion, said driving force receiving portion, and said engaging portion on an outside thereof in this order from one longitudinal end to the other longitudinal end, and wherein said sealing member has a hollow portion extending in a direction from the one longitudinal end to the other longitudinal end.*

*52. A container according to claim 51, wherein said sealing member further includes a seal for preventing the entering of the toner to said driving portion at said one end thereof.*

*53. A container according to claim 50, wherein said sealing member has a driving force receiving portion for*

*receiving a driving force from a main assembly of said apparatus when said toner supply container is detachably mounted to the main assembly of said apparatus, wherein said toner feeding member is rotated by the driving force received by said driving force receiving portion, wherein said sealing member having the sealing portion, the driving force receiving portion, the driving portion, and the engaging portion is made of resin material and is integrally molded.*

*54. A container according to claim 51, wherein the hollow portion has a cross-section of a polygonal shape.*

*55. A container according to claim 49, wherein said driving force receiving portion is in the form of a rib provided on an outer surface of said sealing member.*

*56. A container according to claim 55, wherein two of such ribs are provided at intervals of 180°.*

*57. A container according to claim 55, wherein the rib has a height of 0.5 mm–3 mm from an outer surface of said sealing member.*

*58. A container according to claim 48, wherein when said toner supply container is detachably mounted to the main assembly of said apparatus, said toner supply container supplies the toner accommodated in said toner accommodating portion into the main assembly of said apparatus through said toner supply opening by said toner feeding member in accordance with consumption of the toner in the main assembly of said apparatus.*

*59. A toner supply container detachably mountable to a main assembly of an image forming apparatus, comprising:*

*(a) a toner accommodating portion for accommodating toner;*

*(b) a toner supply opening for discharging toner accommodated in said toner accommodating portion;*

*(c) a toner feeding member for feeding the toner accommodated in said toner accommodating portion toward said toner supply opening; and*

*(d) a sealing member including:*

*a sealing portion for openably sealing said toner supply opening; and*

*a driving portion for driving said toner feeding member;*

*wherein said sealing member has a driving force receiving portion for receiving a driving force from a main assembly of said apparatus when said toner supply container is detachably mounted to the main assembly of said apparatus, wherein said toner feeding member is rotated by the driving force received by said driving force receiving portion;*

*wherein said sealing member has an engaging portion engageable with the main assembly of said apparatus to receive a force for unsealing the toner supply opening sealed by said sealing portion when said toner supply container is detachably mounted to the main assembly of said apparatus; and*

*wherein said sealing member has said sealing portion, said driving force receiving portion, and said engaging portion on an outside thereof in this order form one longitudinal end to the other longitudinal end, and wherein said sealing member has a hollow portion extending in a direction from the one longitudinal end to the other longitudinal end.*

*60. A container according to claim 59, wherein said sealing member further includes a seal for preventing the entering of the toner to said driving portion at said one end thereof.*

*61. A container according to claim 60, wherein said sealing member having the sealing portion, the driving force receiving portion, the driving portion, and the engaging portion is made of resin material and is integrally molded.*

*62. A container according to claim 59, wherein the hollow portion has a cross-section of a polygonal shape.*

*63. A container according to claim 59, wherein said driving force receiving portion is in the form of a rib provided on an outer surface of said sealing member.*

*64. A container according to claim 63, wherein two of such ribs are provided at intervals of 180°.*

*65. A container according to claim 63, wherein the rib has a height of 0.5 mm–3 mm from an outer surface of said sealing member.*

*66. A container according to claim 59, wherein when said toner supply container is detachably mounted to the main assembly of said apparatus, said toner supply container supplies the toner accommodated in said toner accommodating portion into the main assembly of said apparatus through said toner supply opening by said toner feeding member in accordance with consumption of the toner in the main assembly of said apparatus.*

*67. A toner supply container detachably mountable to a main assembly of an image forming apparatus, comprising:*

*(a) a toner accommodating portion for accommodating toner;*

*(b) a toner supply opening for discharging toner accommodated in said toner accommodating portion;*

*(c) a toner feeding member for feeding the toner accommodated in said toner accommodating portion toward said toner supply opening; and*

*(d) a sealing member including:*

*a sealing portion for operably sealing said toner supply opening; and*

*a driving portion for driving said toner feeding member;*

*wherein said sealing member has a driving force receiving portion for receiving a driving force from a main assembly of said apparatus when said toner supply container is detachably mounted to the main assembly of said apparatus, wherein said toner feeding member is rotated by the driving force received by said driving force receiving portion, wherein said driving force receiving portion is in the form of a rib provided on an outer surface of said sealing member;*

*wherein said sealing member has an engaging portion engageable with the main assembly of said apparatus to receive a force for unsealing the toner supply opening sealed by said sealing portion when said toner supply container is detachably mounted to the main assembly of said apparatus; and*

*wherein said sealing member further includes a seal, provided at one said one end, for preventing entering of the toner to said driving portion at said one end thereof; and*

*wherein said sealing member has said sealing portion, said driving force receiving portion, and said engaging portion on an outside thereof in this order from one longitudinal end to the other longitudinal end, wherein a hollow portion has a cross-section of a polygonal shape, and wherein said sealing member having the sealing portion, the driving force receiving portion, the driving portion, and the engaging portion is made of resin material and is integrally molded; and*

*wherein when said toner supply container is detachably mounted to the main assembly of said apparatus, toner supply container supplies the toner accommodated in said toner accommodating portion into the main*

*assembly of said apparatus through said toner supply opening by said toner feeding member in accordance with consumption of the toner in the main assembly of said apparatus.*

*68. A container according to claim 67, wherein two of such ribs are provided at intervals of 180°.*

*69. A container according to claim 67, wherein the rib has a height of 0.5 mm–3 mm from an outer surface of said sealing member.*

*70. A sealing member usable with a toner supply container which is detachably mountable to a main assembly of an image forming apparatus and which includes a toner accommodating portion for accommodating toner, a toner supply opening for discharging the toner accommodated in said toner accommodating portion, and a toner feeding member for feeding the toner accommodated in said toner accommodating portion toward said toner supply opening, said sealing member comprising:*

*(a) a sealing portion for openably sealing said toner supply opening; and*

*(b) a driving portion for driving said toner feeding member.*

*71. A sealing member according to claim 70, wherein said sealing member has a driving force receiving portion for receiving a driving force from a main assembly of said apparatus when said toner supply container is detachably mounted to the main assembly of said apparatus, wherein said toner feeding member is rotated by the driving force received by said driving force receiving portion.*

*72. A sealing member according to claim 70, wherein said sealing member has an engaging portion engageable with the main assembly of said apparatus to receive a force a unsealing the toner supply opening sealed by said sealing portion when said toner supply container is detachably mounted to the main assembly of said apparatus.*

*73. A sealing member according to claim 72, wherein said sealing member has a driving force receiving portion for receiving a driving force from a main assembly of said apparatus when said toner supply container is detachably mounted to the main assembly of said apparatus, wherein said toner feeding member is rotated by the driving force received by said driving force receiving portion, wherein said sealing member has said sealing portion, said driving force receiving portion, and said engaging portion on an outside thereof in this order from one longitudinal end to the other longitudinal end, and wherein said sealing member has a hollow portion extending in a direction from the one longitudinal end to the other longitudinal end.*

*74. A sealing member according to claim 73, wherein said sealing member further includes a seal for preventing the entering of the toner to said driving portion at said one end thereof.*

*75. A sealing member according to claim 72, wherein said sealing member has a driving force receiving portion for receiving a driving force from a main assembly of said apparatus when said toner supply container is detachably mounted to the main assembly of said apparatus, wherein said toner feeding member is rotated by the driving force received by said driving force receiving portion, wherein said sealing member having the sealing portion, the driving force receiving portion, the driving portion, and the engaging portion is made of resin material and is integrally molded.*

*76. A sealing member according to claim 73, wherein the hollow portion has a cross-section of a polygonal shape.*

*77. A sealing member according to claim 71, wherein said driving force receiving portion is in the form of a rib provided on an outer surface of said sealing member.*

*78. A sealing member according to claim 77, wherein two of such ribs are provided at intervals of 180°.*

*79. A sealing member according to claim 77, wherein the rib has a height of 0.5 mm–3 mm from an outer surface of said sealing member.*

*80. A sealing member usable with a toner supply container which is detachably mountable to a main assembly of an image forming apparatus and which includes a toner accommodating portion for accommodating toner, a toner supply opening for discharging the toner accommodated in said toner accommodating portion and a toner feeding member for feeding the toner accommodated in said toner accommodating portion toward said toner supply opening, and sealing member comprising:*

*(a) a sealing portion for openably sealing said toner supply opening; and*

*(b) a driving portion for driving said toner feeding member;*

*(c) a driving force receiving portion for receiving a driving force from a main assembly of said apparatus when said toner supply container is detachably mounted to the main assembly of said apparatus, wherein said toner feeding member is rotated by the driving force received by said driving force receiving portion; and*

*(d) an engaging portion engageable with the main assembly of said apparatus to receive a force for unsealing the toner supply opening sealed by said sealing portion when said toner supply container is detachably mounted to the main assembly of said apparatus;*

*wherein said sealing member has said sealing portion, said driving force receiving portion, and said engaging portion on an outside thereof in this order from one longitudinal end to the other longitudinal end, and wherein said sealing member has a hollow portion extending in a direction from the one longitudinal end to the other longitudinal end.*

*81. A sealing member according to claim 80, wherein said sealing member further includes a seal preventing the entering of the toner of said driving portion at said one end thereof.*

*82. A sealing member according to claim 81, wherein said sealing member having the sealing portion, the driving force receiving portion, the driving portion, and the engaging portion is made of resin material and is integrally molded.*

*83. A sealing member according to claim 80, wherein the hollow portion has a cross-section of a polygonal shape.*

*84. A sealing member according to claim 80, wherein said driving force receiving portion is in the form of a rib provided on an outer surface of said sealing member.*

*85. A sealing member according to claim 84, wherein two of such ribs are provided at intervals of 180°.*

*86. A sealing member according to claim 84, wherein the rib has a height of 0.5 mm–3 mm from an outer surface of said sealing member.*

*87. A sealing member usable with a toner supply container which is detachably mountable to a main assembly of an image forming apparatus and which includes a toner accommodating portion for accommodating toner, a toner supply opening for discharging the toner accommodated in said toner accommodating portion and a toner feeding member for feeding the toner accommodated in said toner accommodating portion toward said toner supply opening, said sealing member comprising:*

*(a) a sealing portion for openably sealing said toner supply opening;*

(b) *a driving portion for driving said toner feeding member;*

(c) *a driving force receiving portion for receiving a driving force from a main assembly of said apparatus when said toner supply container is detachably mounted to the main assembly of said apparatus, wherein said toner feeding member is rotated by the driving force received by said driving force receiving portion, wherein said driving force receiving portion is in the form of a rib provided on an outer surface of said sealing member;*

(d) *an engaging portion engageable with the main assembly of said apparatus to receive a force for unsealing the toner supply opening sealed by said sealing portion when said toner supply container is detachably mounted to the main assembly of said apparatus; and*

(e) *a seal, provided at one end, for preventing the entering of the toner to said driving portion at said one end thereof,*

*wherein said sealing member has said sealing portion, said driving force receiving portion, and said engaging portion on an outside thereof in this order from one longitudinal end to the other longitudinal end, and wherein said sealing member has a hollow portion extending in a direction from the one longitudinal end to the other longitudinal end, wherein the hollow portion has a square cross-section, and wherein said sealing member having the sealing portion, the driving force receiving portion, the driving portion, and the engaging portion is made of resin material and is integrally molded.*

*88. A sealing member according to claim 87, wherein two of such ribs are provided at intervals of 180°.*

*89. A sealing member according to claim 87, wherein the rib has a height of 0.5 mm–3 mm from an outer surface of said sealing member.*

*90. A sealing member usable with a toner supply container which is detachably mountable to a main assembly of an image forming apparatus and which includes a toner accommodating portion for accommodating toner and a toner supply opening for discharging the toner accommodated in said toner accommodating portion, said sealing member comprising:*

(a) *a sealing portion for openably sealing the toner supply opening;*

(b) *a driving force receiving portion for receiving driving force from the main assembly of said apparatus when said toner supply container is detachably mounted to the main assembly of said apparatus; and*

(c) *a toner feeding portion for feeding the toner accommodated in said toner accommodating portion toward said toner supply opening by a driving force received from the main assembly of said apparatus.*

*91. A toner supply container detachably mountable to a main assembly of an image forming apparatus, comprising:*

(a) *a toner accommodating portion for accommodating toner;*

(b) *a toner supply opening for discharging toner accommodated in said toner accommodating portion; and*

(c) *a sealing member including:*

*a sealing portion for openably sealing said toner supply opening;*

*a driving force receiving portion for receiving a driving force for the main assembly of said apparatus when said toner supply container is detachably mounted to the main assembly of said apparatus; and*

*a toner feeding portion for feeding the toner accommodated in said toner accommodating portion toward said toner supply opening by a driving force received from the main assembly of said apparatus.*

*92. A toner supply container detachably mountable to a main assembly of an image forming apparatus, comprising:*

(a) *a toner accommodating portion for accommodating toner;*

(b) *a toner supply opening for discharging toner accommodated in said toner accommodating portion;*

(c) *a toner feeding member for feeding the toner accommodated in said toner accommodating portion toward said toner supply opening; and*

(d) *a driving member including:*

*a driving force receiving portion for receiving a driving force for rotating said toner feeding member from the main assembly of said apparatus;*

*a driving portion for rotating said toner feeding member by the driving force received from the main assembly of said apparatus by said driving force receiving portion; and*

*an engaging portion engageable with the main assembly of said apparatus to position the driving member relative to the main assembly of said apparatus in a longitudinal direction of said toner supply container when said toner supply container is mounted to the main assembly of said apparatus.*

*93. An image apparatus for forming an image on a recording material comprising:*

(a) *mounting means for detachably mounting a toner supply container, said toner supply container including:*

*a toner accommodating portion for accommodating toner;*

*a toner supply opening for discharging toner accommodated in said toner accommodating portion;*

*a toner feeding member for feeding the toner accommodated in said toner accommodating portion toward said toner supply opening;*

*a sealing member including:*

*a sealing portion for openably sealing said toner supply opening; and*

*a driving portion for driving said toner feeding member; said apparatus further comprising:*

(b) *a main assembly side driving portion for supplying a driving force to a driving force receiving portion of said sealing member when said toner supply container is detachably mounted to a main assembly of said apparatus by said mounting means.*

*94. A sealing member usable with a toner supply container which is detachably mountable to a main assembly of an image forming apparatus and which includes a toner accommodating portion for accommodating toner, a toner supply opening for discharging the toner accommodated in said toner accommodating portion and a toner feeding portion for feeding the toner accomodated in said toner accommodating portion toward said toner supply opening, said sealing member comprising:*

(a) *a sealing portion for openably sealing said toner supply opening; and*

(b) *a driving portion for driving said toner feeding portion.*

* * * * *

UNITED STATES PATENT AND TRADEMARK OFFICE

CERTIFICATE OF CORRECTION

PATENT NO. : RE 38,737 E
APPLICATION NO. : 10/262058
DATED : May 24, 2005
INVENTOR(S) : Yutaka Ban et al.

It is certified that error appears in the above-identified patent and that said Letters Patent is hereby corrected as shown below:

ON THE TITLE PAGE, At (56) References Cited, U.S. PATENT DOCUMENTS
insert --5,057,872 10/1991 Saijo--.

ON THE TITLE PAGE, At (56) References Cited, FOREIGN PATENT DOCUMENTS

| | | | | | | |
|---|---|---|---|---|---|---|
| "JP | 63-85660 | 9/1986" | should read | --JP | 63-85660 | 4/1988--. |
| "JP | 64-23054 | 7/1987" | should read | --JP | 64-23054 | 2/1989--. |
| "JP | 3-2882 | 5/1989" | should read | --JP | 3-2882 | 1/1991--. |
| "JP | 6-348121 | 7/1993" | should read | --JP | 6-348121 | 12/1994--. |
| " JP | 8-211719 | 2/1995" | should read | --JP | 8-211719 | 8/1996--. |
| "JP | 10-319696 | 5/1997" | should read | --JP | 10-319696 | 12/1998--. |
| "JP | 61116372" | | should read | --JP | 61-116372--. | |
| "JP | 07044000" | | should read | --JP | 7-044000--. | |
| "JP | 07113796" | | should read | --JP | 7-113796--. | |

ON THE TITLE PAGE, At (57) ABSTRACT:
Line 3, "include" should read --includes--.

COLUMN 4:
Line 9, "thereof." should read --thereof,--.

COLUMN 6:
Line 26, "member" should read --member,--.
Line 27, "by," should read --by--.

COLUMN 7:
Line 52, "engaged" should read --engage--.

COLUMN 8:
Line 21, "with" should read --will--.

COLUMN 9:
Line 58, "used" should read --used as--.

COLUMN 10:
Line 13, "transportion" should read --transportation--.

COLUMN 11:
Line 40, "side" should read --slide--.
Line 51, "anti-clock" should read --counterclockwise--.
Line 60, "is" should be deleted.

UNITED STATES PATENT AND TRADEMARK OFFICE

CERTIFICATE OF CORRECTION

PATENT NO. : RE 38,737 E
APPLICATION NO. : 10/262058
DATED : May 24, 2005
INVENTOR(S) : Yutaka Ban et al.

It is certified that error appears in the above-identified patent and that said Letters Patent is hereby corrected as shown below:

COLUMN 12:
Line 28, “counterclockwisely” should read --counterclockwise--.
Line 57, “clockwisely.” should read --clockwise.--.

COLUMN 14:
Line 65, “properly” should read --properly by--.

COLUMN 15:
Line 61, “is mounted” should read --be mounted--.

COLUMN 16:
Line 12, “mounting” should read --mounted--.

COLUMN 17:
Line 54, “is” should read --are--.

COLUMN 21:
Line 24, “use” should read --user--.

COLUMN 23:
Line 29, “approximately” should read --approximately at a--.

COLUMN 24:
Line 52, “Embodiment” should read --Embodiments--.

COLUMN 25:
Line 28, “are” should read --is--.
Line 60, “the” should be deleted.

COLUMN 26:
Line 16, “division” should read --divisions--.

COLUMN 27:
Line 38, “(upper” should read --(higher--.
Line 53, “securedly” should read --securely--.

COLUMN 29:
Line 4, “view,” (second occurrence) should read --views--.

UNITED STATES PATENT AND TRADEMARK OFFICE

CERTIFICATE OF CORRECTION

PATENT NO. : RE 38,737 E
APPLICATION NO. : 10/262058
DATED : May 24, 2005
INVENTOR(S) : Yutaka Ban et al.

It is certified that error appears in the above-identified patent and that said Letters Patent is hereby corrected as shown below:

COLUMN 30:
Line 59, “to” should be deleted.

COLUMN 32:
Line 30, “or” should read --of--.

COLUMN 34:
Line 65, “has had” should read--has said--.

COLUMN 35:
Line 38, “and said” should read --said--.
Line 39, “and” should be deleted COLUMN 36:
Line 4, “cross-sectional” should read --cross-section--.
Line 39, “apparatus: and” should read --apparatus; and--.

COLUMN 41:
Line 32, “a force a” should read --a force for--.

COLUMN 42:
Line 14, “and” should read --said--.
Line 39, “seal” should read --seal for--.

COLUMN 44:
Line 29, “material” should read --material,--.

Signed and Sealed this

Twentieth Day of February, 2007

JON W. DUDAS
*Director of the United States Patent and Trademark Office*